(12) United States Patent
Lim et al.

(10) Patent No.: US 11,800,113 B2
(45) Date of Patent: Oct. 24, 2023

(54) IMAGE ENCODING/DECODING METHOD AND RECORDING MEDIUM THEREFOR

(71) Applicant: Electronics and Telecommunications Research Institute, Daejeon (KR)

(72) Inventors: Sung Chang Lim, Daejeon (KR); Jung Won Kang, Daejeon (KR); Hyun Suk Ko, Daejeon (KR); Jin Ho Lee, Daejeon (KR); Ha Hyun Lee, Seoul (KR); Dong San Jun, Daejeon (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/301,409

(22) PCT Filed: Jul. 11, 2017

(86) PCT No.: PCT/KR2017/007416
§ 371 (c)(1),
(2) Date: Nov. 13, 2018

(87) PCT Pub. No.: WO2018/012851
PCT Pub. Date: Jan. 18, 2018

(65) Prior Publication Data
US 2019/0297325 A1   Sep. 26, 2019

(30) Foreign Application Priority Data

Jul. 12, 2016  (KR) .......................... 10-2016-0087896

(51) Int. Cl.
*H04N 19/70*   (2014.01)
*H04N 19/139*   (2014.01)
(Continued)

(52) U.S. Cl.
CPC ......... *H04N 19/137* (2014.11); *H04N 19/105* (2014.11); *H04N 19/13* (2014.11);
(Continued)

(58) Field of Classification Search
CPC .. H04N 19/137; H04N 19/176; H04N 19/159; H04N 19/13; H04N 19/105;
(Continued)

(56) References Cited

U.S. PATENT DOCUMENTS 7,054,365 B2 * 5/2006 Kim .................. H04N 21/2662
                                          375/E7.184
8,160,374 B2 * 4/2012 Zheng .................. H04N 19/61
                                              382/239

(Continued)

FOREIGN PATENT DOCUMENTS

CN    103299642 A    9/2013
CN    103765896 A    4/2014
(Continued)

OTHER PUBLICATIONS

ITU-T Telecommunication Standardization Sector of ITU—H.264 (Year: 2014).*
(Continued)

*Primary Examiner* — Philip P. Dang
(74) *Attorney, Agent, or Firm* — NSIP Law

(57) ABSTRACT

The present invention relates to a video encoding and decoding method. A video decoding method for the same may include: obtaining granularity information; determining a sharing region based on the granularity information; and generating a prediction block of a current block by using motion information of the sharing region when the current block corresponds to the sharing region.

5 Claims, 20 Drawing Sheets

(51) Int. Cl.
| | |
|---|---|
| *H04N 19/137* | (2014.01) |
| *H04N 19/105* | (2014.01) |
| *H04N 19/13* | (2014.01) |
| *H04N 19/159* | (2014.01) |
| *H04N 19/176* | (2014.01) |
| *H04N 19/513* | (2014.01) |
| *H04N 19/51* | (2014.01) |
| *H04N 19/44* | (2014.01) |
| *H04N 19/91* | (2014.01) |
| *H04N 19/146* | (2014.01) |

(52) U.S. Cl.
CPC ......... *H04N 19/146* (2014.11); *H04N 19/159* (2014.11); *H04N 19/176* (2014.11); *H04N 19/44* (2014.11); *H04N 19/51* (2014.11); *H04N 19/513* (2014.11); *H04N 19/91* (2014.11)

(58) Field of Classification Search
CPC ...... H04N 19/91; H04N 19/513; H04N 19/51; H04N 19/146; H04N 19/44
See application file for complete search history.

(56) References Cited

U.S. PATENT DOCUMENTS

| | | | | |
|---|---|---|---|---|
| 8,451,775 B2* | 5/2013 | Choi | ...................... | H04W 60/00 455/435.2 |
| 8,462,719 B2* | 6/2013 | Choi | ...................... | H04W 48/08 370/329 |
| 8,537,897 B2* | 9/2013 | Lee | ...................... | H04N 19/139 375/240.26 |
| 8,654,855 B2* | 2/2014 | Kim | ...................... | H04N 19/61 375/240.03 |
| 8,693,549 B2* | 4/2014 | Choi | ...................... | H04N 19/176 375/240.12 |
| 9,197,568 B2* | 11/2015 | Ko | .......................... | H04L 47/24 |
| 9,288,507 B2* | 3/2016 | Zhang | .................. | H04N 19/105 |
| 9,300,973 B2* | 3/2016 | Lee | ...................... | H04N 19/122 |
| 9,357,212 B2* | 5/2016 | Zhang | .................. | H04N 19/103 |
| 9,445,114 B2* | 9/2016 | Ouedraogo | .......... | H04N 19/164 |
| 9,473,778 B2* | 10/2016 | Chou | ...................... | H04N 19/105 |
| 9,514,519 B2* | 12/2016 | Ikai | ............................ | G06T 5/20 |
| 9,532,042 B2* | 12/2016 | Kim | ...................... | H04N 19/139 |
| 9,571,835 B2* | 2/2017 | Yang | ........................ | H04N 19/61 |
| 9,615,090 B2* | 4/2017 | Zhang | .................. | H04N 19/597 |
| 9,649,558 B2* | 5/2017 | Stafford | ................ | G06V 40/11 |
| 9,681,134 B2* | 6/2017 | Nakamura | ........... | H04N 19/174 |
| 9,800,857 B2* | 10/2017 | Zhang | .................. | H04N 19/105 |
| 9,800,887 B2* | 10/2017 | Kim | ........................ | H04N 19/52 |
| 9,807,410 B2* | 10/2017 | Chou | ...................... | H04N 19/103 |
| 9,860,551 B2* | 1/2018 | Park | ...................... | H04N 19/583 |
| 9,860,559 B2* | 1/2018 | Zhang | .................. | H04N 19/593 |
| 9,906,786 B2* | 2/2018 | Seregin | .................. | H04N 19/30 |
| 9,924,181 B2* | 3/2018 | Chuang | .................. | H04N 19/33 |
| 9,924,191 B2* | 3/2018 | Chen | ...................... | H04N 19/597 |
| 9,948,915 B2* | 4/2018 | Chen | ...................... | H04N 19/176 |
| 9,948,939 B2* | 4/2018 | Zhang | .................. | H04N 19/31 |
| 9,955,155 B2* | 4/2018 | Jeong | .................. | H04N 19/197 |
| 10,097,810 B2* | 10/2018 | Schwarz | ............. | H04N 13/128 |
| 10,158,884 B2* | 12/2018 | Zhang | .................... | H04N 19/30 |
| 10,158,885 B2* | 12/2018 | Zhang | .................... | H04N 19/70 |
| 10,200,711 B2* | 2/2019 | Li | .......................... | H04N 19/70 |
| 10,212,419 B2* | 2/2019 | Hinz | .................... | H04N 19/119 |
| 10,212,420 B2* | 2/2019 | Hinz | .................... | H04N 19/176 |
| 10,244,253 B2* | 3/2019 | Chen | .................... | H04N 19/70 |
| 10,368,097 B2* | 7/2019 | Aflaki Beni | ......... | H04N 19/597 |
| 10,574,965 B2* | 2/2020 | Liu | .......................... | H04N 13/15 |
| 10,694,165 B2* | 6/2020 | Schwarz | ............. | H04N 19/597 |
| 2006/0291562 A1* | 12/2006 | Lee | ........................ | H04N 19/30 375/240.12 |
| 2008/0075166 A1* | 3/2008 | Gish | ...................... | H04N 19/44 375/E7.184 |
| 2011/0150328 A1* | 6/2011 | Han | ........................ | G06V 20/10 382/165 |
| 2012/0147963 A1* | 6/2012 | Sato | .................... | H04N 19/122 375/E7.125 |
| 2013/0188884 A1 | 7/2013 | Kim et al. | | |
| 2013/0195188 A1* | 8/2013 | Sugio | .................. | H04N 19/147 375/240.14 |
| 2014/0072041 A1 | 3/2014 | Seregin et al. | | |
| 2014/0112187 A1* | 4/2014 | Kang | .................... | H04L 43/024 370/253 |
| 2014/0301461 A1 | 10/2014 | Jeon et al. | | |
| 2014/0341284 A1 | 11/2014 | Kim et al. | | |
| 2014/0362919 A1 | 12/2014 | Zhou et al. | | |
| 2015/0085932 A1 | 3/2015 | Lin et al. | | |
| 2015/0139323 A1* | 5/2015 | Lee | ........................ | H04N 19/30 375/240.16 |
| 2016/0073133 A1* | 3/2016 | Lee | ...................... | H04N 19/103 375/240.12 |
| 2016/0134891 A1* | 5/2016 | Lee | ...................... | H04N 19/157 375/240.08 |
| 2016/0286229 A1* | 9/2016 | Li | .......................... | H04N 19/57 |
| 2016/0286230 A1* | 9/2016 | Li | ........................ | H04N 19/513 |
| 2016/0286232 A1* | 9/2016 | Li | ........................ | H04N 19/109 |
| 2018/0146213 A1* | 5/2018 | Andersson | ............. | H04N 19/82 |
| 2018/0167618 A1* | 6/2018 | Lee | ........................ | H04N 19/12 |

FOREIGN PATENT DOCUMENTS

| | | |
|---|---|---|
| EP | 2942961 A1 | 11/2015 |
| KR | 10-0772576 B1 | 11/2007 |
| KR | 10-2010-0043857 A | 4/2010 |
| KR | 10-2012-0018906 A | 3/2012 |
| KR | 10-2014-0028035 A | 3/2014 |
| KR | 10-2014-0033238 A | 3/2014 |
| KR | 10-2015-0052259 A | 5/2015 |
| KR | 10-2015-0126010 A | 11/2015 |
| KR | 10-2016-0019531 A | 2/2016 |
| WO | WO 01/86962 A1 | 11/2001 |
| WO | WO 2013/012479 A1 | 1/2013 |

OTHER PUBLICATIONS

ITU-T Telecommunication Standardization Sector of ITU—H.265 (Year: 2015).*
International Search Report dated Oct. 23, 2017 in counterpart International Patent Application No. PCT/KR2017/007416 (4 pages, in Korean with English translation).

* cited by examiner

FIG. 7

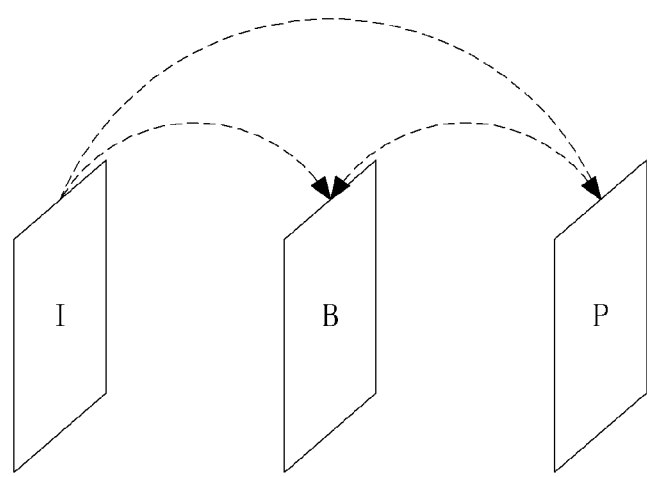

FIG.8

| Intra Prediction Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| vertical direction transform set | 2 | 1 | 0 | 1 | 0 | 1 | 0 | 1 | 0 | 1 | 0 | 1 | 0 | 1 | 0 | 0 | 0 | 0 |
| horizontal direction transform set | 2 | 1 | 0 | 1 | 0 | 1 | 0 | 1 | 0 | 1 | 0 | 1 | 0 | 1 | 2 | 2 | 2 | 2 |
| Intra Prediction Mode | 18 | 19 | 20 | 21 | 22 | 23 | 24 | 25 | 26 | 27 | 28 | 29 | 30 | 31 | 32 | 33 | 34 | |
| vertical direction transform set | 0 | 0 | 0 | 0 | 0 | 1 | 0 | 1 | 0 | 1 | 0 | 1 | 0 | 1 | 0 | 1 | 0 | |
| horizontal direction transform set | 2 | 2 | 2 | 2 | 2 | 1 | 0 | 1 | 0 | 1 | 0 | 1 | 0 | 1 | 0 | 1 | 0 | |
| Intra Prediction Mode | 35 | 36 | 37 | 38 | 39 | 40 | 41 | 42 | 43 | 44 | 45 | 46 | 47 | 48 | 49 | 50 | 51 | 52 |
| vertical direction transform set | 1 | 0 | 1 | 0 | 1 | 0 | 1 | 0 | 1 | 0 | 1 | 2 | 2 | 2 | 2 | 2 | 2 | 2 |
| horizontal direction transform set | 1 | 0 | 1 | 0 | 1 | 0 | 1 | 0 | 1 | 0 | 1 | 0 | 0 | 0 | 0 | 0 | 0 | 0 |
| Intra Prediction Mode | 53 | 54 | 55 | 56 | 57 | 58 | 59 | 60 | 61 | 62 | 63 | 64 | 65 | 66 | | | | |
| vertical direction transform set | 2 | 2 | 1 | 0 | 1 | 0 | 1 | 0 | 1 | 0 | 1 | 0 | 1 | 0 | | | | |
| horizontal direction transform set | 0 | 0 | 1 | 0 | 1 | 0 | 1 | 0 | 1 | 0 | 1 | 0 | 1 | 0 | | | | |

Diagonal        Horizontal        Vertical

FIG. 19
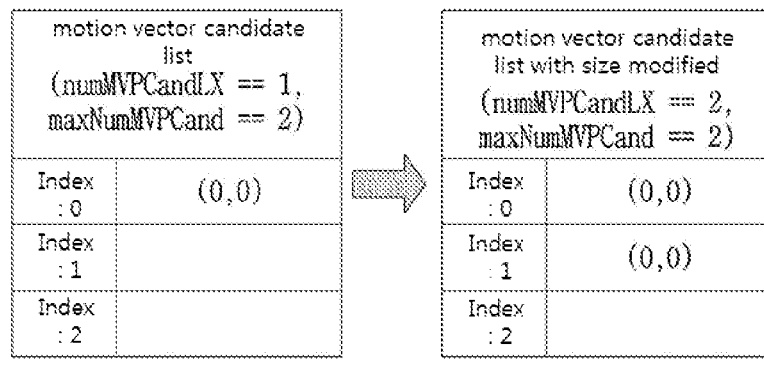
(a)
(b)
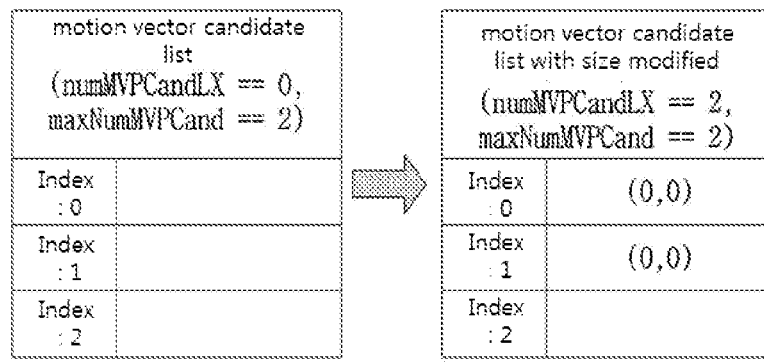
(c)

FIG. 20

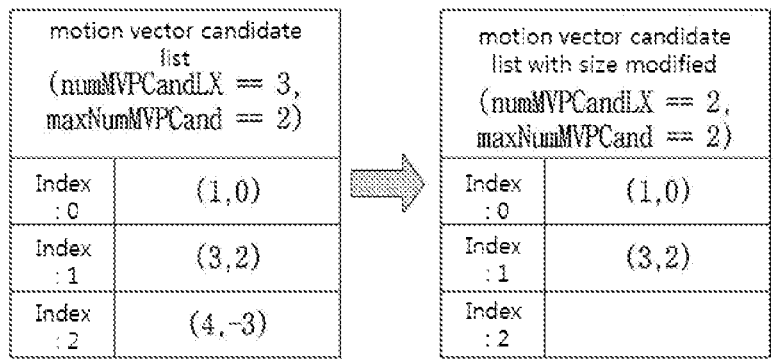

FIG. 21

| motion vector candidate index | motion vector candidate list | | motion vector | | inter prediction indicator |
|---|---|---|---|---|---|
| | first motion vector candidate | second motion vector candidate | first motion vector | second motion vector | |
| 0 | mvLXA | -- | mvLXA + MVD | -- | PRED_LX |
| 1 | mvLXB | -- | mvLXB + MVD | -- | PRED_LX |
| 2 | mvLXCol | -- | mvLXCol + MVD | -- | PRED_LX |
| 3 | mvZero | -- | mvZero + MVD | -- | PRED_LX |
| 4 | mvLXA | mvLXB | mvLXA + MVD | mvLXB | PRED_BI_LX |
| 5 | mvLXB | mvLXA | mvLXB + MVD | mvLXA | PRED_BI_LX |
| 6 | mvLXA | mvLXCol | mvLXA + MVD | mvLXCol | PRED_BI_LX |
| 7 | mvLXA | mvLXCol | mvLXA | mvLXCol + MVD | PRED_BI_LX |
| 8 | mvLXA | mvZero | mvLXA + MVD | mvZero | PRED_BI_LX |
| 9 | mvLXA | mvZero | mvLXA | mvZero + MVD | PRED_BI_LX |
| 10 | mvLXB | mvLXCol | mvLXB + MVD | mvLXCol | PRED_BI_LX |
| 11 | mvLXB | mvLXCol | mvLXB | mvLXCol + MVD | PRED_BI_LX |
| 12 | mvLXB | mvZero | mvLXB + MVD | mvZero | PRED_BI_LX |
| 13 | mvLXB | mvZero | mvLXB | mvZero + MVD | PRED_BI_LX |

FIG. 24a

```
}else{
    if(slice_type == B)
        inter_pred_idc[x0][y0]                                          ae(v)
    if(inter_pred_idc[x0][y0] != PRED_L1 ) {
        if(num_ref_idx_l0_active_minus1 >0)
            ref_idx_l0[x0][y0]                                          ae(v)
        mvd_coding(x0,y0,0)
        mvp_l0_idx[x0][y0]                                              ae(v)
        wf_l0[x0][y0]                                                   ae(v)
        offset_l0[x0][y0]                                               ae(v)
    }
    if(inter_pred_idc[x0][y0] != PRED_L0){
        if(num_ref_idx_l1_active_minus1>0)
            ref_idx_l1[x0][y0]                                          ae(v)
        if(mvd_l1_zero_flag && inter_pred_idc[x0][y0] == PRED_BI){
            MvdL1[x0][y0][0] = 0
            MvdL1[x0][y0][1] = 0
        }else
            mvd_coding(x0,y0,1)
        mvp_l1_idx[x0][y0]                                              ae(v)
        wf_l1[x0][y0]                                                   ae(v)
        offset_l1[x0][y0]                                               ae(v)
    }
```

| | |
|---|---|
| if(inter_pred_idc[x0][y0]!=PRED_BI && inter_pred_idc[x0][y0]!=PRED_L0 && inter_pred_idc[x0][y0]!=PRED_L1){ | |
|   if(num_ref_idx_l2_active_minus1 >0) | |
|     ref_idx_l2[x0][y0] | ae(v) |
|   mvd_coding(x0,y0,0) | |
|   mvp_l2_idx[x0][y0] | ae(v) |
|   wf_l2[x0][y0] | ae(v) |
|   offset_l2[ x0 ][ y0 ] | ae(v) |
| } | |
| if(inter_pred_idc[x0][y0]!=PRED_BI && inter_pred_idc[x0][y0]!=PRED_L0 && inter_pred_idc[x0][y0]!=PRED_L1 && inter_pred_idc[x0][y0]!=PRED_TRI) { | |
|   if(num_ref_idx_l3_active_minus1>0) | |
|     ref_idx_l3[x0][y0] | ae(v) |
|   mvd_coding(x0,y0,0) | |
|   mvp_l3_idx[x0][y0] | ae(v) |
|   wf_l3[x0][y0]I | ae(v) |
|   offset_l3[x0][y0] | ae(v) |
|   } | |
| } | |

| coding_tree_unit( ) { | Descriptor |
|---|---|
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag || slice_sao_chroma_flag ) | |
|     sao( xCtb >> CtbLog2SizeY, yCtb >> CtbLog2SizeY ) | |
|   ref_idx_granularity[ x0 ][ y0 ] | ae(v) |
|   coding_quadtree( xCtb, yCtb, CtbLog2SizeY, 0 ) | |
| } | |

IMAGE ENCODING/DECODING METHOD AND RECORDING MEDIUM THEREFOR

CROSS REFERENCE TO RELATED APPLICATIONS

This application is a U.S. National Stage Application of International Application No. PCT/KR2017/007416, filed on Jul. 11, 2017, which claims the benefit under 35 USC 119(a) and 365(b) of Korean Patent Application No. 10-2016-0087896, filed on Jul. 12, 2016, in the Korean Intellectual Property Office.

TECHNICAL FIELD

The present invention relates to a method and apparatus for encoding/decoding a video. More particularly, the present invention relates to a method and apparatus for encoding and decoding a video using granularity information.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

In conventional video encoding and decoding methods, there is a limit to improving encoding efficiency since information about motion compensation has to be encoded and decoded for all coding units (CUs) or for all prediction units (PUs).

In addition, in conventional video encoding and decoding methods, information about motion compensation may vary in all CUs or in all PUs, thus a memory bandwidth required for performing inter prediction or motion compensation in an encoder and a decoder is increased.

DISCLOSURE

Technical Problem

The present invention may provide a method and apparatus for encoding/decoding information about motion compensation that is commonly applied to a specific region to improve encoding/decoding efficiency of a picture.

The present invention may provide a method and apparatus for entropy encoding information about motion compensation that is commonly applied to a specific region to decrease a memory bandwidth required for performing inter prediction or motion compensation in a video encoder and decoder.

Technical Solution

A video decoding method according to the present invention, the method including: obtaining granularity information; determining a sharing region based on the granularity information; and generating a prediction block of a current block by using motion information of the sharing region when the current block corresponds to the sharing region.

In the video decoding method, the granularity information may be information representing a predetermined block size or a predetermined block depth.

In the video decoding method, the determining of the sharing region may include determining a region of at least one block having a block size smaller than the predetermined block size represented by the granularity information, as the sharing region.

In the video decoding method, the determining of the sharing region may include determining a region of at least one block having a block depth deeper than the predetermined block depth represented by the granularity information, as the sharing region.

In the video decoding method, the motion information of the sharing region may be motion information that is commonly applied to at least one block corresponding to the sharing region.

In the video decoding method, the motion information of the sharing region may be determined based on a predefined value.

In the video decoding method, the motion information of the sharing region may be entropy decoded at any one level of a video parameter set, a sequence parameter set, a picture parameter set, an adaptation parameter set, a slice header, a coding tree unit (CTU), and a coding unit (CU).

In the video decoding method, the motion information of the sharing region may include a plurality of motion vector candidate lists and information about a weighted sum, and the prediction block of the current block may be generated by applying the information about the weighted sum to a plurality of prediction blocks generated based on the plurality of motion vector candidate lists.

A video encoding method according to the present invention, the method including: determining a sharing region; generating a prediction block of a current block by using motion information of the sharing region when the current block corresponds to the sharing region, and encoding granularity information of the determined sharing region.

In the video encoding method, the granularity information may be information representing a predetermined block size or a predetermined bloc depth.

In the video encoding method, the motion information of the sharing region may be motion information that is commonly applied to at least one block corresponding to the sharing region.

In the video encoding method, the motion information of the sharing region may be determined based on a predefined value.

In the video encoding method, the motion information of the sharing region may be encoded at any one level of a video parameter set, a sequence parameter set, a picture parameter set, an adaptation parameter set, a slice header, a coding tree unit (CTU), and a coding unit (CU).

In the video encoding method, the motion information of the sharing region may include a plurality of motion vector candidate lists and information about a weighted sum, and the prediction block of the current block may be generated by applying the information about the weighted sum to a plurality of prediction blocks generated based on the plurality of motion vector candidate lists.

A video decoding apparatus according to the present invention, the apparatus including: an entropy decoding unit obtaining granularity information; and an inter prediction unit determining a sharing region based on the granularity information, and generating a prediction block of a current block by using motion information of the sharing region when the current block corresponds to the sharing region.

A video encoding apparatus according to the present invention, the apparatus including: an inter prediction unit determining a sharing region, and generating a prediction block of a current block by using motion information of the sharing region when the current block corresponds to the sharing region; and an entropy encoding unit encoding granularity information of the determined sharing region.

A recording medium storing a bit stream generated by a video encoding method according to the present invention, wherein the method include: determining a sharing region; and generating a prediction block of a current block by using motion information of the sharing region when the current block corresponds to the sharing region; and encoding granularity information of the determined sharing region.

Advantageous Effects

In the present invention, there is provided a method and apparatus for encoding/decoding information about motion compensation that is commonly applied to a specific region to improve encoding/decoding efficiency of a picture.

In the present invention, there is provided a method and apparatus for entropy encoding information about motion compensation that is commonly applied to a specific region to decrease a memory bandwidth required for performing inter prediction or motion compensation in a video encoder and decoder.

DESCRIPTION OF DRAWINGS

FIG. 7 is a view for explaining an embodiment of a process of inter prediction.

FIG. 8 is a view for explaining transform sets according to intra-prediction modes.

FIG. 19 is a view showing an example of adding a motion vector having a predetermined value to the motion vector candidate list.

FIG. 20 a view showing an example of removing a motion vector candidate from the motion vector candidate list.

FIG. 21 a view showing an embodiment of the motion vector candidate list.

FIG. 24 is a view showing an example of a syntax of information about motion compensation.

FIG. 25 is a view showing an example of a syntax of granularity information.

MODE FOR INVENTION

Figure 1:
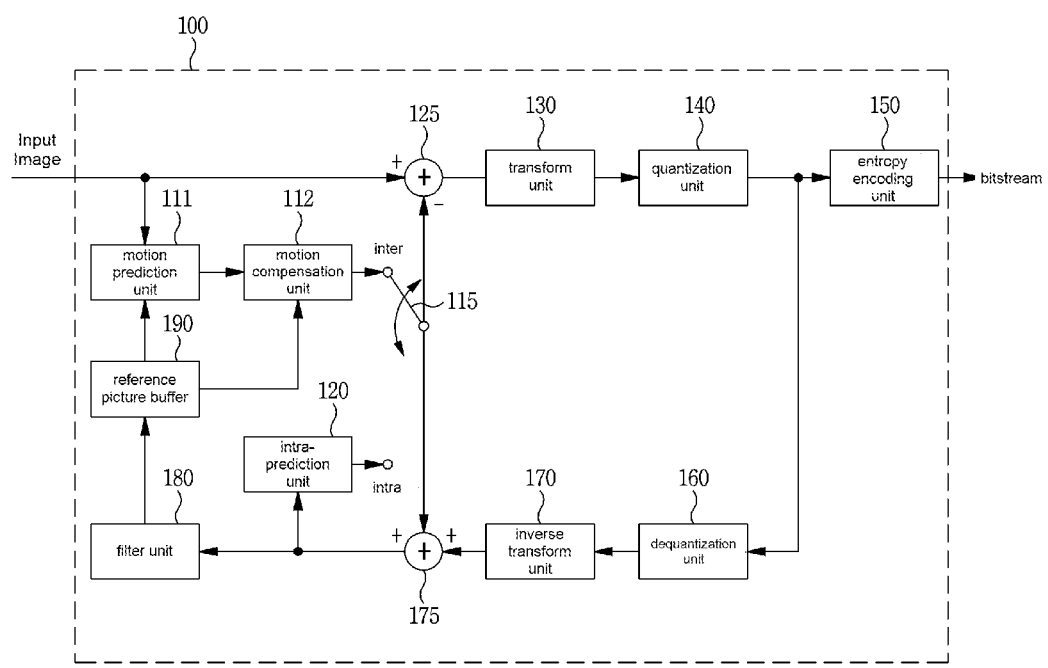
FIG. 1 is a block diagram showing configurations of an encoding apparatus according to an embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

Term Description

Encoder: may mean an apparatus performing encoding.

Decoder: may mean an apparatus performing decoding.

Parsing: may mean determination of a value of a syntax element by performing entropy decoding, or may mean the entropy decoding itself.

Block: may mean a sample of an M×N matrix. Here, M and N are positive integers, and the block may mean a sample matrix in a two-dimensional form.

Sample: is a basic unit of a block, and may indicate a value ranging 0 to 2 Bd−1 depending on the bit depth ($B_d$). The sample may mean a pixel in the present invention.

Unit: may mean a unit of encoding and decoding of an image. In encoding and decoding an image, the unit may be an area generated by partitioning one image. In addition, the unit may mean a subdivided unit when one image is partitioned into subdivided units during encoding or decoding. In encoding and decoding an image, a predetermined process for each unit may be performed. One unit may be partitioned into sub units that have sizes smaller than the size of the unit. Depending on functions, the unit may mean a block, a macroblock, a coding tree unit, a coding tree block, a coding unit, a coding block, a prediction unit, a prediction block, a transform unit, a transform block, etc. In addition, in order to distinguish a unit from a block, the unit may include a luma component block, a chroma component block of the luma component block, and a syntax element of each color component block. The unit may have various sizes and shapes, and particularly, the shape of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Reconstructed Neighbor Unit: may mean a reconstructed unit that is previously spatially/temporally encoded or decoded, and the reconstructed unit is adjacent to an encoding/decoding target unit. Here, a reconstructed neighbor unit may mean a reconstructed neighbor block.

Neighbor Block: may mean a block adjacent to an encoding/decoding target block. The block adjacent to the encoding/decoding target block may mean a block having a boundary being in contact with the encoding/decoding target block. The neighbor block may mean a block located at an adjacent vertex of the encoding/decoding target block. The neighbor block may mean a reconstructed neighbor block.

Unit Depth: may mean a partitioned degree of a unit. In a tree structure, a root node may be the highest node, and a leaf node may be the lowest node.

Symbol: may mean a syntax element of the encoding/decoding target unit, a coding parameter, a value of a transform coefficient, etc.

Parameter Set: may mean header information in a structure of the bitstream. The parameter set may include at least one of a video parameter set, a sequence parameter set, a picture parameter set, or an adaptation parameter set. In addition, the parameter set may mean slice header information and tile header information, etc.

Bitstream: may mean a bit string including encoded image information.

Prediction Unit: may mean a basic unit when performing inter prediction or intra prediction, and compensation for the prediction. One prediction unit may be partitioned into a plurality of partitions. In this case, each of the plurality of partitions may be a basic unit while performing the predictions and the compensation, and each partition partitioned from the prediction unit may be a prediction unit. In addition, one prediction unit may be partitioned into a plurality of small prediction units. A prediction unit may have various sizes and shapes, and particularly, the shape of the prediction unit may be a two-dimensional geometrical figure such as a rectangular shape, a square shape, a trapezoid shape, a triangular shape, a pentagonal shape, etc.

Prediction Unit Partition: may mean the shape of a partitioned prediction unit.

Reference Picture List: may mean a list including at least one reference picture that is used for inter prediction or motion compensation. Types of the reference picture list may be List Combined (LC), List 0 (L0), List 1 (L1), List 2 (L2), List 3 (L3), etc. At least one reference picture list may be used for inter prediction.

Inter-Prediction Indicator: may mean one of the inter-prediction direction (one-way directional prediction, bidirectional prediction, etc.) of an encoding/decoding target block in a case of inter prediction, the number of reference pictures used for generating a prediction block by the encoding/decoding target block, and the number of reference blocks used for performing inter prediction or motion compensation by the encoding/decoding target block.

Reference Picture Index: may mean an index of a specific reference picture in the reference picture list.

Reference Picture: may mean a picture to which a specific unit refers for inter prediction or motion compensation. A reference image may be referred to as the reference picture.

Motion Vector: is a two-dimensional vector used for inter prediction or motion compensation, and may mean an offset between an encoding/decoding target picture and the reference picture. For example, (mvX, mvY) may indicate the motion vector, mvX may indicate a horizontal component, and mvY may indicate a vertical component.

Motion Vector Candidate: may mean a unit that becomes a prediction candidate when predicting the motion vector, or may mean a motion vector of the unit.

Motion Vector Candidate List: may mean a list configured by using the motion vector candidate.

Motion Vector Candidate Index: may mean an indicator that indicates the motion vector candidate in the motion vector candidate list. The motion vector candidate index may be referred to as an index of a motion vector predictor.

Motion Information: may mean the motion vector, the reference picture index, and inter-prediction indicator as well as information including at least one of reference picture list information, the reference picture, the motion vector candidate, the motion vector candidate index, etc.

Merge Candidate List: may mean a list configured by using the merge candidate.

Merge Candidate may include a spatial merge candidate, a temporal merge candidate, a combined merge candidate, a combined bi-prediction merge candidate, a zero merge candidate, etc. The merge candidate may include motion information such as prediction type information, a reference picture index for each list, a motion vector, etc.

Merge Index: may mean information indicating the merge candidate in the merge candidate list. In addition, the merge index may indicate a block, which derives the merge candidate, among reconstructed blocks spatially/temporally adjacent to the current block. In addition, the merge index may indicate at least one of pieces of motion information of the merge candidate.

Transform Unit: may mean a basic unit when performing encoding/decoding of a residual signal, similar to transform, inverse transform, quantization, dequantization, and transform coefficient encoding/decoding. One transform unit may be partitioned into a plurality of small transform units. The transform unit may have various sizes and shapes. Particularly, the shape of the transform unit may be a two-dimensional geometrical figure such as a rectangular shape, a square shape, a trapezoid shape, a triangular shape, a pentagonal shape, etc.

Scaling: may mean a process of multiplying a factor to a transform coefficient level, and as a result, a transform coefficient may be generated. The scaling may be also referred to as dequantization.

Quantization Parameter: may mean a value used in scaling the transform coefficient level during quantization and dequantization. Here, the quantization parameter may be a value mapped to a step size of the quantization.

Delta Quantization Parameter: may mean a difference value between a predicted quantization parameter and a quantization parameter of the encoding/decoding target unit.

Scan: may mean a method of sorting coefficient orders within a block or a matrix. For example, sorting a two-dimensional matrix into a one-dimensional matrix may be referred to as scanning, and sorting a one-dimensional matrix into a two-dimensional matrix may be referred to as scanning or inverse scanning.

Transform Coefficient: may mean a coefficient value generated after performing a transform. In the present invention, a quantized transform coefficient level that is a transform coefficient to which the quantization is applied may be referred to as the transform coefficient.

Non-zero Transform Coefficient: may mean a transform coefficient in which a value thereof is not 0, or may mean a transform coefficient level in which a value thereof is not 0.

Quantization Matrix: may mean a matrix used in quantization and dequantization in order to enhance subject quality or object quality of an image. The quantization matrix may be referred to as a scaling list.

Quantization Matrix Coefficient: may mean each element of a quantization matrix. The quantization matrix coefficient may be referred to as a matrix coefficient.

Default Matrix: may mean a predetermined quantization matrix that is defined in the encoder and the decoder in advance.

Non-default Matrix: may mean a quantization matrix that is transmitted/received by a user without being previously defined in the encoder and the decoder.

Coding Tree Unit: may be composed of one luma component (Y) coding tree unit and related two chroma components (Cb, Cr) coding tree units. Each coding tree unit may be partitioned by using at least one partition method such as a quad tree, a binary tree, etc. to configure sub units such as coding units, prediction units, transform units, etc. The coding tree unit may be used as a term for indicating a pixel block that is a processing unit in decoding/encoding process of an image, like partition of an input image.

Coding Tree Block: may be used as a term for indicating one of the Y coding tree unit, the Cb coding tree unit, and the Cr coding tree unit.

FIG. 1 is a block diagram showing configurations of an encoding apparatus according to an embodiment of the present invention.

The encoding apparatus 100 may be a video encoding apparatus or an image encoding apparatus. A video may include one or more images. The encoding apparatus 100 may encode the one or more images of the video in order of time.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

The encoding apparatus 100 may encode an input picture in an intra mode or an inter mode or both. In addition, the encoding apparatus 100 may generate a bitstream by encoding the input picture, and may output the generated bitstream. When the intra mode is used as a prediction mode, the switch 115 may be switched to intra. When the inter mode is used as a prediction mode, the switch 115 may be switched to inter. Here, the intra mode may be referred to as an intra-prediction mode, and the inter mode may be referred to as an inter-prediction mode. The encoding apparatus 100 may generate a prediction block of an input block of the input picture. In addition, after generating the prediction block, the encoding apparatus 100 may encode residuals between the input block and the prediction block. The input picture may be referred to as a current image that is a target of current encoding. The input block may be referred to as a current block or as an encoding target block that is a target of the current encoding.

When the prediction mode is the intra mode, the intra-prediction unit 120 may use a pixel value of a previously encoded block, which is adjacent to the current block, as a reference pixel. The intra-prediction unit 120 may perform spatial prediction by using the reference pixel, and may generate prediction samples of the input block by using the spatial prediction. Here, intra prediction may mean intra-frame prediction.

When the prediction mode is the inter mode, the motion prediction unit 111 may search for a region that is optimally matched with the input block from a reference picture in a motion predicting process, and may derive a motion vector by using the searched region. The reference picture may be stored in the reference picture buffer 190.

The motion compensation unit 112 may generate the prediction block by performing motion compensation using the motion vector. Here, the motion vector may be a two-dimensional vector that is used for inter prediction. In addition, the motion vector may indicate offset between the current picture and the reference picture. Here, inter prediction may mean inter-frame prediction.

When a value of the motion vector is not an integer, the motion prediction unit 111 and the motion compensation unit 112 may generate the prediction block by applying an interpolation filter to a partial region in the reference picture. In order to perform inter prediction or motion compensation, on the basis of the coding unit, it is possible to determine which methods the motion prediction and compensation methods of a prediction unit in the coding unit uses among the skip mode, the merge mode, the AMVP mode, and a current picture reference mode. Inter prediction or motion compensation may be performed according to each mode. Here, the current picture reference mode may mean a prediction mode using a pre-reconstructed region of a current picture having an encoding target block. In order to specify the pre-reconstructed region, a motion vector for the current picture reference mode may be defined. Whether the encoding target block is encoded in the current picture reference mode may be encoded by using a reference picture index of the encoding target block.

The subtractor 125 may generate a residual block by using the residuals between the input block and the prediction block. The residual block may be referred to as a residual signal.

The transform unit 130 may generate a transform coefficient by transforming the residual block, and may output the transform coefficient. Here, the transform coefficient may be a coefficient value generated by transforming the residual block. In a transform skip mode, the transform unit 130 may skip the transforming of the residual block.

A quantized transform coefficient level may be generated by applying quantization to the transform coefficient. Hereinafter, the quantized transform coefficient level may be referred to as the transform coefficient in the embodiment of the present invention.

The quantization unit 140 may generate the quantized transform coefficient level by quantizing the transform coefficient depending on the quantization parameter, and may output the quantized transform coefficient level. Here, the quantization unit 140 may quantize the transform coefficient by using a quantization matrix.

The entropy encoding unit 150 may generate the bitstream by performing entropy encoding according to the probability distribution, on values calculated by the quantization unit 140 or on coding parameter values calculated in an encoding process, etc., and may output the generated bitstream. The entropy encoding unit 150 may perform the entropy encoding on information for decoding an image, and on information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential Golomb, context-adaptive variable length coding (CAVLC), and context-adaptive binary arithmetic coding (CABAC). For example, the entropy encoding unit 150 may perform the entropy encoding by using a variable length coding/code (VLC) table. In addition, the entropy encoding unit 150 may derive a binarization method of the target symbol and a probability model of the target symbol/ bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional form coefficient may be changed into the one-dimensional vector form by scanning the coefficient of the block with up-right scanning. According to the size of the transform unit and the intra-prediction mode, instead of the up-right scanning, it is possible to use vertical direction scanning for scanning the two-dimensional block form coefficient in a column direction, and horizontal direction scanning for scanning the two-dimensional block form coefficient in a row direction. That is, it is possible to determine which scanning method among up-right scanning, vertical direction scanning, and horizontal direction scanning is to be used depending on the size of the transform unit and the intra-prediction mode.

The coding parameter may include information, such as the syntax element, which is encoded by the encoder and is transmitted to the decoder, and may include information that may be derived in the encoding or decoding process. The coding parameter may mean information that is necessary to encode or decode an image. For example, the coding parameter may include at least one value or combined form of the block size, the block depth, the block partition information, the unit size, the unit depth, the unit partition information, the partition flag of a quad-tree form, the partition flag of a binary-tree form, the partition direction of a binary-tree form, the intra-prediction mode, the intra-prediction direction, the reference sample filtering method, the prediction block boundary filtering method, the filter tap, the filter coefficient, the inter-prediction mode, the motion information, the motion vector, the reference picture index, the inter-prediction direction, the inter-prediction indicator, the reference picture list, the motion vector predictor, the motion vector candidate list, the information about whether or not the motion merge mode is used, the motion merge candidate, motion merge candidate list, the information about whether or not the skip mode is used, interpolation filter type, the motion vector size, accuracy of motion vector representation, the transform type, the transform size, the information about whether additional (secondary) transform is used, the information about whether or not a residual signal is present, the coded block pattern, the coded block flag, the quantization parameter, the quantization matrix, the filter information within a loop, the information about whether or not a filter is applied within a loop, the filter coefficient within a loop, binarization/inverse binarization method, the context model, the context bin, the bypass bin, the transform coefficient, transform coefficient level, transform coefficient level scanning method, the image display/output order, slice identification information, slice type, slice partition information, tile identification information, tile type, tile partition information, the picture type, bit depth, and the information of a luma signal or a chroma signal.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal of a block unit.

When the encoding apparatus 100 performs encoding by using inter prediction, the encoded current picture may be used as a reference picture for another image(s) that will be processed thereafter. Accordingly, the encoding apparatus 100 may decode the encoded current picture, and may store the decoded image as the reference picture. In order to perform the decoding, dequantization and inverse transform may be performed on the encoded current picture.

A quantized coefficient may be dequantized by the dequantization unit 160, and may be inversely transformed by the inverse transform unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed picture. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block on the basis of the pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel.

The sample adaptive offset may add an optimum offset value to the pixel value in order to compensate for an encoding error. The sample adaptive offset may correct an offset between the deblocking filtered image and the original picture for each pixel. In order to perform the offset correction on a specific picture, it is possible to use a method of applying an offset in consideration of edge information of each pixel or a method of partitioning pixels of an image into the predetermined number of regions, determining a region to be subjected to perform an offset correction, and applying the offset correction to the determined region.

The adaptive loop filter may perform filtering on the basis of a value obtained by comparing the reconstructed picture and the original picture. Pixels of an image may be partitioned into predetermined groups, one filter being applied to each of the groups is determined, and different filtering may be performed at each of the groups. Information about whether or not the adaptive loop filter is applied to the luma signal may be transmitted for each coding unit (CU). A shape and a filter coefficient of an adaptive loop filter being applied to each block may vary. In addition, an adaptive loop filter having the same form (fixed form) may be applied regardless of characteristics of a target block.

The reconstructed block that passed the filter unit 180 may be stored in the reference picture buffer 190.

Figure 2:
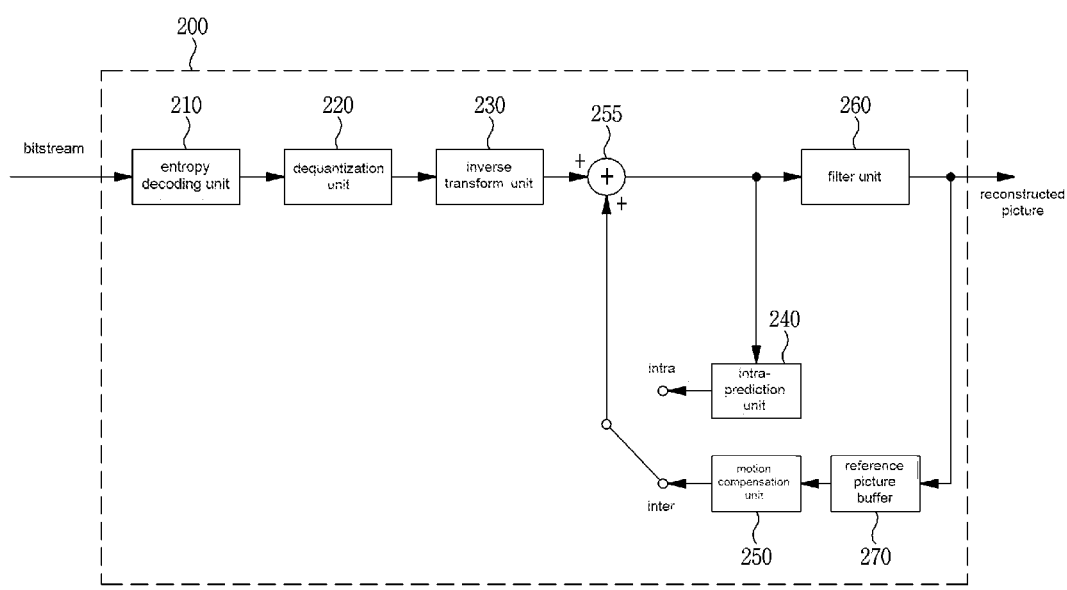
FIG. 2 is a block diagram showing configurations of a decoding apparatus according to an embodiment of the present invention.

FIG. 2 is a block diagram showing configurations of a decoding apparatus according to an embodiment of the present invention.

The decoding apparatus 200 may be a video decoding apparatus or an image decoding apparatus.

Referring to FIG. 2, the decoding apparatus 200 may include an entropy decoding unit 210, a dequantization unit 220, an inverse transform unit 230, an intra-prediction unit 240, a motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed picture by performing decoding, and may output the reconstructed picture.

When a prediction mode used in decoding is the intra mode, the switch may be switched to intra. When the prediction mode used in decoding is the inter mode, the switch may be switched to inter.

The decoding apparatus 200 may obtain the reconstructed residual block from the inputted bitstream, and may generate the prediction block. When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by performing entropy decoding on the bitstream according to the probability distribution. The generated symbols may include a symbol having a quantized transform coefficient level. Here, a method of entropy decoding may be similar to the above-described method of the entropy encoding. For example, the method of the entropy decoding may be an inverse process of the above-described method of the entropy encoding.

In order to decode the transform coefficient level, the entropy decoding unit 210 may perform transform coefficient scanning, whereby the one-dimensional vector form coefficient can be changed into the two-dimensional block form. For example, the one-dimensional vector form coefficient may be changed into a two-dimensional block form by scanning the coefficient of the block with up-right scanning According to the size of the transform unit and the intra-prediction mode, instead of up-right scanning, it is possible to use vertical direction scanning and horizontal direction scanning That is, it is possible to determine which scanning method among up-right scanning, vertical direction scanning, and horizontal direction scanning is used depending on the size of the transform unit and the intra-prediction mode.

The quantized transform coefficient level may be dequantized by the dequantization unit 220, and may be inversely transformed by the inverse transform unit 230. The quantized transform coefficient level is dequantized and is inversely transformed so as to generate a reconstructed residual block. Here, the dequantization unit 220 may apply the quantization matrix to the quantized transform coefficient level.

When the intra mode is used, the intra-prediction unit 240 may generate a prediction block by performing the spatial prediction that uses the pixel value of the previously decoded block that is adjacent to the decoding target block.

When the inter mode is used, the motion compensation unit 250 may generate the prediction block by performing motion compensation that uses both the motion vector and the reference picture stored in the reference picture buffer 270. When the value of the motion vector is not an integer, the motion compensation unit 250 may generate the prediction block by applying the interpolation filter to the partial region in the reference picture. In order to perform motion compensation, on the basis of the coding unit, it is possible to determine which method the motion compensation method of a prediction unit in the coding unit uses among the skip mode, the merge mode, the AMVP mode, and a current picture reference mode. In addition, it is possible to perform motion compensation depending on the modes. Here, the current picture reference mode may mean a prediction mode using a previously reconstructed region within the current picture having the decoding target block. The previously reconstructed region may not be adjacent to the decoding target block. In order to specify the previously reconstructed region, a fixed vector may be used for the current picture reference mode. In addition, a flag or an index indicating whether or not the decoding target block is a block encoded in the current picture reference mode may be signaled, and may be derived by using the reference picture index of the decoding target block. The current picture for the current picture reference mode may exist at a fixed position (for example, a position of a reference picture index is 0 or the last position) within the reference picture list for the decoding target block. In addition, it is possible for the current picture to be variably positioned within the reference picture list, and to this end, it is possible to signal the reference picture index indicating a position of the current picture. Here, signaling a flag or an index may mean that the encoder entropy encodes the corresponding flag or index and includes into a bitstream, and that the decoder entropy decodes the corresponding flag or index from the bitstream.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed picture. The filter unit 260 may output the reconstructed picture. The reconstructed picture may be stored in the reference picture buffer 270, and may be used for inter prediction.

Figure 3:
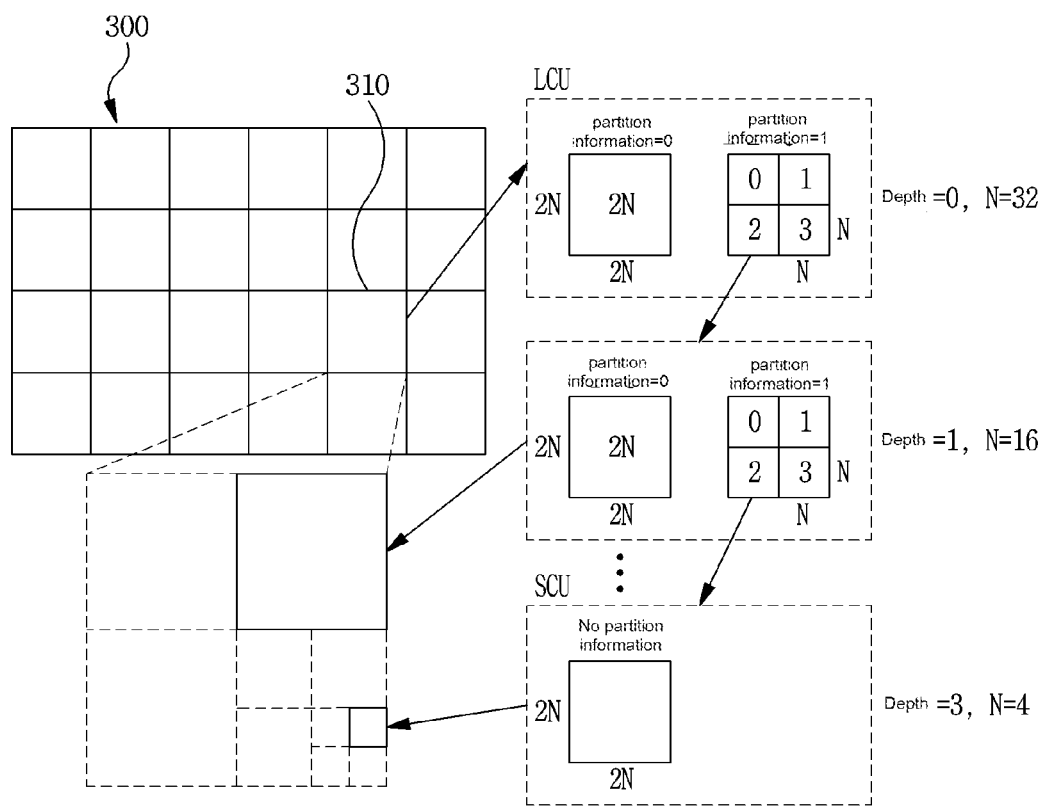
FIG. 3 is a view schematically showing a partition structure of an image when encoding and decoding the image.

FIG. 3 is a view schematically showing a partition structure of an image when encoding and decoding the image. FIG. 3 schematically shows an embodiment of partitioning one unit into a plurality of sub-units.

In order to efficiently partition an image, a coding unit (CU) may be used in encoding and decoding. Here, the coding unit may mean an encoding unit. The unit may be a combination of 1) a syntax element and 2) a block including image samples. For example, "partition of a unit" may mean "partition of a block relative to a unit". The block partition information may include information about the unit depth. Depth information may indicate the number of times a unit is partitioned or a partitioned degree of a unit or both.

Referring to FIG. 3, an image 300 is sequentially partitioned for each largest coding unit (LCU), and a partition structure is determined for each LCU. Here, the LCU and a coding tree unit (CTU) have the same meaning. One unit may have depth information based on a tree structure, and may be hierarchically partitioned. Each of the partitioned sub-units may have depth information. The depth information indicates the number of times a unit is partitioned or a partitioned degree of a unit or both, and thus, the depth information may include information about the size of the sub-unit.

The partition structure may mean distribution of a coding unit (CU) in the LCU 310. The CU may be a unit for efficiently encoding/decoding an image. The distribution may be determined on the basis of whether or not one CU will be partitioned in plural (a positive integer equal to or more than 2 including 2, 4, 8, 16, etc.). The width size and the height size of the partitioned CU may respectively be a half width size and a half height size of the original CU. Alternatively, according to the number of partitionings, the width size and the height size of the partitioned CU may respectively be smaller than the width size and the height size of the original CU. The partitioned CU may be recursively partitioned into a plurality of further partitioned CUs, wherein the further partitioned CU has a width size and a height size smaller than those of the partitioned CU in the same partition method.

Here, the partition of a CU may be recursively performed up to a predetermined depth. Depth information may be information indicating a size of the CU, and may be stored in each CU. For example, the depth of the LCU may be 0, and the depth of a smallest coding unit (SCU) may be a predetermined maximum depth. Here, the LCU may be a coding unit having a maximum size as described above, and the SCU may be a coding unit having a minimum size.

Whenever the LCU 310 begins to be partitioned, and the width size and the height size of the CU are decreased by the partitioning, the depth of a CU is increased by 1. In a case of a CU which cannot be partitioned, the CU may have a 2N×2N size for each depth. In a case of a CU that can be partitioned, the CU having a 2N×2N size may be partitioned into a plurality of N×N-size CUs. The size of N is reduced by half whenever the depth is increased by 1.

For example, when one coding unit is partitioned into four sub-coding units, a width size and a height size of one of the four sub-coding units may respectively be a half width size and a half height size of the original coding unit. For example, when a 32×32-size coding unit is partitioned into four sub-coding units, each of the four sub-coding units may have a 16×16 size. When one coding unit is partitioned into four sub-coding units, the coding unit may be partitioned in a quad-tree form.

For example, when one coding unit is partitioned into two sub-coding units, a width size or a height size of one of the two sub-coding units may respectively be a half width size or a half height size of the original coding unit. For example, when a 32×32-size coding unit is vertically partitioned into two sub-coding units, each of the two sub-coding units may have a 16×32 size. For example, when a 32×32-size coding unit is horizontally partitioned into two sub-coding units, each of the two sub-coding units may have a 32×16 size. When one coding unit is partitioned into two sub-coding units, the coding unit may be partitioned in a binary-tree form.

Referring to FIG. 3, the size of the LCU having a minimum depth of 0 may be 64×64 pixels, and the size of the SCU having a maximum depth of 3 may be 8×8 pixels. Here, a CU having 64×64 pixels, which is the LCU, may be denoted by a depth of 0, a CU having 32×32 pixels may be denoted by a depth of 1, a CU having 16×16 pixels may be denoted by a depth of 2, and a CU having 8×8 pixels, which is the SCU, may be denoted by a depth of 3.

In addition, information about whether or not a CU will be partitioned may be represented through partition information of a CU. The partition information may be 1 bit information. The partition information may be included in all CUs other than the SCU. For example, when a value of the partition information is 0, a CU may not be partitioned, and when a value of the partition information is 1, a CU may be partitioned.

Figure 4:
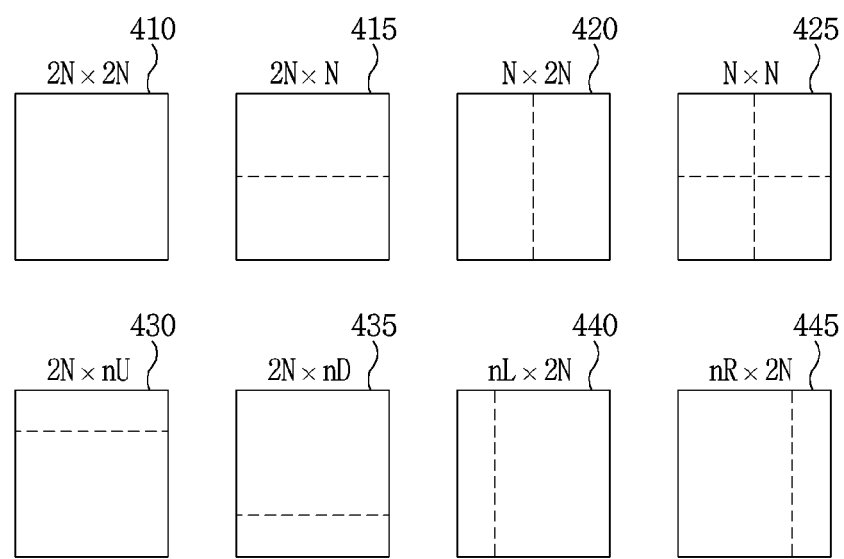
FIG. 4 is a view showing forms of a prediction unit (PU) that may be included in a coding unit (CU).

FIG. 4 is a view showing forms of a prediction unit (PU) that may be included in a coding unit (CU).

A CU that is no longer partitioned, from among CUs partitioned from the LCU, may be partitioned into at least one prediction unit (PU). This process may be also referred to as a partition.

The PU may be a basic unit for prediction. The PU may be encoded and decoded in any one of a skip mode, an inter mode, and an intra mode. The PU may be partitioned in various forms depending on the modes.

In addition, the coding unit may not be partitioned into a plurality of prediction units, and the coding unit and the prediction unit have the same size.

As shown in FIG. 4, in the skip mode, the CU may not be partitioned. In the skip mode, a 2N×2N mode 410 having the same size as a CU without partition may be supported.

In the inter mode, 8 partitioned forms may be supported within a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported. In the intra mode, the 2N×2N mode 410 and the N×N mode 425 may be supported.

One coding unit may be partitioned into one or more prediction units. One prediction unit may be partitioned into one or more sub-prediction units.

For example, when one prediction unit is partitioned into four sub-prediction units, a width size and a height size of one of the four sub-prediction units may be a half width size and a half height size of the original prediction unit. For example, when a 32×32-size prediction unit is partitioned into four sub-prediction units, each of the four sub-prediction units may have a 16×16 size. When one prediction unit is partitioned into four sub-prediction units, the prediction unit may be partitioned in the quad-tree form.

For example, when one prediction unit is partitioned into two sub-prediction units, a width size or a height size of one of the two sub-prediction units may be a half width size or a half height size of the original prediction unit. For example, when a 32×32-size prediction unit is vertically partitioned into two sub-prediction units, each of the two sub-prediction units may have a 16×32 size. For example, when a 32×32-size prediction unit is horizontally partitioned into two sub-prediction units, each of the two sub-prediction units may have a 32×16 size. When one prediction unit is partitioned into two sub-prediction units, the prediction unit may be partitioned in the binary-tree form.

Figure 5:
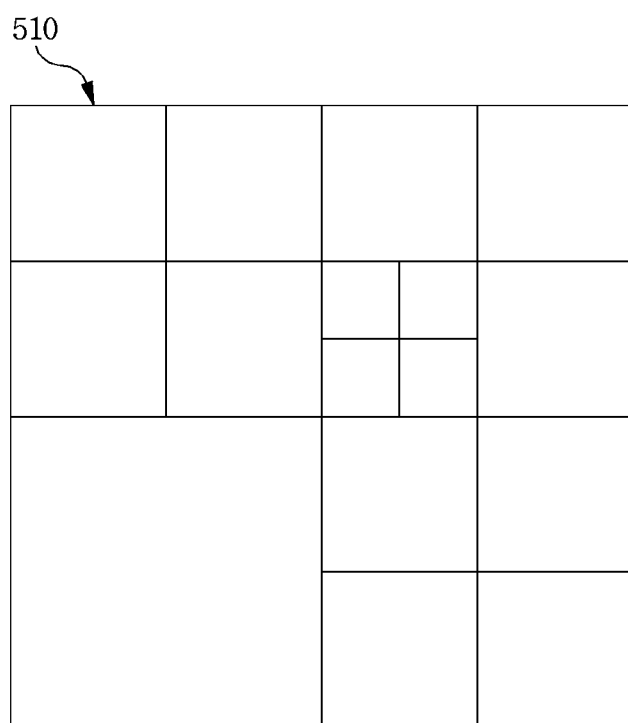
FIG. 5 is a view showing forms of a transform unit (TU) that may be included in a coding unit (CU).

FIG. 5 is a view showing forms of a transform unit (TU) that may be included in a coding unit (CU).

A transform unit (TU) may be a basic unit used for a transform, quantization, a reverse transform, and dequantization within a CU. The TU may have a square shape or a rectangular shape, etc. The TU may be dependently determined by a size of a CU or a form of a CU or both.

A CU that is no longer partitioned among CUs partitioned from the LCU may be partitioned into at least one TU. Here, the partition structure of the TU may be a quad-tree structure. For example, as shown in FIG. 5, one CU 510 may be partitioned once or more depending on the quad-tree structure. The case where one CU is partitioned at least once may be referred to as recursive partition. Through the partitioning, one CU 510 may be formed of TUs having various sizes. Alternatively, a CU may be partitioned into at least one TU depending on the number of vertical lines partitioning the CU or the number of horizontal lines partitioning the CU or both. The CU may be partitioned into TUs that are symmetrical to each other, or may be partitioned into TUs that are asymmetrical to each other. In order to partition the CU into TUs that are symmetrical to each other, information of a size/shape of the TU may be signaled, and may be derived from information of a size/shape of the CU.

In addition, the coding unit may not be partitioned into transform units, and the coding unit and the transform unit may have the same size.

One coding unit may be partitioned into at least one transform unit, and one transform unit may be partitioned into at least one sub-transform unit.

For example, when one transform unit is partitioned into four sub-transform units, a width size and a height size of one of the four sub-transform units may respectively be a half width size and a half height size of the original transform unit. For example, when a 32×32-size transform unit is partitioned into four sub-transform units, each of the four sub-transform units may have a 16×16 size. When one transform unit is partitioned into four sub-transform units, the transform unit may be partitioned in the quad-tree form.

For example, when one transform unit is partitioned into two sub-transform units, a width size or a height size of one of the two sub-transform units may respectively be a half width size or a half height size of the original transform unit. For example, when a 32×32-size transform unit is vertically partitioned into two sub-transform units, each of the two sub-transform units may have a 16×32 size. For example, when a 32×32-size transform unit is horizontally partitioned into two sub-transform units, each of the two sub-transform units may have a 32×16 size. When one transform unit is partitioned into two sub-transform units, the transform unit may be partitioned in the binary-tree form.

When performing transform, the residual block may be transformed by using at least one of predetermined transform methods. For example, the predetermined transform methods may include discrete cosine transform (DCT), discrete sine transform (DST), KLT, etc. Which transform method is applied to transform the residual block may be determined by using at least one of inter-prediction mode information of the prediction unit, intra-prediction mode information of the prediction unit, and size/shape of the transform block. Information indicating the transform method may be signaled.

Figure 6:
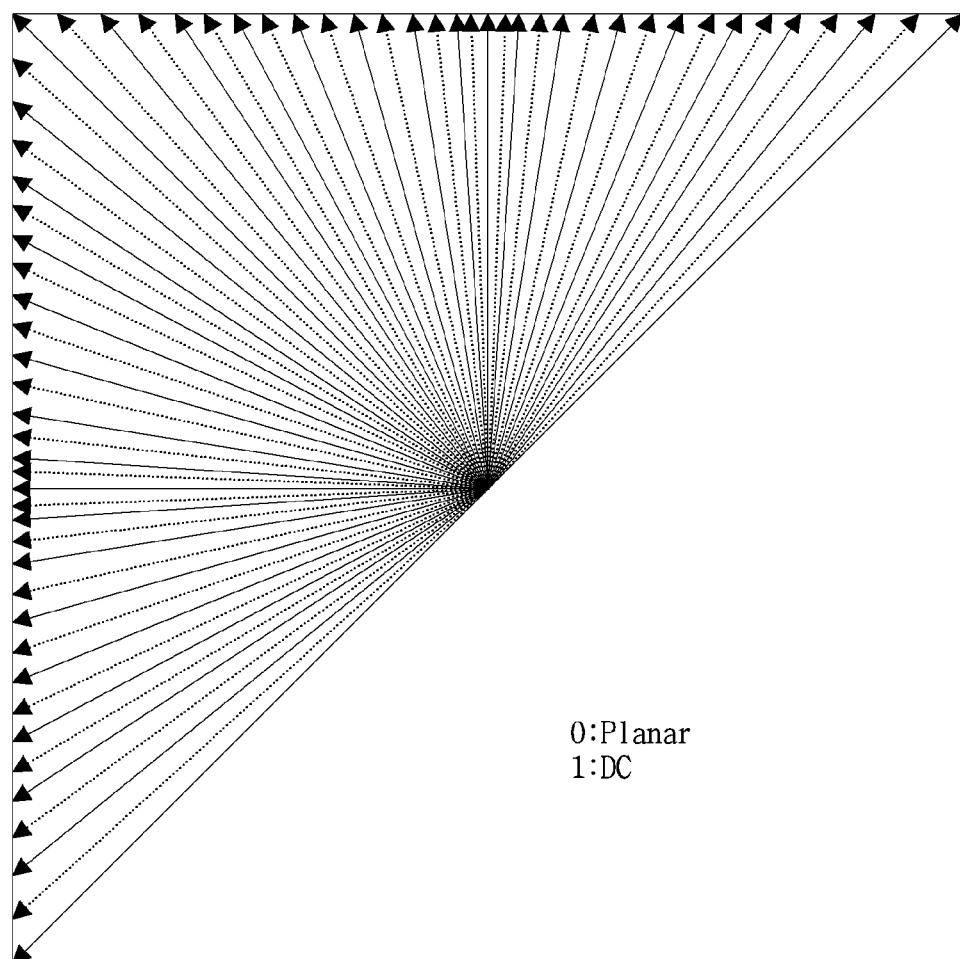
FIG. 6 is a view for explaining an embodiment of a process of intra prediction.

FIG. 6 is a view for explaining an embodiment of a process of intra prediction.

The intra-prediction mode may be a non-directional mode or a directional mode. The non-directional mode may be a DC mode or a planar mode. The directional mode may be a prediction mode having a particular direction or angle, and the number of directional modes may be M which is equal to or greater than one. The directional mode may be indicated as at least one of a mode number, a mode value, and a mode angle.

The number of intra-prediction modes may be N which is equal to or greater than one, including the non-directional and directional modes.

The number of intra-prediction modes may vary depending on the size of a block. For example, when the size is 4×4 or 8×8, the number may be 67, and when the size is 16×16, the number may be 35, and when the size is 32×32, the number may be 19, and when the size is 64×64, the number may be 7.

The number of intra-prediction modes may be fixed to N regardless of the size of a block. For example, the number may be fixed to at least one of 35 or 67 regardless of the size of a block.

The number of intra-prediction modes may vary depending on a type of a color component. For example, the number of prediction modes may vary depending on whether a color component is a luma signal or a chroma signal.

Intra encoding and/or decoding may be performed by using a sample value or an encoding parameter included in a reconstructed neighboring block.

For encoding/decoding a current block in intra prediction, whether or not samples included in a reconstructed neighboring block are available as reference samples of an encoding/decoding target block may be identified. When there are samples that cannot be used as reference samples of the encoding/decoding target block, sample values are copied and/or interpolated into the samples that cannot be used as the reference samples by using at least one of samples included in the reconstructed neighboring block, whereby the samples that cannot be used as reference samples can be used as the reference samples of the encoding/decoding target block.

In intra prediction, based on at least one of an intra-prediction mode and the size of the encoding/decoding target block, a filter may be applied to at least one of a reference sample or a prediction sample. Here, the encoding/decoding target block may mean a current block, and may mean at least one of a coding block, a prediction block, and a transform block. A type of a filter being applied to a reference sample or a prediction sample may vary depending on at least one of the intra-prediction mode or size/shape of the current block. The type of the filter may vary depending on at least one of the number of filter taps, a filter coefficient value, or filter strength.

In a non-directional planar mode among intra-prediction modes, when generating a prediction block of the encoding/decoding target block, a sample value in the prediction block may be generated by using a weighted sum of an upper reference sample of the current sample, a left reference sample of the current sample, an upper right reference sample of the current block, and a lower left reference sample of the current block according to the sample location.

In a non-directional DC mode among intra-prediction modes, when generating a prediction block of the encoding/decoding target block, it may be generated by an average value of upper reference samples of the current block and left reference samples of the current block. In addition, filtering may be performed on one or more upper rows and one or more left columns adjacent to the reference sample in the encoding/decoding block by using reference sample values.

In a case of multiple directional modes (angular mode) among intra-prediction modes, a prediction block may be generated by using the upper right and/or lower left reference sample, and the directional modes may have different direction. In order to generate a prediction sample value, interpolation of a real number unit may be performed.

In order to perform an intra-prediction method, an intra-prediction mode of a current prediction block may be predicted from an intra-prediction mode of a neighboring prediction block that is adjacent to the current prediction block. In a case of prediction the intra-prediction mode of the current prediction block by using mode information predicted from the neighboring intra-prediction mode, when the current prediction block and the neighboring prediction block have the same intra-prediction mode, information that the current prediction block and the neighboring prediction block have the same intra-prediction mode may be transmitted by using predetermined flag information. When the intra-prediction mode of the current prediction block is different from the intra-prediction mode of the neighboring prediction block, intra-prediction mode information of the encoding/decoding target block may be encoded by performing entropy encoding.

FIG. 7 is a view for explaining an embodiment of a process of inter prediction.

The quadrangular shapes shown in FIG. 7 may indicate images (or, pictures). Also, the arrows of FIG. 7 may indicate prediction directions. That is, images may be encoded or decoded or both according to prediction directions. Each image may be classified into an I-picture (intra picture), a P-picture (uni-predictive picture), a B-picture (bi-predictive picture), etc. according to encoding types. Each picture may be encoded and decoded depending on an encoding type of each picture.

When an image, which is an encoding target, is an I-picture, the image itself may be intra encoded without inter prediction. When an image, which is an encoding target, is a P-picture, the image may be encoded by inter prediction or motion compensation using a reference picture only in a forward direction. When an image, which is an encoding target, is a B-picture, the image may be encoded by inter prediction or motion compensation using reference pictures in both a forward direction and a reverse direction. Alternatively, the image may be encoded by inter prediction or motion compensation using a reference picture in one of a forward direction and a reverse direction. Here, when an inter-prediction mode is used, the encoder may perform inter prediction or motion compensation, and the decoder may perform motion compensation in response to the encoder. Images of the P-picture and the B-picture that are encoded or decoded or both by using a reference picture may be regarded as an image for inter prediction.

Hereinafter, inter prediction according to an embodiment will be described in detail.

Inter prediction or motion compensation may be performed by using both a reference picture and motion information. In addition, inter prediction may use the above described skip mode.

The reference picture may be at least one of a previous picture and a subsequent picture of a current picture. Here, inter prediction may predict a block of the current picture depending on the reference picture. Here, the reference picture may mean an image used in predicting a block. Here, an area within the reference picture may be specified by using a reference picture index (refIdx) indicating a reference picture, a motion vector, etc.

Inter prediction may select a reference picture and a reference block relative to a current block within the reference picture. A prediction block of the current block may be generated by using the selected reference block. The current block may be a block that is a current encoding or decoding target among blocks of the current picture.

Motion information may be derived from a process of inter prediction by the encoding apparatus 100 and the decoding apparatus 200. In addition, the derived motion information may be used in performing inter prediction. Here, the encoding apparatus 100 and the decoding apparatus 200 may enhance encoding efficiency or decoding efficiency or both by using motion information of a reconstructed neighboring block or motion information of a collocated block (col block) or both. The col block may be a block relative to a spatial position of the encoding/decoding target block within a collocated picture (col picture) that is previously reconstructed. The reconstructed neighboring block may be a block within a current picture, and a block that is previously reconstructed through encoding or decoding or both. In addition, the reconstructed block may be a block adjacent to the encoding/decoding target block or a block positioned at an outer corner of the encoding/decoding target block or both. Here, the block positioned at the outer corner of the encoding/decoding target block may be a block that is vertically adjacent to a neighboring block horizontally adjacent to the encoding/decoding target block. Alternatively, the block positioned at the outer corner of the encoding/decoding target block may be a block that is horizontally adjacent to a neighboring block vertically adjacent to the encoding/decoding target block.

The encoding apparatus 100 and the decoding apparatus 200 may respectively determine a block that exists at a position spatially relative to the encoding/decoding target block within the col picture, and may determine a predefined relative position on the basis of the determined block. The predefined relative position may be an inner position or an outer position or both of a block that exists at a position spatially relative to the encoding/decoding target block. In addition, the encoding apparatus 100 and the decoding apparatus 200 may respectively derive the col block on the basis of the determined predefined relative position. Here, the col picture may be one picture of at least one reference picture included in the reference picture list.

A method of deriving the motion information may vary according to a prediction mode of the encoding/decoding target block. For example, a prediction mode being applied for inter prediction may include an advanced motion vector prediction (AMVP), a merge mode, etc. Here, the merge mode may be referred to as a motion merge mode.

For example, when AMVP is applied as the prediction mode, the encoding apparatus 100 and the decoding apparatus 200 may respectively generate a motion vector candidate list by using a motion vector of the reconstructed neighboring block or a motion vector of the col block or both. The motion vector of the reconstructed neighboring block or the motion vector of the col block or both may be used as motion vector candidates. Here, the motion vector of the col block may be referred to as a temporal motion vector candidate, and the motion vector of the reconstructed neighboring block may be referred to as a spatial motion vector candidate.

The encoding apparatus 100 may generate a bitstream, and the bitstream may include a motion vector candidate index. That is, the encoding apparatus 100 may generate a bitstream by entropy encoding the motion vector candidate index. The motion vector candidate index may indicate an optimum motion vector candidate that is selected from motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index from the bitstream, and may select a motion vector candidate of a decoding target block among the motion vector candidates included in the motion vector candidate list by using the entropy decoded motion vector candidate index.

The encoding apparatus 100 may calculate a motion vector difference (MVD) between the motion vector and the motion vector candidate of the decoding target block, and may entropy encode the MVD. The bitstream may include the entropy encoded MVD. The MVD may be transmitted from the encoding apparatus 100 to the decoding apparatus 200 through the bitstream. Here, the decoding apparatus 200 may entropy decode the received MVD from the bitstream. The decoding apparatus 200 may derive a motion vector of the decoding target block through a sum of the decoded MVD and the motion vector candidate.

The bitstream may include a reference picture index indicating a reference picture, etc., and a reference picture index may be entropy encoded and transmitted from the encoding apparatus 100 to the decoding apparatus 200 through the bitstream. The decoding apparatus 200 may predict a motion vector of the decoding target block by using motion information of neighboring blocks, and may derive the motion vector of the decoding target block by using the predicted motion vector and the motion vector difference. The decoding apparatus 200 may generate the prediction block of the decoding target block on the basis of the derived motion vector and reference picture index information.

As another method of deriving the motion information, a merge mode is used. The merge mode may mean a merger of motions of a plurality of blocks. The merge mode may mean application of motion information of one block to another block. When the merge mode is applied, the encoding apparatus 100 and the decoding apparatus 200 may respectively generate a merge candidate list by using motion information of the reconstructed neighboring block or motion information of the col block or both. The motion information may include at least one of 1) the motion vector, 2) the reference picture index, and 3) the inter-prediction indicator. A prediction indicator may indicate a uni-direction (L0 prediction, L1 prediction) or a bi-direction.

Here, the merge mode may be applied to each CU or each PU. When the merge mode is performed at each CU or each PU, the encoding apparatus 100 may generate a bitstream by entropy decoding predefined information, and may transmit the bitstream to the decoding apparatus 200. The bitstream may include the predefined information. The predefined information may include: 1) a merge flag that is information indicating whether or not the merge mode is performed for each block partition; and 2) a merge index that is information to which a block among the neighboring blocks adjacent to the encoding target block is merged. For example, neighboring blocks adjacent to the encoding target block may include a left neighboring block of the encoding target block, an upper neighboring block of the encoding target block, a temporally neighboring block of the encoding target block, etc.

The merge candidate list may indicate a list storing motion information. In addition, the merge candidate list may be generated in advance of performing the merge mode. The motion information stored in the merge candidate list may be at least one of motion information of the neighboring block adjacent to the encoding/decoding target block, motion information of the collocated block relative to the encoding/decoding target block in the reference picture, motion information newly generated by a combination of motion information that exists in the merge motion candidate list in advance, and a zero merge candidate. Here, motion information of the neighboring block adjacent to the encoding/decoding target block may be referred to as a spatial merge candidate. Motion information of the collocated block relative to the encoding/decoding target block in the reference picture may be referred to as a temporal merge candidate.

A skip mode may be a mode applying the mode information of the neighboring block itself to the encoding/decoding target block. The skip mode may be one of modes used for inter prediction. When the skip mode is used, the encoding apparatus 100 may entropy encode information about motion information of which block is used as motion information of the encoding target block, and may transmit the information to the decoding apparatus 200 through a bitstream. The encoding apparatus 100 may not transmit other information, for example, syntax element information, to the decoding apparatus 200. The syntax element information may include at least one of motion vector difference information, a coded block flag, and a transform coefficient level.

A residual signal generated after intra or inter prediction may be transformed into a frequency domain through a transform process as a part of a quantization process. Here, a primary transform may use DCT type 2 (DCT-II) as well as various DCT, DST kernels. On a residual signal, these transform kernels may perform a separable transform performing a 1D transform in a horizontal and/or vertical direction, or may perform a 2D non-separable transform.

For example, DCT and DST types used in transform may use DCT-II, DCT-V, DCT-VIII, DST-I, and DST-VII as shown in following tables in a case of the 1D transform. For example, as shown in the table 1 and table 2, a DCT or DST type used in transform by composing a transform set may be derived.

TABLE 1

| Transform set | Transform |
| --- | --- |
| 0 | DST_VII, DCT-VIII |
| 1 | DST-VII, DST-I |
| 2 | DST-VII, DCT-V |

TABLE 2

| Transform set | Transform |
| --- | --- |
| 0 | DST_VII, DCT-VIII, DST-I |
| 1 | DST-VII, DST-I, DCT-VIII |
| 2 | DST-VII, DCT-V, DST-I |

For example, as shown in FIG. 8, according to an intra-prediction mode, different transform sets are defined for horizontal and vertical directions. Next, the encoder/decoder may perform transform and/or inverse transform by using an intra-prediction mode of a current encoding/decoding target block and transform of a relevant transform set. In this case, entropy encoding/decoding is not performed on the transform set, and the encoder/decoder may define the transform set according to the same rule. In this case, entropy encoding/decoding indicating which transform is used among transforms of the transform set may be performed. For example, when the size of a block is equal to or less than 64×64, three transform sets are composed as shown in table 2 according to an intra-prediction mode, and three transforms are used for each horizontal direction transform and vertical direction transform to combine and perform total nine multi-transform methods. Next, a residual signal is encoded/decoded by using the optimum transform method, whereby encoding efficiency can be enhanced. Here, in order to perform entropy encoding/decoding on information about which transform method is used among three transforms of one transform set, truncated unary binarization may be used. Here, for at least one of vertical transform and horizontal transform, entropy encoding/decoding may be performed on the information indicating which transform is used among transforms of a transform set.

Figure 9:
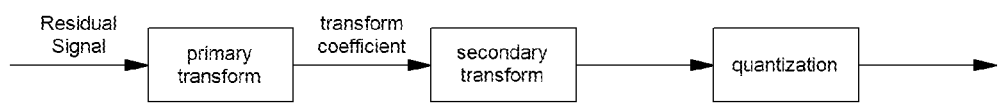
FIG. 9 is a view for explaining a process of transform.

After completing the above-described primary transform, the encoder may perform a secondary transform to increase energy concentration for transformed coefficients as shown in FIG. 9. The secondary transform may perform a separable transform performing a 1D transform in a horizontal and/or vertical direction, or may perform a 2D non-separable transform. Used transform information may be transmitted or may be derived by the encoder/decoder according to current and neighboring encoding information. For example, like the 1D transform, a transform set for the secondary transform may be defined. Entropy encoding/decoding is not performed on the transform set, and the encoder/decoder may define the transform set according to the same rule. In this case, information indicating which transform is used among transforms of the transform set may be transmitted, and the information may be applied to at least one residual signal through intra or inter prediction.

At least one of the number or types of transform candidates is different for each transform set. At least one of the number or types of transform candidates may be variably determined based on at least one of the location, the size, the partition form, and the prediction mode (intra/inter mode) or direction/non-direction of the intra-prediction mode of a block (CU, PU, TU, etc.).

The decoder may perform a secondary inverse transform depending on whether or not the secondary inverse transform is performed, and may perform a primary inverse transform depending on whether or not the primary inverse transform is performed from the result of the secondary inverse transform.

The above-described primary transform and secondary transform may be applied to at least one signal component of luma/chroma components or may be applied according to the size/shape of an arbitrary coding block. Entropy encoding/decoding may be performed on an index indicating both whether or not the primary transform/secondary transform is used and the used primary transform/secondary transform in an arbitrary coding block. Alternatively, the index may be tacitly derived by the encoder/decoder according to at least one piece of current/neighboring encoding information.

Figure 10:
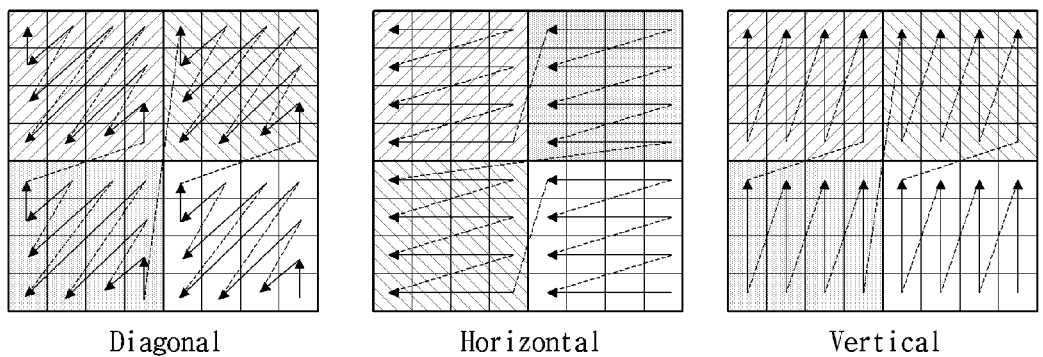
FIG. 10 is a view for explaining scanning of quantized transform coefficients.

The residual signal generated after intra or inter prediction goes through a quantization process after the primary and/or secondary transform, and quantized transform coefficients go through an entropy encoding process. Here, the quantized transform coefficients may be scanned in diagonal, vertical, and horizontal directions based on at least one of the intra-prediction mode or the size/shape of a minimum block as shown in FIG. 10.

form coefficients by performing entropy decoding. The quantized transform coefficients on which inverse scanning is performed become transform coefficients after dequantization, and at least one of secondary inverse transform or primary inverse transform is performed, whereby a reconstructed residual signal can be generated.

Figure 11:
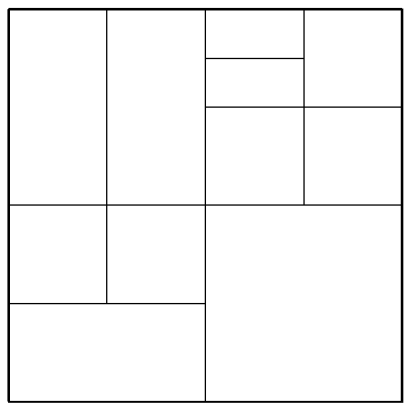
FIG. 11 is a view for explaining block partition.

In a video encoding process, one block may be partitioned as shown in FIG. 11, and an indicator corresponding to partition information may be signaled. Here, the partition information may be at least one of a partition flag (split_flag), a quad/binary tree flag (QB_flag), a quad tree partition flag (quadtree_flag), a binary tree partition flag (binarytree_flag), and a binary tree partition type flag (Btype_flag). Here, split_flag is a flag indicating whether or not a block is partitioned, QB_flag is a flag indicating whether a block is partitioned in a quad tree form or in a binary tree form, quadtree_flag is a flag indicating whether or not a block is partitioned in a quad tree form, binarytree_flag is a flag indicating whether or not a block is partitioned in a binary tree form, Btype_flag is a flag indicating whether a block is vertically or horizontally partitioned in a case of partition of a binary tree form.

When the partition flag is 1, it may indicate partitioning is performed, and when the partition flag is 0, it may indicate partitioning is not performed. In a case of the quad/binary tree flag, 0 may indicate a quad tree partition, and 1 may indicate a binary tree partition. Alternatively, 0 may indicate a binary tree partition, and 1 may indicate a quad tree partition. In a case of the binary tree partition type flag, 0 may indicate a horizontal direction partition, and 1 may indicate a vertical direction partition. Alternatively, 0 may indicate a vertical direction partition, and 1 may indicate a horizontal direction partition.

For example, partition information for FIG. 11 may be derived by signaling at least one of quadtree_flag, binarytree_flag, and Btype_flag as shown in table 3.

TABLE 3

| quadtree_flag | 1 | 0 | | | 1 | 0 | | | 0 | 0 | 0 | 0 | | | | | 0 |
|---|---|---|---|---|---|---|---|---|---|---|---|---|---|---|---|---|---|
| binarytree_flag | | | 1 | 0 | 0 | | 1 | 0 | 0 | | | | | 1 | 1 | 0 | 0 | 0 | 0 |
| Btype_flag | | | | 1 | | | | 0 | | | | | | | | 0 | 1 | | |

In addition, the quantized transform coefficients on which entropy decoding is performed may be arranged in block forms by being inverse scanned, and at least one of dequantization or inverse transform may be performed on the relevant block. Here, as a method of inverse scanning, at least one of diagonal direction scanning, horizontal direction scanning, and vertical direction scanning may be performed.

For example, when the size of a current coding block is 8×8, primary transform, secondary transform, and quantization may be performed on a residual signal for the 8×8 block, and next, scanning and entropy encoding may be performed on quantized transform coefficients for each of four 4×4 sub-blocks according to at least one of three scanning order methods shown in FIG. 10. In addition, inverse scanning may be performed on the quantized trans- For example, partition information for FIG. 11 may be derived by signaling at least one of split_flag, QB_flag, and Btype_flag as shown in table 4.

TABLE 4

| split_flag | 1 | 1 | | 0 | 0 | 1 | | 1 | 0 | 0 | 0 | 0 | 0 | 1 | | 1 | 0 | 0 | 0 | 0 |
|---|---|---|---|---|---|---|---|---|---|---|---|---|---|---|---|---|---|---|---|---|
| QB_flag | | 0 | 1 | | | 0 | | 1 | | | | | | | 1 | | | | | |
| Btype_flag | | | | 1 | | | | | 0 | | | | | | | | 0 | 1 | | |

The partition method may be performed only in a quad tree form or only in a binary tree form according to the size/shape of a block. In this case, the split_flag may mean a flag indicating whether partitioning is performed in a quad tree for or in a binary tree form. The size/shape of a block may be derived according to depth information of a block, and the depth information may be signaled.

When the size of a block is in a predetermined range, partitioning may be performed only in a quad tree form. Here, the predetermined range may be defined as at least one of the size of a maximum block or the size of a minimum block that can be partitioned only in a quad tree form.

Information indicating the size of a maximum/minimum block where a partition in the quad tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 256×256 to 64×64, partitioning may be performed only in a quad tree form. In this case, the split_flag may be a flag indicating whether partitioning is performed in a quad tree form.

When the size of a block is in a predetermined range, partitioning may be performed only in a binary tree form. Here, the predetermined range may be defined as at least one of the size of a maximum block or the size of a minimum block that can be partitioned only in a binary tree form. Information indicating the size of a maximum/minimum block where a partition in the binary tree form is allowed may be signaled through a bitstream, and the information may be signaled by a unit of at least one of a sequence, a picture parameter, or a slice (segment). Alternatively, the size of a maximum/minimum block may be a fixed size that is preset in the encoder/decoder. For example, when the size of a block ranges 16×16 to 8×8, partitioning may be performed only in a binary tree form. In this case, the split_flag may be a flag indicating whether partitioning is performed in a binary tree form.

After partitioning one block in a binary tree form, when the partitioned block is further partitioned, partitioning may be performed only in a binary tree form.

When the width or length size of the partitioned block cannot be further partitioned, at least one indicator may not be signaled.

Besides the quad tree based binary tree partitioning, the quad tree based partitioning may be performed after the binary tree partitioning.

Based on the foregoing, a video encoding/decoding method according the present invention will be described in detail.

Figure 12:
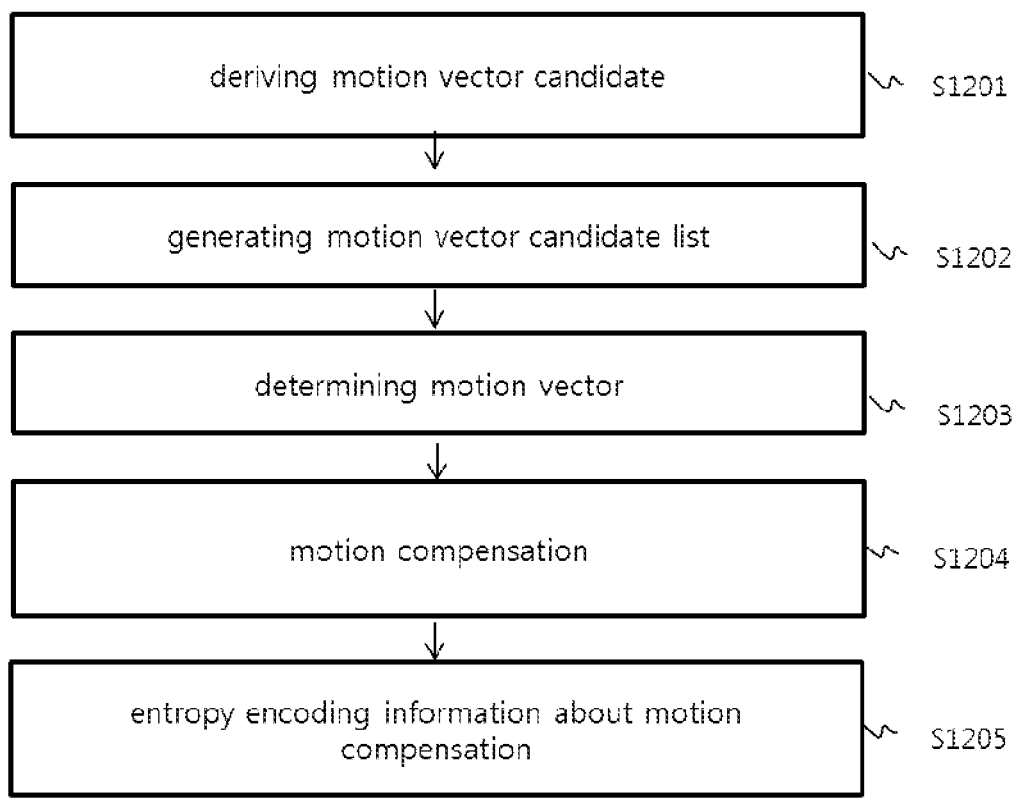
FIG. 12 is a flowchart showing a video encoding method according to the present invention
Figure 13:
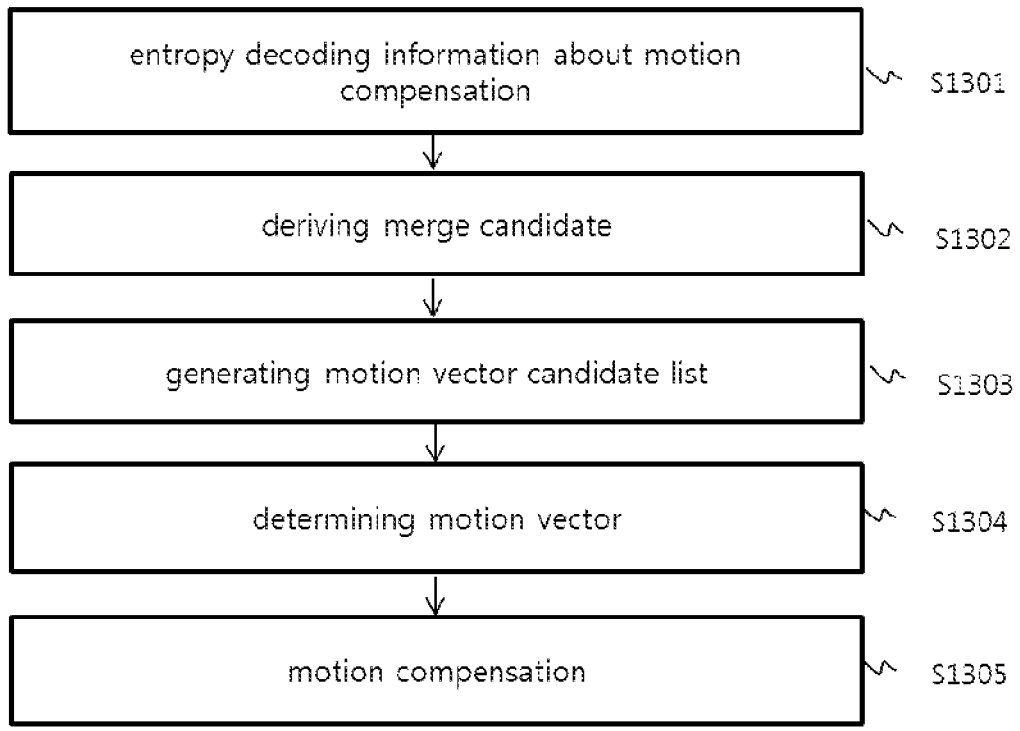
FIG. 13 is a flowchart showing a video decoding method according to the present invention.

FIG. 12 is a flow chart showing a video encoding method according to the present invention, and FIG. 13 is a flow chart showing a video decoding method according to the present invention.

Referring to FIG. 12, an encoding apparatus may derive a motion vector candidate in step S1201, and generate a motion vector candidate list based on the derived motion vector candidate in step S1202. When the motion vector candidate list is generated, the encoding apparatus may determine a motion vector by using the generated motion vector candidate list in step S1203, and perform motion compensation by using the motion vector in step S1204. Then, the encoding apparatus may entropy encode information of the motion compensation in step S1205.

Referring to FIG. 13, a decoding apparatus may entropy decode motion compensation information received from the encoding apparatus in step S1301, and derive a motion vector candidate in step S1302. Then, the decoding apparatus may generate a motion vector candidate list based on the derive motion vector candidate in step S1303, and determine a motion vector by using the generated motion vector candidate list in step S1304. Then, the decoding apparatus may perform motion compensation by using the motion vector in step S1305.

Hereinafter, each step shown in FIGS. 12 and 13 will be described in detail.

First, steps S1201 and S1302 of the deriving of the motion vector candidate will be described in detail.

A motion vector candidate of a current block may include at least one of a spatial motion vector candidate and a temporal motion vector candidate.

A spatial motion vector of the current block may be derived from a neighboring reconstructed block of the current block. In one embodiment, a motion vector of neighboring reconstructed block of the current block may be determined as the spatial motion vector candidate of the current block.

Figure 14:
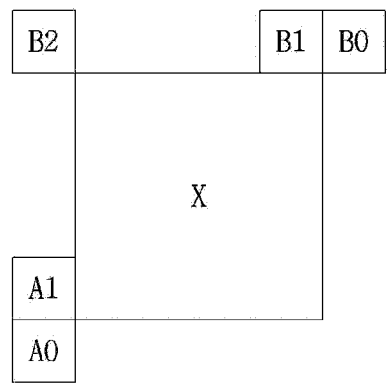
FIG. 14 is a view showing an example of deriving a spatial motion vector candidate of a current block.

FIG. 14 is a view showing an example of deriving the spatial motion vector candidate of the current block.

Referring to FIG. 14, a spatial motion vector candidate of a current block may be derived from neighboring blocks adjacent to a current block X. Herein, the neighboring block adjacent to the current block may include at least one of a block B1 adjacent to an upper side of the current block, a block A1 adjacent to a left side of the current block, a block B0 adjacent to an right upper corner of the current block, a block B2 adjacent to a left upper corner of the current block, and a block A0 adjacent to a left lower corner of the current block. Meanwhile, the neighboring block adjacent to the current block may be in the form of a square shape or a non-square shape. When a motion vector is present in the neighboring block adjacent to the current block, the motion vector of the neighboring block may be determined as the spatial motion vector candidate of the current block. Whether or not the motion vector is present in the neighboring block, or whether or not the motion vector of the neighboring block may be used as the spatial motion vector candidate of the current block may be determined based on whether or not a neighboring block is present, or whether or not a neighboring block is encoded through inter prediction. Herein, whether or not the motion vector is present in the neighboring block, or whether or not the motion vector of the neighboring block may be used as the spatial motion vector candidate of the current block may be determined according to a predetermined order of priority. In one embodiment, in an example shown in FIG. 14, availability of a motion vector may be determined in a sequence of blocks positioned at A0, A1, B0, B1, and B2.

In addition, the neighboring block adjacent to the current block may be divided into a sub-block unit. Herein, a motion vector of any one sub-block among sub-blocks of the neighboring block adjacent to the current block may be determined as the spatial motion vector candidate of the current block. In addition, the spatial motion vector candidate of the current block may be determined based on at least one motion vector of sub-blocks of the neighboring block adjacent to the current block. Herein, whether or not a sub-block is present in the neighboring block or whether or not a motion vector of the sub-block may be used as the spatial motion vector candidate of the current block may be determined by using the above described method, thus the spatial motion vector candidate of the current block may be determined.

In addition, any one of a median value, an average value, the minimum value, the maximum value, a weighted average value and a mode of motion vectors of sub-blocks of the neighboring block may be determined as the spatial motion vector of the current block.

When a reference picture of the current block and a reference picture of the neighboring block having the motion vector are different, the spatial motion vector candidate of the current block may be determined by scaling the motion vector of the neighboring block. Herein, scaling may be performed based on at least one of a distance between reference pictures referenced by the current picture and the current block, and a distance between reference pictures referenced by the current picture and the neighboring block. In one embodiment, the spatial motion vector candidate of the current block may be derived by scaling the motion vector of the neighboring block according to ratios of a distance between reference pictures referenced by the current picture and the current block and a distance between reference pictures referenced by the current picture and the neighboring block.

Meanwhile, when a reference picture index of the current block and a reference picture index of the neighboring block having the motion vector are different, the spatial motion vector candidate of the current block may be determined by scaling the motion vector of the neighboring block. Herein, scaling may be performed based on at least one of a distance between reference pictures referenced by the current picture and the current block, and a distance between reference pictures referenced by the current picture and the neighboring block.

With respect to scaling, the spatial motion vector candidate may be determined by scaling the motion vector of the neighboring block based on a reference picture indicated by the reference picture index having a predefined value. Herein, the predefined value may be a positive integer including 0. In one embodiment, the spatial motion vector candidate of the current block may be derived by scaling the motion vector of the neighboring block according to ratios of a distance between the current picture and a reference picture of the current block which is indicated by the reference picture index having the predefined value, and a distance between the current picture and a reference picture of the neighboring block having the predefined value.

Meanwhile, the motion vector of the neighboring block (A0, A1, B0, B1, and B2) may not be determined as the spatial motion vector candidate of the current block, or the spatial motion vector candidate of the current block may be derived from a motion vector of a block of other position which is different to the neighboring block (A0, A1, B0, B1, and B2) when at least one of the below cases is satisfied.

1) when a reference picture of the neighboring block and a reference picture of the current block are different 2) when a reference picture index of the neighboring block and a reference picture index having a predefined value are different (herein, the reference picture index having predefined value may be a value predefined in an encoder/decoder, or may be a value derived from a spatial neighboring block of the current block or from a collocated block). 3) when a reference picture of the neighboring block and a reference picture corresponding to a reference picture index having a predefined value are different In addition, the spatial motion vector candidate of the current block may be derived based on at least one of an encoding parameter of the current block.

Although a reference picture list of the current block and a reference picture list of the neighboring block are difference, whether or not to perform scaling of the motion vector of the neighboring block may be determined according whether or not reference pictures of the current block and the neighboring block are identical. Herein, the reference picture list may include at least one of a List0 L0, a List1 L1, a List2 L2, and a List3 L3.

In short, the spatial motion vector candidate may be derived by considering at least one of availability of the neighboring block, whether or not encoding using an intra prediction mode, whether or not a reference picture list is identical to a reference picture list of the current block, and whether or not a reference picture is identical to a reference picture of the current block. When the neighboring block is available, and encoding is not performed by using an intra prediction mode, the spatial motion vector candidate of the current block may be generated by using methods shown in Table 5 below.

TABLE 5

| Sequence | Whether or not reference picture lists of current block and neighboring are identical | Whether or not reference pictures of current block and neighboring block are identical | Spatial motion vector candidate of current block |
|---|---|---|---|
| 1 | identical | identical | motion vector of neighboring block |
| 2 | different | identical | motion vector of neighboring block |
| 3 | identical | different | scaling motion vector of neighboring block |
| 4 | different | different | scaling motion vector of neighboring block |

As shown in the above Table 5, even though reference picture lists of the current block and the neighboring block are different, the motion vector of the neighboring block may be determined as the spatial motion vector candidate of the current block when reference pictures of the current block and the neighboring block are identical.

Meanwhile, when reference pictures of the current block and the neighboring block are different, regardless whether or not reference picture lists of the current block and the neighboring block are identical, the spatial motion vector candidate of the current block may be determined by scaling the motion vector of the neighboring block.

When the spatial motion vector candidate of the current block is derived from the neighboring block, a deriving order of the spatial motion vector candidate of the current block may be determined by considering whether or not reference pictures of the current block and neighboring blocks are identical. In one embodiment, preferentially, a spatial vector candidate may be derived from a neighboring block having a reference picture identical to the current block. When a number of derived spatial motion vector candidates (or a number of derived motion vector candidates) is equal to or less than a preset maximum value, a spatial vector candidate may be derived from a neighboring block having a reference picture different from the current block.

Alternatively, the spatial motion vector prediction candidate of the current block may be determined by considering whether or not the current block and the neighboring block have the same reference picture, and by considering a position of the neighboring block.

In one embodiment, from neighboring blocks A0 and A1 which are adjacent to a left side of the current block, the spatial motion vector candidate of the current block may be derived according to whether or not reference pictures are identical. Then, from neighboring blocks B0, B1, and B2 which are adjacent to an upper side of the current block, the spatial motion vector candidate of the current block may be derived according to whether or not reference pictures are identical. Table 6 shows an example of a deriving sequence of the spatial motion vector candidate of the current block.

TABLE 6

| Sequence | Target to be derived as spatial motion vector candidate |
|---|---|
| 1 | When reference pictures of current block and block A0 are identical, deriving spatial motion vector candidate from block A0 |
| 2 | When reference pictures of current block and block A1 are identical, deriving spatial motion vector candidate from block A1 |
| 3 | When reference pictures of current block and block A0 are different, deriving spatial motion vector candidate from block A0 (or deriving spatial motion vector candidate by scaling motion vector of block A0 |
| 4 | When reference pictures of current block and block A1 are different, deriving spatial motion vector candidate from block A1 (or deriving motion vector candidate by scaling motion vector of block A1) |
| 5 | When reference pictures of current block and block B0 are identical, deriving spatial motion vector candidate from block B0 |
| 6 | When reference pictures of current block and block B1 are identical, deriving spatial motion vector candidate from block B1 |
| 7 | When reference pictures of current block and block B2 are identical, deriving spatial motion vector candidate from block B2 |
| 8 | When reference pictures of current block and block B0 are different, deriving spatial motion vector candidate from block B0 or, deriving spatial motion vector candidate by scaling motion vector of block B0) |
| 9 | When reference pictures of current block and block B1 are different, derive spatial motion vector candidate from block B1 (or, deriving spatial motion vector candidate by scaling motion vector of block B1) |
| 10 | When reference pictures of current block and block B2 are different, deriving spatial motion vector candidate from block B2 (or, deriving spatial motion vector candidate by scaling motion vector of block B2) |

The maximum number of spatial motion vector candidates of the current block may be preset so that the encoding apparatus and the decoding apparatus use the same number. Alternatively, the encoding apparatus may encode information indicating the maximum number of spatial motion vector candidates of the current block, and transmit the encoded information through a bitstream to the decoding apparatus. In one embodiment, the encoding apparatus may encode 'maxNumSpatialMVPCand' indicating the maximum number of spatial motion vector candidates of the current block, and transmit encoded 'maxNumSpatialMVPCand' through a bitstream to the decoding apparatus. Herein, 'maxNumSpatialMVPCand' may be set to a positive integer including 0. For example, 'maxNumSpatialMVPCand' may be set to 2.

'maxNumSpatialMVPCand' may be derived based on a size of the motion vector candidate list or candidate number information indicating the maximum number of motion vector candidates which may be included in the motion vector candidate list.

'maxNumSpatialMVPCand' may be determined depending on a number of temporal motion vector candidates.

'maxNumSpatialMVPCand' may be signaled through a bitstream of at least one unit of a picture, a slice, and a block, or may be a value preset in the encoder/decoder.

Based on granularity information, the spatial motion vector candidate may be shared in blocks having smaller size or deeper depth than the granularity information. Herein, the granularity information may be information indicating at least one of a block size and a block depth that may be shared among information about the motion compensation.

In detail, when a size of the current block is smaller than a block size indicated by the granularity information, the spatial motion vector candidate of the current block may be derived from at least one of blocks having a size indicated by the granularity information and reconstructed adjacent to a higher block of the current block. In addition, blocks included in the higher block may share the derived spatial motion vector candidate.

Figure 15:
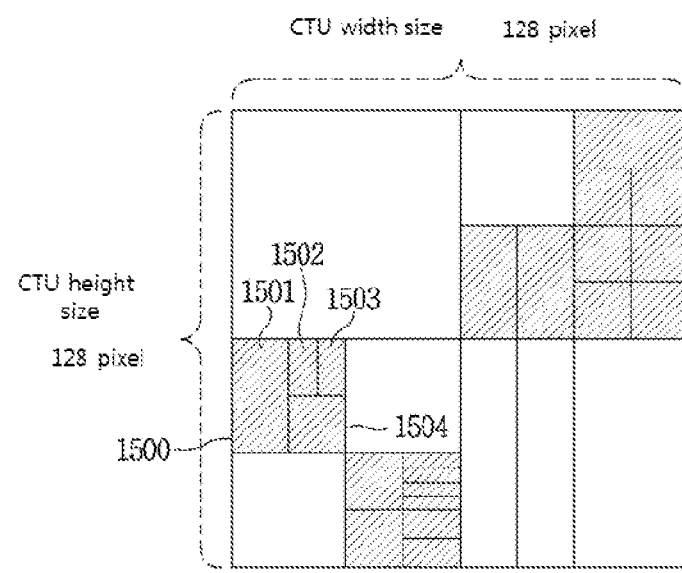
FIG. 15 a view showing an example of deriving and sharing a spatial motion vector according to granularity information in a coding tree unit (CTU).

FIG. 15 is a view showing an embodiment of deriving and sharing a spatial motion vector candidate according to granularity information in a coding tree unit (CTU). Referring to FIG. 15, when the granularity information indicates 32×32, blocks 1501, 1502, 1503, and 1504 having a block size smaller than 32×32 may derive a spatial motion vector from at least one of neighboring blocks adjacent to a higher block 1500 having a size indicated by the granularity information, and share the derived spatial motion vector candidate.

In one embodiment, when the granularity information is 32×32 and a block size of an encoding block is 32×32, prediction blocks having a block size smaller than 32×32 may derive spatial motion vector candidates of the prediction blocks from at least one of motion vectors of neighboring blocks of the encoding block. The derived spatial motion vector candidate may be shared by the prediction blocks within the encoding block. Herein, the encoding block and the prediction block may refer to a block that is generally expressed.

When a block depth of the current block is deeper than a block depth indicated by the granularity information, a spatial motion vector candidate may be derived from at least one of blocks having a block depth indicated by the granularity information and reconstructed adjacent to a higher block of the current block. In addition, blocks included in the higher block may share the derived spatial motion vector candidate. In one embodiment, when the granularity information indicates a block depth of 2 and an encoding block has a block depth of 2, prediction blocks having a block depth deeper than 2 may derive spatial motion vector candidates of the prediction blocks based on at least one of motion vectors of neighboring blocks of the encoding block. The prediction blocks within the encoding block may share the derived spatial motion vector candidates. Herein, sharing the spatial motion vector candidates may mean that blocks sharing the spatial motion vector candidates may respectively generate motion vector candidate lists based on an identical spatial motion vector candidate.

In addition, sharing the spatial motion vector candidate may mean that blocks sharing the spatial motion vector candidates may perform motion compensation by using a single motion vector candidate list. Herein, the shared motion vector candidate list may include at least one of spatial motion vector candidates derived based on the higher block having a block size or block depth indicated by the granularity information The temporal motion vector candidate of the current block may be derived from a reconstructed block included in a co-located picture of the current picture. Herein, the co-located picture may be a picture that has been encoded/decoded before the current picture, and may be a picture having a temporal sequence different from the current picture.

Figure 16:
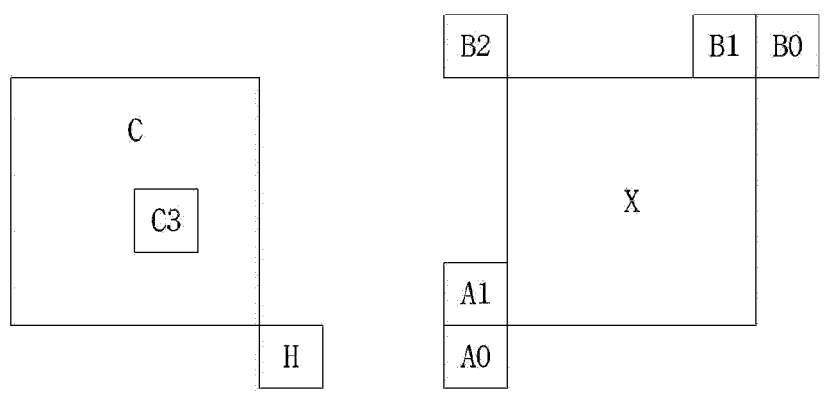
FIG. 16 is a view showing an example of deriving a temporal motion vector candidate of the current block.

FIG. 16 is a view showing an example of deriving a temporal motion vector candidate of the current block.

Referring to FIG. 16, the temporal motion vector candidate of the current block may be derived, in a co-located picture of the current picture, by using a block including an external position of a block spatially collocated with a current block X or a block including an internal position of a block spatially collocated with the current block X. Herein, the temporal motion vector candidate may refer to a motion vector of the collocated block. In one embodiment, the temporal motion vector candidate of the current block X may be derived from a block H adjacent to a right lower corner of a block C spatially collocated with the current block, or from a block C3 including the center point of the block C. The block H or the block C3 used for deriving the temporal motion vector candidate of the current block may be names as a 'collocated block'.

Meanwhile, the collocated block of the current block may be in the form of a square shape or a non-square shape.

When the temporal motion vector candidate of the current block may be derived from the block H including the external position of the block C, the block H may be set as the collocated block of the current block. Herein, the temporal motion vector of the current block may be derived based on a motion vector of the block H. Meanwhile, when the temporal motion vector candidate of the current block may not be derived from the block H, the block C3 including the internal position of the block C may be set as the collocated block of the current block. Herein, the temporal motion vector of the current block may be derived based on a motion vector of the block C3. When the temporal motion vector may not be derived from the block H and the block C3 (for example, when the block H and the block C3 are intra encoded), the temporal motion vector candidate of the current block may not be derived, or may be derived from a block positioned different from the block H and the block C3.

In another embodiment, the temporal motion vector candidate of the current block may be derived from a plurality of blocks within the co-located picture. In one embodiment, a plurality of temporal motion vector candidates of the current block may be derived from the block H and the block C3.

In addition, the collocated block of the current block may be divided into a sub-block unit. Herein, a motion vector of any one of sub-blocks of the collocated block of the current block may be determined as the temporal motion vector candidate of the current block. Alternatively, the temporal motion vector candidate of the current block may be determined based on at least one of motion vectors of the sub-blocks of the collocated block of the current block. Herein, the temporal motion vector candidate of the current block may be determined according to whether or not motion vectors of the sub-blocks of the collocated block are present, or whether or not a motion vector of the collocated block may be used as the temporal motion vector candidate of the current block.

In addition, any one of a median value, an average value, the minimum value, the maximum value, a weighted sum average value, and a mode of motion vectors of the sub-blocks of the collocated block may be determined as the temporal motion vector of the current block.

In FIG. 16, the temporal motion vector candidate of the current block may be derived from a block adjacent to a left lower corner of the collocated block, or from a block including the center point of the collocated block. However, a position of a block for deriving the temporal motion vector candidate of the current block is not limited to the example shown in FIG. 16. In one embodiment, the temporal prediction candidate of the current block may be derived from a block adjacent to an upper/lower boundary, a left/right boundary, or a corner of the collocated block, or may be derived from a block including a specific position within the collocated block (for example, a block adjacent to a corner boundary of the collocated block).

The temporal motion vector candidate of the collocated block may be determined by considering a reference picture list (or, a prediction direction) of the current block and a reference picture list (or, a prediction direction) of a block positioned inside or outside of the collocated block.

In one embodiment, when the reference picture list that may be used by the current block is L0 (in other words, an inter prediction indicator indicates PRED_L0), a motion vector of a block using L0 as a reference picture among blocks positioned inside or outside of the collocated block may be derived as the temporal motion vector candidate of the current block. In other words, when the reference picture list that may be used by the current block is LX (herein, X is an integer indicating an index of the reference picture list such as 0, 1, 2, or 3), a motion vector of a block using LX as a reference picture among blocks positioned inside or outside of the collocated block may be derived as the temporal motion vector candidate of the current block.

When the current block uses a plurality of reference picture lists, the temporal motion vector candidate of the current block may be determined by considering whether or not reference picture lists of the current block and the a block positioned inside or outside of the collocated block are identical.

In one embodiment, when the current block performs bi-directional prediction (in other words, when the inter prediction indicator is PRED_BI), a motion vector of a block using L0 and L1 as a reference picture among blocks positioned inside or outside of the collocated block may be derived as the temporal motion vector candidate of the current block. When the current block performs three-directional prediction (in other words, when the inter prediction indicator is PRED_TRI), a motion vector of a block using L0, L1, and L2 as a reference picture among blocks positioned inside or outside of the collocated block may be derived as the temporal motion vector candidate of the current block. When the current block performs four-directional prediction (in other words, when the inter prediction indicator is PRED_QUAD), a motion vector of a block using L0, L1, L2, and L3 as a reference picture among blocks positioned inside or outside of the collocated block may be derived as the temporal motion vector candidate of the current block.

In addition, when the current block is set to perform multi-directional prediction by using a single reference picture, the temporal motion prediction vector candidate of the current block may be determined by considering whether or not the collocated block and the current block have the same reference picture list and the same prediction direction.

In one embodiment, when the current block performs bi-directional prediction for a reference picture list L0 (in other words, when the inter prediction indicator for L0 is PRED_BI), a motion vector of a block performing bi-directional prediction for L0 by using L0 as the reference picture among blocks positioned inside or outside of the collocated block is derived as the temporal motion vector candidate of the current block.

In addition, at least one of a temporal motion vector candidate, a co-located picture, a collocated block, a prediction list utilization flag, and a reference picture index may be derived based on at least one of an encoding parameter.

The temporal motion vector candidate may be preliminarily derived when a number of derived spatial motion vector candidates is smaller than the maximum number of motion vector candidates. Accordingly, when the number of derived spatial motion vector candidates reaches the maximum number of motion vector candidate, the step of deriving the temporal motion vector candidate may be omitted.

In one embodiment, when the maximum number of motion vector candidates is 2, and the two derived spatial motion vector candidates have different values, the step of deriving the temporal motion vector candidate may be omitted.

In another embodiment, the temporal motion vector candidate of the current block may be derived based on the maximum number of temporal motion vector candidates Herein, the maximum number of temporal motion vector candidates may be preset so that the encoding apparatus and the decoding apparatus use the same value. Alternatively, information indicating the maximum number of temporal motion vector candidates of the current block may be encoded to a bitstream, and transmitted to the decoding apparatus. In one embodiment, the encoding apparatus may encode 'maxNumTemporalMVPCand' indicating the maximum number of temporal motion vector candidates of the current block, and transmit encoded 'maxNumTemporalMVPCand' to the decoding apparatus through a bitstream. Herein, 'maxNumTemporalMVPCand' may be set to a positive integer including 0. For example, 'maxNumTemporalMVPCand' may be set to 1.

When a distance between the current picture including the current block and the reference picture of the current block and a distance between the co-located picture including the collocated block and the reference picture of the collocated block are different, the temporal motion vector candidate of the current block may be obtained by scaling a motion vector of the collocated block. Herein, scaling may be performed based on at least one of a distance between the current picture and the reference picture referenced by the current block, and a distance between the co-located picture and the reference picture referenced by the collocated block. In one embodiment, the temporal motion vector candidate of the current block may be derived by scaling the motion vector of the collocated block according to ratios of the distance between the current picture and the reference picture referenced by the current block and the distance between the co-located picture and the reference picture referenced by the collocated block.

Meanwhile, when a reference picture index of the current block and a reference picture index of the collocated block having the motion vector are different, the temporal motion vector candidate of the current block may be determined by scaling the motion vector of the collocated block. Herein, scaling may be performed based on at least one of the distance between the current picture and the reference picture referenced by the current block, and the distance between the co-located picture and the reference picture referenced by the collocated block.

With respect to scaling, the temporal motion vector candidate may be determined by scaling the motion vector of the collocated block based on the reference picture indicated by the reference picture index having a predefined value. Herein, the predefined value may be a positive integer including 0. In one embodiment, the temporal motion vector candidate of the current block may be derived by scaling a motion vector of a neighboring block according to ratios of the distance between the current picture and the reference picture of the current block which is indicated by the reference picture index having the predefined value, and the distance between the co-located picture and the reference picture of the collocated block.

Meanwhile, i) when the distance between the current picture and the reference picture referenced by the current block and the distance between the co-located picture and the reference picture of the collocated block are different, ii) when the reference picture index of the collocated block and the predefined value are different, or iii) when the reference picture of the collocated block and the reference picture of the current block which is indicated by the reference picture index having the predefined value are different, the motion vector of the collocated block may not be determined as the temporal motion vector candidate of the current block.

Based on granularity information, the temporal motion vector candidate may be shared in blocks having a block size or block depth smaller or deeper than the granularity information.

Herein, sharing the temporal motion vector candidate may mean that blocks sharing the temporal motion vector candidate may respectively generate motion vector candidate lists based on the same temporal motion vector candidate.

Alternatively, sharing the temporal motion vector candidate may mean that blocks sharing the temporal motion vector candidate may perform motion compensation by using a single motion vector candidate list. Herein, the shared motion vector candidate list may include at least one of temporal motion vector candidates that are derived based on a higher block having the block size or block depth indicated by the granularity information.

In detail, when a block size of the current block is smaller than a block size indicated by the granularity information, the temporal motion vector candidate of the current block may be derived from the collocated block of the higher block of the current block and which having the block size indicated by the granularity information. In addition, blocks included in the higher block may share the derived temporal motion vector candidate.

In one embodiment, when the granularity information is 32×32 and a block size of an encoding block is 32×32, prediction blocks having a block size smaller than the 32×32 may derive temporal motion vector candidates of the prediction blocks from a motion vector of the collocated block of the encoding block. The prediction blocks within the encoding block may share the derived temporal motion vector candidate. Herein, the encoding block and the prediction block may refer to a block that is generally expressed.

Alternatively, when a block depth of the current block is deeper than a block depth indicated by the granularity information, the temporal motion vector candidate of the current block may be derived from the collocated block of the higher block of the current block and which has the block depth indicated by the granularity information. In addition, blocks included in the higher block may share the derived temporal motion vector candidate. In one embodiment, when the granularity information indicates the block depth of 2 and a block depth of the encoding block is 2, prediction blocks having a block depth deeper than 2 may derive temporal motion vector candidates of the prediction blocks based on the motion vector of the collocated block of the encoding block. The prediction blocks within the encoding block may share the derived temporal motion vector candidate.

Figure 17:
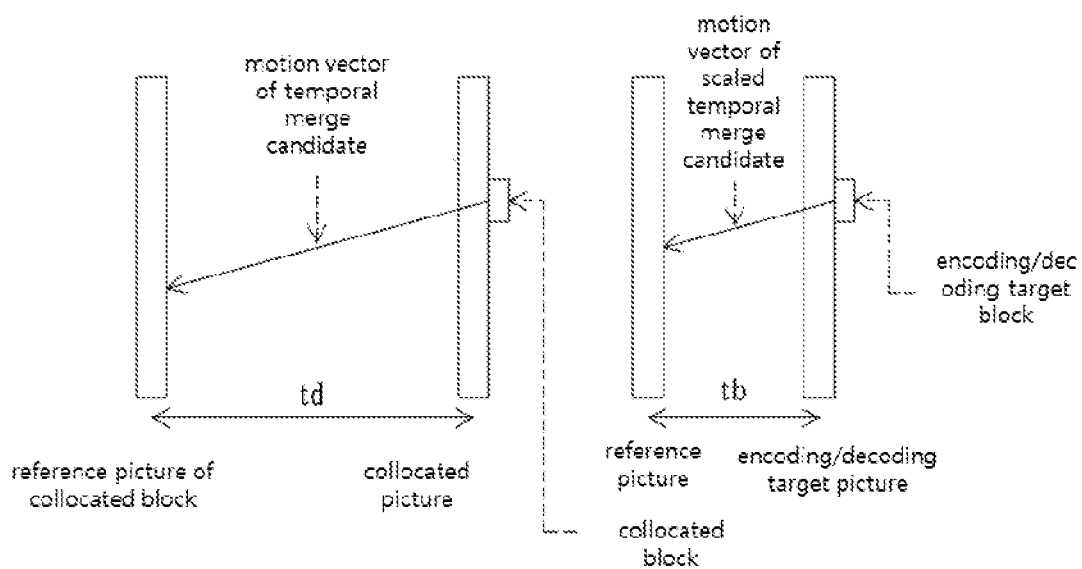
FIG. 17 shows an example of scaling a motion vector of a corresponding positional block for deriving the temporal motion vector candidate of the current block.

FIG. 17 shows an example of scaling the motion vector of the collocated block for deriving the temporal motion vector candidate of the current block.

The motion vector of the collocated block may be scaled based on at least one of a difference value td between a picture order count (POC) indicating a displaying order of the co-located picture and a POC of the reference picture of the collocated block, and a difference value tb between a POC of the current picture and a POC of the reference picture of the current block.

Before performing scaling, the td or the tb may be adjusted so that the td or the tb is present within a predetermined range. In one embodiment, when the predetermined range represents −128~127 and the td or the tb is smaller than −128, the td or the tb may be adjusted to −128. When the td or the tb is greater than 127, the td or the tb may be adjusted to 127. When the td or the tb is included in a range of −128~127, the td or the tb is not adjusted.

A scaling factor DistScaleFactor may be calculated based on the td or the tb. Herein, the scaling factor may be calculated based on Formula 1 below.

$$\text{DistScaleFactor} = (tb*tx+32) >> 6 \quad \text{[Formula 1]}$$

$$tx = (16384 + \text{Abs}(td/2))/td$$

In Formula 1, Abs( ) represents an absolute value function, and an output value of the corresponding function becomes an absolute value of an input value.

A value of the scaling factor DistScaleFactor calculated based on Formula 1 may be adjusted to a predetermined range. In one embodiment, DistScaleFactor may be adjusted to be present within a range of −1024~1023.

By scaling the motion vector of the collocated block by using the scaling factor, the temporal motion vector candidate of the current block may be determined. In one embodiment, the temporal motion vector candidate of the current block may be determined by Formula 2 below.

$$\text{Sign}(\text{DistScaleFactor}*\text{mvCol})*((\text{Abs}(\text{DistScaleFactor}*\text{mvCol})+127) >> 8) \quad \text{[Formula 2]}$$

In Formula 2, Sign( ) is a function outputting sign information of a value included in ( ) In one embodiment, in case of Sign(−1), − is output. In Formula 2, mvCol represents the motion vector of the collocated block, in other words, the temporal motion vector prediction candidate before being scaled.

Next, steps S1202 and S1303 of generating the motion vector candidate list based on the derived motion vector candidate will be described.

The generating of the motion vector candidate list generate may include adding or removing the motion vector candidate to or from the motion vector candidate list, and adding a combined motion vector candidate to the motion vector candidate list.

The adding or removing of the derived motion vector candidate to or from the motion vector candidate list will be described. The encoding apparatus and the decoding apparatus may add the derived motion vector candidate in a derived order of the motion vector candidate to the motion vector candidate list.

The generated motion vector candidate list may be determined according to an inter prediction direction of the current block. In one embodiment, a single motion vector candidate list may be generated for each reference picture list, or a single motion vector candidate list may be generated for each reference picture. A plurality of reference picture lists or a plurality of reference pictures may share a single motion vector candidate list.

In one embodiment that will be described later, it is assumed that a motion vector candidate list mvpListLX refers to motion vector candidate lists corresponding to reference picture lists L0, L1, L2, and L3. For example, a motion vector candidate list corresponding to the reference picture list L0 may be named as mvpListL0.

A number of motion vector candidates included in the motion vector candidate list may be preset so that the encoding apparatus and the decoding apparatus may use the same preset value. Alternatively, the maximum number of motion vector candidates included in the motion vector candidate list may be encoded by the encoding apparatus, and transmitted to the decoding apparatus through a bitstream.

In one embodiment, the number maxNumMVPCandList which is the maximum number of motion vector candidates that may be included in the motion vector candidate list mvpListLX may be a positive integer including 0. In one embodiment, maxNumMVPCandList may be an integer such as 2, 3, 4, 5, 6, 7, 8, 9, 10, 11, 12, 13, 14, 15, or 16. When maxNumMVPCandList is 2, it may mean that a maximum of two motion vector candidates may be included in mvpListLX. Accordingly, an index value of the motion vector candidate that is added to mvpListLX first may be set to 0, and an index value of the motion vector candidate added next thereto may be set to 1. The maximum number of the motion vector candidates may be defined for each motion vector candidate list, or may be commonly defined to all motion vector candidate lists. For example, maximum numbers of the motion vector candidates of mvpListL0 and mvpListL1 may be different values, or may be the same value.

Figure 18:
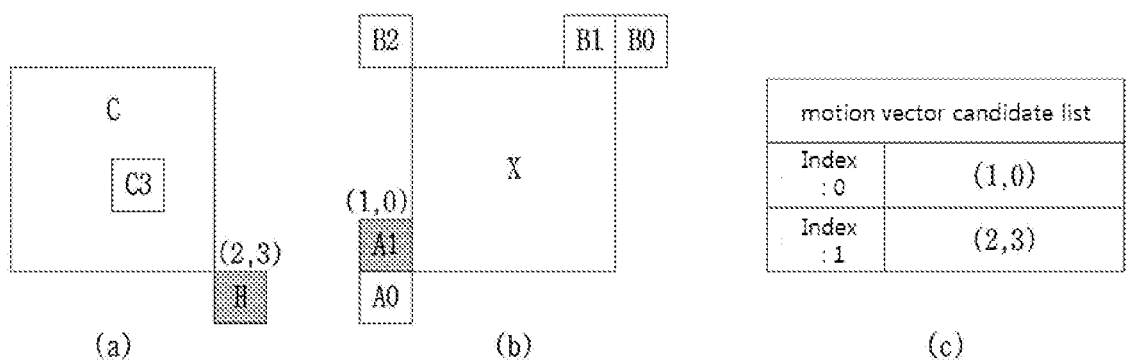
FIG. 18 is a view showing an example of generating a motion vector candidate list.

FIG. 18 is a view showing an example of generating the motion vector candidate list.

It is assumed that a spatial motion vector candidate (1, 0) which is not spatially scaled is derived from a block positioned at A1 of FIG. 18(b), and a scaled temporal motion vector candidate (2, 3) is derived from a block positioned at H of FIG. 18(a). Herein, as an example shown in FIG. 18(c), a spatial motion vector candidate derived from the block positioned at A1 and a temporal motion vector candidate derived from the block positioned at H are sequentially added to the motion vector candidate list.

The derived motion vector candidates are added to the motion vector candidate list according to a predetermined order. In one embodiment, after adding the spatial motion vector candidate to the motion vector candidate list, the temporal motion vector candidate may be added to the motion vector candidate list when the number of motion vector candidates included in the motion vector candidate list is smaller than the maximum number of motion vector candidates. Alternatively, the temporal motion vector candidate may be added to the motion vector candidate list by having a higher priority than the spatial motion vector candidate. Herein, the spatial motion vector candidate may selectively added to the motion vector candidate list according to whether or not the spatial motion vector candidate is identical to the temporal motion vector candidate.

In addition, the encoding apparatus and the decoding apparatus may assign indexes to the motion vector candidates to distinguish thereof according to an order added to the motion vector candidate list. As shown in FIG. 18(c), an index value of the motion vector candidate derived from the block positioned at A1 is set to 0, and an index value of the motion vector candidate derived from the block positioned at H is set to 1.

In addition to the spatial motion vector candidate and the temporal motion vector candidate, a motion vector having a predetermined value may be added to the motion vector candidate list. In one embodiment, when a number of motion vector candidates included in the motion vector list is smaller than the maximum number of motion vector candidates, a motion vector having 0 value may be added to the motion vector candidate list.

FIG. 19 is a view showing an example of adding the motion vector having the predetermined value to the motion vector candidate list.

In an example shown in FIG. 19, 'numMVPCandLX' represents a number of motion vector candidates included in a motion vector candidate list mvpListLX. In one embodiment, numMVPCandL0 may represent a number of motion vector candidates included in a motion vector candidate list mvpListL0.

In addition, maxNumMVPCand represents the maximum number of motion vector candidate which may be included in the motion vector candidate list mvpListLX. numMVPCandLX and maxNumMVPCand may have an integer value including 0.

When numMVPCandLX is smaller than maxNumMVPCand, a motion vector having a predetermined value is added to the motion vector candidate list, and numMVPCandLX is increased by 1. Herein, the motion vector added to the motion vector candidate list may have a fixed value, and lastly added to the motion vector candidate list. In one embodiment, a motion vector (0, 0) having the predetermined value and added to the motion vector candidate list may be a zero motion vector candidate.

In one embodiment, as an example shown in FIG. 19(a), when numMVPCandLX is 1 and maxNumMVPCand is 2, a single zero motion vector candidate having a (0, 0) value is added to the motion vector candidate list, and numMVPCandLX is increased by 1.

When a difference value between maxNumMVPC and numMVPCandLX is equal to or greater than 2, a motion vector having a predetermined value may be included in the motion vector candidate list by repeating by the difference value.

In one embodiment, when maxNumMVPCand is 2 and numMVPCandLX is 0, a motion vector having a predetermined value may be added to the motion vector candidate list until numMVPCandLX and maxNumMVPCand becomes equal (or identical?). In FIG. 19(b), two zero motion vector candidates having a (0, 0) value are added to the motion vector candidate list.

In another embodiment, the motion vector having the predetermined value may be included in the motion vector candidate list when a motion vector candidate that is identical to the motion vector having the predetermined value is not included in the motion vector candidate list.

In one embodiment, when numMVPCandLX is smaller than maxNumMVPCand and the motion vector candidate list does not includes the motion vector having a (0, 0) value, as in an example shown in FIG. 19(c), the motion vector having a (0, 0) value is added to the motion vector candidate list, and numMVPCandLX is increased by 1.

In FIG. 19, for example, a value of a predefined motion vector added to the motion vector candidate list is (0, 0), but the value of the predefined motion vector added to the motion vector candidate list is not limited to the example value. In addition, as the example shown in FIG. 19(b), when a plurality of predefined motion vector candidates is added, the plurality of motion vector candidates added to the motion vector candidate list may have different values.

The encoding apparatus and the decoding apparatus may adjust a size of the motion vector candidate list by removing the motion vector candidate included in the motion vector candidate list.

In one embodiment, the encoding apparatus and the decoding apparatus may inspect whether or not identical motion vector candidates are present within the motion vector candidate list. When identical motion vector candidates are present within the motion vector candidate list, except for a motion vector candidate having the smallest motion vector candidate index, remaining motion vector candidates among the identical motion vector candidate are removed from the motion vector candidate list.

Determining whether or not the motion vector candidates are identical may be applied to the spatial motion vectors or to the temporal motion vectors, or may be applied to the spatial motion vector and the temporal motion vector.

When the number of motion vector candidates included in the motion vector candidate list is greater than the maximum number of motion vector candidates that may be included in the motion vector candidate list, a number of motion vector candidates which corresponds to a difference value between the number of motion vector candidates included in the motion vector candidate list and the maximum number of the motion vector candidates may be removed from the motion vector candidate list.

FIG. 20 is a view showing an example of removing the motion vector candidate from the motion vector candidate list.

When numMVPCandLX is equal to or greater than maxNumMVPCand, a motion vector candidate having an index greater than maxNumMVPCand−1 may be removed from the motion vector candidate list.

In one embodiment, in the example shown in FIG. 20, for example, when numMVPCandLX 3 and maxNumMVPCand is 2, a motion vector candidate (4, −3) having been assigned with an index 2 that is greater than maxNumMVPCand−1 is removed from the motion vector candidate list.

Based on granularity information, the spatial/temporal motion vector candidate may be shared in blocks having a block size or a block depth smaller or deeper than the granularity information.

Herein, sharing the spatial/temporal motion vector candidate may mean that blocks sharing the spatial/temporal motion vector candidate may generate respective motion vector candidate lists based on an identical spatial/temporal motion vector candidate.

Alternatively, sharing the spatial/temporal motion vector candidate may mean that blocks sharing the spatial/temporal motion vector candidate may perform motion compensation by using a single motion vector candidate list. Herein, the shared motion vector candidate list may include at least one of spatial/temporal motion vector candidates derived based on a higher block having a block size or block depth indicated by the granularity information.

Then, the adding of the combined motion vector candidate to the motion vector candidate list will be described.

When a number of motion vector candidates included in the motion vector candidate list is smaller than the maximum number of motion vector candidates, a combined motion vector may be added to the motion vector candidate list by using at least one of the motion vector candidates included in the motion vector candidate list. In one embodiment, the combined motion vector candidate may be generated by using at least one of the spatial motion vector candidate, the temporal motion vector candidate, and the zero motion vector candidate included in the motion vector candidate list, and the generated combined motion vector candidate may be included in the motion vector candidate list.

Alternatively, the combined motion vector candidate may be generated by using a motion vector candidate that is not included in the motion vector candidate list. In one embodiment, the combined motion vector candidate may be generated by using a motion vector candidate that is not included in the motion vector candidate list, and which is derived from a block used for deriving at least one of the spatial motion vector candidate and the temporal motion vector candidate, or by using a motion vector candidate having a predefined value (for example, zero motion vector) and which is not included in the motion vector candidate list.

Alternatively, the combined motion vector candidate may be generated based on at least one of an encoding parameter, or the combined motion vector candidate may be added to the motion vector candidate list based on at least one of the encoding parameter.

The maximum number of motion vector candidates that may be include in the motion vector candidate list may be increased by a number of combined motion vectors or by a number that is less than the number of combined motion vectors, after adding at least one of the spatial motion vector candidate, the temporal motion vector candidate, and the motion vector candidate having the preset value. In one embodiment, maxNumMVPCandList may have a first value for the spatial motion vector candidate or the temporal motion vector candidate, in order to additionally insert the combined motion vector candidate, maxNumMVPCandList is increased to a second value, greater that the first value, after adding the spatial motion vector candidate or the temporal motion vector candidate.

As described above, based on the granularity information, the combined motion vector candidate may be shared in blocks having the block size or the block depth smaller or deeper than the granularity information.

Herein, sharing the combined motion vector candidate may mean that blocks sharing the combined motion vector candidate may generate respective motion vector candidate lists based on an identical combined motion vector candidate.

Alternatively, sharing the combined motion vector candidate may mean that blocks sharing the combined motion vector candidate may perform motion compensation by using a single motion vector candidate list. Herein, the shared motion vector candidate list may include at least one of combined motion vector candidates derived based on a higher block having a block size or block depth indicated by the granularity information.

FIG. 21 is a view showing an example of the motion vector candidate list.

The current block may perform motion compensation by using a motion vector candidate included in a motion vector candidate list. Motion compensation of the current block may be performed by using a single motion vector for a single reference picture list, or may be performed by using a plurality of motion vectors for a single reference picture list. In one embodiment, when an inter prediction direction of the current block is in two directions, motion compensation of the current block may be performed by deriving a single motion vector for respective reference picture lists L0 and L1, or may be performed by deriving two motion vectors for the reference picture list L0.

The motion vector candidate list may include at least one of a spatial motion vector candidate, a temporal motion vector candidate, a zero motion vector candidate, and a combined motion vector candidate generated by combining two or more thereof. Respective motion vector candidates may be identified by motion vector candidate indexes.

According to the inter prediction direction of the current block, a motion vector candidate set including a plurality of motion vector candidates may be identified by a single motion vector candidate index. Herein, the motion vector candidate set may include N motion vector candidates according to a number N of inter prediction directions of the current block. In one embodiment, the motion vector candidate set may include a plurality of motion vector candidate such as first motion vector candidate, second motion vector candidate, third motion vector candidate, and fourth motion vector candidate, etc.

The motion vector candidate set may be generated by combining at least two of the spatial motion vector candidate, the temporal motion vector candidate, and the zero motion vector candidate. In one embodiment, in FIG. 21, for example, the motion vector candidate set including two motion vector candidates is assigned to motion vector candidate index 4~13. In addition, for example, respective motion vector candidate sets are generated by combining spatial motion vector candidates mxLXA and mxLXB, a temporal motion vector mxLXCol, and a zero motion vector mvZero.

According to a prediction direction of a reference picture list LX, at least one motion vector may be derived from a reference picture list. In one embodiment, when one-directional prediction is performed for the reference picture list LX, a motion vector of the current block may be derived by using any one of motion vector candidates assigned to motion vector index 0 to 3. Meanwhile, when two-directional prediction is performed for the reference picture list LX, the motion vector of the current block may be derived by using motion vector candidate sets assigned to motion vector index 4 to 13. In other words, when encoding/decoding, at least one motion vector may be derived based on the motion vector candidate included in the motion vector candidate list.

The motion vector of the current block may be derived by adding a motion vector difference value to the motion vector candidate. In one embodiment, in the example shown in FIG. 21, for example, the motion vector is derived by adding a motion vector difference value MVD to a selected motion vector candidate when any one of motion vector candidates assigned to motion vector candidate index 0 to 3 is selected.

When a motion vector candidate set including a plurality of motion vector candidates is selected, a plurality of motion vectors of the current block may be derived based on the plurality of motion vector candidates included in the motion vector candidate set. Herein, respective motion vector difference values of the plurality of motion vectors included in the motion vector candidate set may be encoded/decoded. Herein, the plurality of motion vectors of the current block may be derived by adding up motion vector difference values corresponding to respective motion vector candidates.

In another embodiment, a part of motion vector difference values of motion vector candidates among the plurality of motion vector candidates included in the motion vector candidate set may be encoded/decoded. In one embodiment, a single motion vector difference value of the motion vector candidate set including the plurality of motion vector candidate may be encoded/decoded. Herein, the current block may use a motion vector derived by adding a motion vector difference value to any one of motion vector candidates included in the motion vector candidate set, and a motion vector derived by the motion vector candidate as it is. In the example shown in FIG. 21, for example, for a motion vector candidate set including two motion vector candidates, one of a first motion vector and a second motion vector may be derived by adding a motion vector difference value to any one of the two motion vector candidates, and the other one is identical to the motion vector candidate.

In another embodiment, the plurality of motion vector candidates included in the motion vector candidate set may share an identical motion vector difference value.

An inter prediction indicator may indicate one-directional prediction or multi-directional prediction for a predetermined reference picture list. In one embodiment, the inter prediction indicator may be represented as PRED_LX indicating one-directional prediction for a reference picture list LX, PRED_BI_LX indicating bi-directional prediction for the reference picture list LX, etc. Herein, X may be an integer including 0, and represent an index of the reference picture list such as 0, 1, 2, 3, etc.

In one embodiment, when performing one-directional prediction for a reference picture list L0, the inter prediction indicator may be set to PRED_L0. In addition, when performing one-directional prediction for a reference picture list L1, the inter prediction indicator may be set to PRED_L1.

Meanwhile, when performing bi-directional prediction for the reference picture list L1, the inter prediction indicator may be set to PRED_BI_L1. When the inter prediction indicator for the reference picture list L1 is PRED_BI_L1, the current block may perform inter prediction by deriving two motion vectors by using the motion vector candidate list, and by deriving two prediction blocks from a reference picture included in the reference picture list L1. Herein, each of the two prediction blocks may be derived from two reference pictures different from each other and included in the reference picture list L1, or may be derived from a single reference picture included in the reference picture list L1.

The inter prediction indicator may be encoded/decoded to represent the total number of prediction directions of the current block, or may be encoded/decoded to represent a number of prediction directions of each reference picture list.

In one embodiment, the inter prediction indicator indicating one-directional prediction (PRED_L0) for the reference picture list L0, and the inter prediction indicator indicating bi-directional prediction (PRED_BI_L1) for the reference picture list L1 may be encoded for the current block. Alternatively, when one-directional prediction for the reference picture list L0 is performed, and bi-directional prediction for the reference picture list L1 is performed, an inter prediction indicator for the current block may indicate PRED_TRI.

The example shown in FIG. 21 shows a motion vector candidate list mvpListLX for a specific reference picture list LX. When a plurality of reference picture lists are present such as L0, L1, L2, L3, etc., a motion vector candidate list may be generated for each reference picture list. Accordingly, at least one to the maximum N prediction blocks may be generated, and the generated prediction block may be used for inter prediction or motion compensation of the current block. Herein, N is an integer equal to greater than 1, may represent 2, 3, 4, 5, 6, 7, 8, etc.

At least one of motion vector candidates included in the motion vector candidate list may be determined as a predicted motion vector (or motion vector predictor) of the current block. The determined predicted motion vector may be used for calculating the motion vector of the current block, and the motion vector may be used for inter prediction or motion compensation of the current block.

When the current block selects a motion vector candidate set including a plurality of motion vector candidates, the plurality of motion vector candidates included in the motion vector candidate set and the motion vector of the current block calculated based on the plurality of motion vector candidates may be stored as information about motion compensation of the current block. Herein, the stored information about motion compensation of the current block may be used later for generating a motion vector candidate list in a neighboring block or for motion compensation.

In the example shown in FIG. 21, for example, a motion vector candidate list is generated for each reference picture list. The motion vector candidate list may be generated for each reference picture. In one embodiment, when bi-directional prediction is performed for a reference picture list LX, a first motion vector candidate list may be generated for a first reference picture used for bi-directional prediction among reference pictures included in the reference picture list LX, and a second motion vector candidate list may be generated for a second reference picture used for bi-directional prediction.

Figures 22, 23:
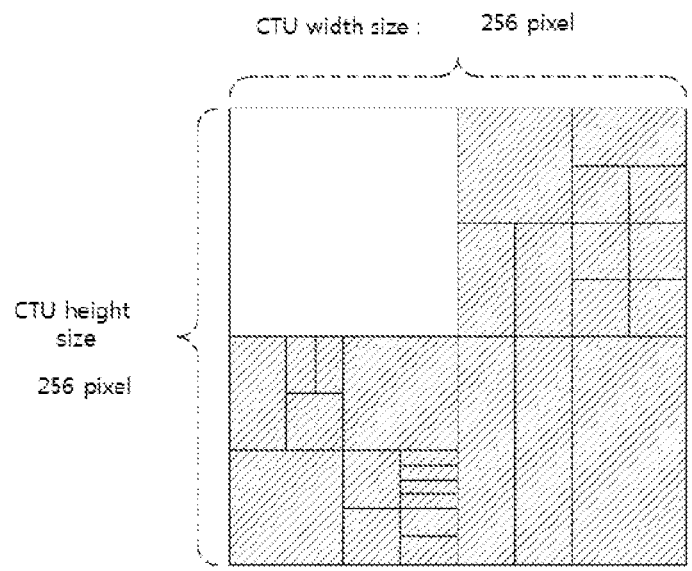
FIG. 22 is a view showing an embodiment of sharing the motion vector candidate list according to granularity information in the coding tree unit (CTU).
FIG. 23 is a view showing an example of deriving a predicted motion vector candidate of the current block from the motion vector candidate list.

FIG. 22 is a view showing an embodiment of sharing the motion vector candidate list according to granularity information in the coding tree unit (CTU).

Referring to FIG. 22, when granularity information indicates 128×128, hatched blocks having a block size smaller than 128×128 may share a motion vector candidate list. Herein, the shared motion vector candidate list may be a motion vector candidate list generated for each reference picture list.

In addition, the motion vector candidate list may be generated for each reference picture index. Accordingly, the shared motion vector candidate list may be a motion vector candidate list generated for each reference picture index.

Meanwhile, the motion vector candidate list may be generated in a predefined number regardless of each reference picture list and each reference picture index. Accordingly, the shared motion vector candidate list may be the motion vector candidate list generated in the predefined number. Herein, the predefined number may be a positive integer including 0.

Then, steps S1203 and S1304 of determining the predicted motion vector from the vector candidate list will be described.

A motion vector candidate indicated by the motion vector candidate index among motion vector candidates included in the motion vector candidate list may be determined as the predicted motion vector of the current block.

FIG. 23 is a view showing an example of deriving the predicted motion vector of the current block from the motion vector candidate list.

In FIG. 23, the maximum number maxNumMVPCand of motion vector candidates which may be included in the motion vector candidate list is 2, and a number of motion vector candidates included in the motion vector candidate list is also 2. Herein, when a motion vector candidate index indicates a first index, (2, 3) that is a second motion vector candidate included in the motion vector candidate list (in other words, a motion vector candidate having been assigned the first index) may be determined as the predicted motion vector of the current block.

The encoding apparatus may calculate a motion vector difference value by calculating a difference value between the motion vector and the predicted motion vector. The decoding apparatus may calculate the motion vector by adding up the predicted motion vector and the motion vector difference value.

Although it is not shown, when the motion vector candidate index indicates a motion vector candidate set, a plurality of motion vectors may be derived from a plurality of motion vector candidates included in the motion vector candidate set. Herein, the motion vector of the current block may be the motion vector candidate to which the motion vector difference value is added, or may have the same value with the motion vector candidate.

Meanwhile, within a block having a block size indicated by granularity information, the predicted motion vector may be identically determined for sub-blocks having a block size smaller than the block size indicated by the granularity information.

In addition, within a block having a block depth indicated by the granularity information, the predicted motion vector may be identically determined for sub-blocks having a block depth deeper than the block depth indicated by the granularity information.

Then, steps S1204 and S1305 of performing motion compensation by using the motion vector will be described.

The encoding apparatus and the decoding apparatus may calculate a motion vector by using the predicted motion vector and the motion vector difference value. When the motion vector is calculated, prediction or motion compensation may be performed by using the calculated motion vector. Alternatively, as the example shown in FIG. 21, the motion vector prediction value may be determined as the motion vector as it is.

The current block may have at least one to the maximum N motion vectors according to a prediction direction. A final prediction block of the current block may be derived by generating at least one to the maximum N prediction blocks by using the motion vector.

In one embodiment, when the current block has a single motion vector, a prediction block generated by using the motion vector may be determined as a final prediction block of the current block.

Meanwhile, when the current block has a plurality of motion vectors, a plurality of prediction blocks are generated by using the plurality of motion vectors, and a final prediction block of the current block may be determined based on a weighted sum of the plurality of prediction blocks. Reference pictures including respective plurality of prediction blocks indicated by the plurality of motion vectors may be included in the same reference picture list or in the reference picture lists different from each other.

In one embodiment, a plurality of prediction blocks may be generated based on at least one of a spatial motion vector candidate, a temporal motion vector candidate, a motion vector having a predetermined value, and a combined motion vector candidate, and a final prediction block of the current block may be determined based on a weighted sum of the plurality of prediction blocks.

In another embodiment, a plurality of prediction blocks may be generated based on motion vector candidates indicated by preset motion vector candidate indexes, and a final prediction block of the current block may be determined based on a weighted sum of the plurality of prediction blocks. Alternatively, a plurality of prediction blocks may be generated based on motion vector candidates present in a range of a preset motion vector candidate index, and a final prediction block of the current block may be determined based on a weighted sum of the plurality of prediction blocks.

A weighting factor applied to each prediction block may be 1/N (herein, N is a number of generated prediction blocks) and have a uniform value. In one embodiment, when two prediction blocks are generated, a weighting factor applied to each prediction block may be ½, when three prediction blocks are generated, a weighting factor applied to each prediction block may be ⅓, when four prediction blocks are generated, a weighting factor applied to each prediction block may be ¼. Alternatively, a final prediction block of the current block may be determined by applying a different weighting factor to each prediction block.

The weighting factor may not have a fixed value for each prediction block, and the weighting factor may have a variable value for each prediction block. Herein, a weighting factor applied to each prediction block may be the same, or different from each other. In one embodiment, when two prediction blocks are generated, weighting factors applied to the two prediction blocks may be (½, ½), or may be variable values such as (⅓, ⅔), (¼, ¾), (⅖, ⅗), (⅜, ⅝), etc. Meanwhile, a weighting factor may be a positive real number value or a negative real number value. In one embodiment, the weighting factor may include a negative real number such as (−½, 3/2), (−⅓, 4/3), (−¼, 5/4), etc.

Meanwhile, in order to apply a variable weighting factor, at least one piece or more of weighting factor information for the current block may be signaled through a bitstream. The weighting factor information may be signaled for each prediction block, or may be signaled for each reference picture. A plurality of prediction blocks may share one piece of weighting factor information.

The encoding apparatus and the decoding apparatus may determine whether or not a predicted motion vector is used based on a prediction block list utilization flag. In one embodiment, when the prediction block list utilization flag indicates 1 that is a first value for each reference picture list, it may mean that the encoding apparatus and the decoding apparatus may use the predicted motion vector of the current block for performing inter prediction or motion compensation. When the prediction block list utilization flag indicates 0 that is a second value, it may mean that the encoding apparatus and the decoding apparatus may not use the predicted motion vector of the current block for performing inter prediction or motion compensation. Meanwhile, the first value of the prediction block list utilization flag may be set to 0, and the second value may be set to 1. The below Formulas 3 to 5 show examples of generating a final prediction block of the current block when inter prediction indicators of the current block are PRED_BI, PRED_TRI, and PRED_QUAD, respectively, and a prediction direction for each reference picture list is in unidirectional prediction.

$$P\_BI=(WF\_L0*P\_L0+OFFSET\_L0+WF\_L1*P\_L1+OFFSET\_L1+RF)>>1 \qquad \text{[Formula 3]}$$

$$P\_TRI=(WF\_L0*P\_L0+OFFSET\_L0+WF\_L1*P\_L1+OFFSET\_L1+WF\_L2*P\_L2+OFFSET\_L2+RF)/3 \qquad \text{[Formula 4]}$$

$$P\_QUAD=(WF\_L0*P\_L0+OFFSET\_L0+WF\_L1*P\_L1+OFFSET\_L1+WF\_L2*P\_L2+OFFSET\_L2+WF\_L3*P\_L3+OFFSET\_L3+RF)>>2 \qquad \text{[Formula 5]}$$

In Formula 3 to 5, P_BI, P_TRI, and P_QUAD may represent final prediction blocks of the current block, and LX (X=0, 1, 2, 3) may refer to a reference picture list. WF_LX may represent a weighting factor value of a prediction block generated by using LX, and OFFSET_LX may represent an offset value of the prediction block generated by using LX. P_LX may mean a prediction block generated by using the motion vector for LX of the current block. RF may refer to a rounding factor, and may set to 0, or a positive number or negative number. LX reference picture list may be at least one of a long-term reference picture, a reference picture without deblocking filter being performed, a reference picture without sample adaptive offset being performed, a reference picture without adaptive loop filter being performed, a reference picture with deblocking filter and adaptive loop filter being performed, a reference picture with deblocking filter and sample adaptive offset being performed, and a reference picture with deblocking filter, sample adaptive offset, and adaptive loop filter being performed. Herein, LX reference picture list may be at least one of a L2 reference picture list and a L3 reference picture list.

When a prediction direction of a predetermined reference picture list is in multi-directions, a final prediction block of the current block may be obtained based on a weighted sum of prediction blocks. Herein, weighting factors applied to prediction blocks derived from the same reference picture list may have the same value, or may have different values.

At least one of a weighting factor WF_LX and an offset OFFSET_LX of a plurality of prediction blocks may be an encoding parameter to be entropy encoded/decoded. In another embodiment, a weighting factor and an offset may be derived from an encoded/decoded neighboring block adjacent to the current block. Herein, the neighboring block adjacent to the current block may include at least one of a block used for deriving a spatial motion vector candidate of the current block, and a block used for deriving a temporal motion vector candidate of the current block.

In another embodiment, a weighting factor and an offset may be determined based on a POC of the current picture and each reference picture. Herein, the longer the distance between the current picture and the reference picture is, the smaller value the weighting factor or the offset is set. The shorter the distance between the current picture and the reference picture is, the larger value the weighting factor or the offset is set. In one embodiment, when a POC difference between the current picture and a reference picture L0 is 2, a weighting factor value applied to a prediction block generated by referencing the reference picture L0 may be set to ⅓. Meanwhile, when the POC difference between the current picture and the reference picture L0 is 1, the weighting factor value applied to the prediction block generated by referencing the reference picture L0 may be set to ⅔. As shown above, the weighting factor value or the offset value may be inversely related to a POC difference between the current picture and the reference picture. In another embodiment, the weighting factor value or the offset value may be positively related to the POC difference between the current picture and the reference picture.

In another embodiment, at least one of the weighting factor and the offset may be entropy encoded/decoded based on at least one encoding parameter. In addition, a weighted sum of prediction blocks may be calculated based on at least one encoding parameter.

A weighted sum of plurality of prediction blocks may be applied to a partial region within the prediction block. Herein, the partial region may be a region corresponding to a boundary within the prediction block. In order to apply the weighted sum to the partial region, a weighted sum may be calculated in a unit of a sub-block unit of the prediction block.

Within a block having a block size indicated by granularity information, inter prediction or motion compensation for sub-blocks having a block size smaller than the block size indicated by the granularity information may be performed by using the same prediction block or the same final prediction block.

In addition, within a block having a block depth indicated by granularity information, inter prediction or motion compensation for sub-blocks having a block depth deeper than the block depth indicated by the granularity information may be performed by using the same prediction block or the same final prediction block.

Then, steps S1205 and S1301 of entropy encoding/decoding of information about motion compensation will be described.

FIG. 24 (FIG. 24A and FIG. 24B) is a view showing a syntax of information about motion compensation.

The encoding apparatus may entropy encode information about motion compensation to a bitstream, and the decoding apparatus may entropy decode information about motion compensation included in the bitstream. Herein, information about motion compensation to be entropy encoded/decoded may include at least one of an inter prediction indicator inter_pred_idc, reference picture indexes ref_idx_10, ref_idx_11, ref_idx_12, and ref_idx_13, motion vector candidate indexes mvp_10_jdx, mvp_11_jdx, mvp_12_jdx, and mvp_13_jdx, a motion vector residual, weighting factor values wf_10, wf_11, wf_12, and wf_13, and offset values offset_10, offset_11, offset_12, and offset_13.

When the current block is encoded/decoded through inter prediction, an inter prediction indicator may refer to at least one of an inter prediction direction and a number of prediction directions of the current block. In one embodiment, the inter prediction indicator may indicate one-directional prediction, or may indicate multi-directional prediction such as bi-directional prediction, three-directional prediction or four-directional prediction, etc. The inter prediction indicator may refer to a number of reference pictures used when generating the prediction block of the current block. In addition, a single reference picture may be used for multi-directional prediction. Herein, prediction in N directions may be performed by using M reference pictures (N>M). The inter prediction indicator may refer to a number of prediction blocks used when performing inter prediction or motion compensation of the current block.

Accordingly, according to the inter prediction indicator, a number of reference pictures used when generating the prediction block of the current block, a number of prediction blocks used when performing inter prediction or motion compensation of the current block, and a number of reference picture lists used by the current block may be determined. Herein, the number N of reference picture lists is a positive integer, and may have a value of 1, 2, 3, 4, or more. For example, the reference picture list may include L0, L1, L2, and L3. The current block may perform motion compensation by using at least one reference picture list.

In one embodiment, the current block may perform motion compensation of the current block by generating at least one prediction block by using at least one reference picture list. In one embodiment, motion compensation may be performed by generating a single prediction block or at least one prediction block by using the reference picture list L0, or may be performed by generating a single prediction block or at least one prediction block by using the reference picture lists L0 and L1. Alternatively, motion compensation may be performed by generating a single prediction block, at least one prediction block, or maximum N prediction blocks (herein, N is 3 or a positive integer equal to or greater than 2) by using the reference picture list L0, L1, and L2. Alternatively, motion compensation of the current block may be performed by generating a single prediction block, at least one prediction block, or maximum N prediction blocks (herein, N is 4 or a positive integer equal to or greater than 3) by using the L0, L1, L2, and L3.

The reference picture indicator may indicate one direction PRED_LX, two directions PRED_BI, three directions PRED_TRI, four directions PRED_QUAD, or more according to a number of prediction directions of the current block.

In one embodiment, when it is assumed that one-directional prediction is performed for each reference picture list, the inter prediction indicator PRED_LX may mean that a single prediction block is generated by using the reference picture list LX (X is an integer such as 0, 1, 2, 3, etc.), and inter prediction or motion compensation is performed by using the generated single prediction block. In addition, the inter prediction indicator PRED_BI may mean that two prediction blocks are generated by using at least one of reference picture lists L0, L1, L2, and L3, and inter prediction or motion compensation is performed by using the generated two prediction blocks. In addition, the inter prediction indicator PRED_TRI may mean that three prediction blocks are generated by using at least one of reference picture lists L0, L1, L2, and L3, and inter prediction or motion compensation is performed by using the generated three prediction blocks. In addition, the inter prediction indicator PRED_QUAD may mean that four prediction blocks are generated by using at least one of reference picture lists L0, L1, L2, and L3, and inter prediction or motion compensation is performed by using the generated four prediction blocks. In other words, the summation of a number of prediction blocks used for performing inter prediction of the current block may be set as the inter prediction indicator.

When multi-directional prediction is performed for the reference picture list, the inter prediction indicator PRED_BI may mean that bi-directional prediction is performed for the reference picture list L0. In addition, the inter prediction indicator PRED_TRI may mean that three-directional prediction is performed for the reference picture list L0, or the inter prediction indicator PRED_TRI may mean that one-directional prediction for the reference picture list L0, and bi-directional prediction for the reference picture list L1, or the inter prediction indicator PRED_TRI may mean that bi-directional prediction is performed for the reference picture list L0, and one-directional prediction for the reference picture list L1.

Accordingly, the inter prediction indicator may mean that motion compensation is performed by generating at least one to the maximum N prediction blocks (herein, N is a number of prediction directions indicated by the inter prediction indicator) from at least one reference picture list, or may mean that motion compensation of the current block is performed by generating at least one to the maximum N prediction blocks from N reference pictures and by using the generated prediction blocks.

For example, the inter prediction indicator PRED_TRI may mean that inter prediction or motion compensation of the current block is performed by generating three prediction blocks by using at least one of reference picture lists L0, L1, and L2, or may mean that inter prediction or motion compensation of the current block is performed by generating three prediction blocks by using at least three of reference picture lists L0, L1, L2, and L3. In addition, the PRED_QUAD may refer to the inter prediction indicator in which inter prediction or motion compensation of the current block is performed by generating four prediction blocks by using at least one of reference picture lists L0, L1, L2, and L3, or inter prediction or motion compensation of the current block is performed by generating four prediction blocks by using at least four of reference picture lists L0, L1, L2, and L3.

Available inter prediction directions may be determined according to the inter prediction indicator, and all or a part of the available inter prediction directions may be selectively used based on a size or shape or both of the current block.

A prediction list utilization flag indicates whether or not the prediction block is generated by using the corresponding reference picture list.

In one embodiment, when the prediction list utilization flag indicates 1 that is a first value, the prediction block may be generated by using the corresponding reference picture list. When the prediction list utilization flag indicates 2 that is a second value, the prediction block may not be generated by using the corresponding reference picture list. Herein, the first value of the prediction list utilization flag may be set to 0, and the second value may be set to 1.

In other words, when the prediction list utilization flag indicates the first value, the prediction block of the current block may be generated by using motion information corresponding to the corresponding reference picture list.

Meanwhile, the prediction list utilization flag may be set based on the inter prediction indicator. In one embodiment, when the inter prediction indicator indicates PRED_LX, PRED_BI, PRED_TRI or PRED_QUAD, a prediction list utilization flag predFlagLX may be set to 1 that is a first value. When the inter prediction indicator is PRED_LN (N is a positive integer which is not X), the prediction list utilization flag predFlagLX may be set to—that is a second value.

In addition, the inter prediction indicator may be set based on the prediction list utilization flag. In one embodiment, when prediction list utilization flags predFlagL0 and predFlagL1 indicate 1 that is the first value, the inter prediction indicator may be set to PRED_BI. In one embodiment, when only the prediction list utilization flag predFlagL0 indicates 1 that is the first value, the inter prediction indicator may be set to PRED_L0.

A number of reference pictures included in each reference picture list may be predefined, or may be entropy encoded in the encoding apparatus and transmitted to the decoding apparatus. In one embodiment, a syntax element 'num_ref_idx_1X_active_minus1' (herein, X indicates an index of a reference picture such as 0, 1, 2, 3, etc.) may represent a number of reference pictures of a reference picture list such as L0, L1, L2, L3, etc.

The reference picture index may specify a reference picture referenced by the current block in each reference picture list. At least one reference picture index for each reference picture list may be entropy encoded/decoded. The current block may perform motion compensation by using at least one reference picture index.

When N reference pictures are selected through N reference picture indexes, motion compensation of the current block may be performed by generating at least one to N prediction blocks (or, equal to or greater than N).

A motion vector candidate index represents a motion vector candidate of the current block in a motion vector candidate list generated by each reference picture list or by each reference picture index. At least one motion vector candidate index for each motion vector candidate list may be entropy encoded/decoded. The current block may perform motion compensation by using at least one motion vector candidate index.

In one embodiment, motion compensation of the current block may be performed by generating at least one to N prediction blocks (or, equal to or greater than N) based on N motion vector candidate indexes.

A motion vector residual represents a difference value between the motion vector and the predicted motion vector. At least one motion vector residual of a motion vector candidate list of the current block generated for each reference picture list or for each reference picture index may be entropy encoded/decoded. The current block may perform motion compensation by using at least one motion vector residual.

In one embodiment, motion compensation of the current block may be performed by generating at least one to the maximum N prediction blocks (or, equal to or greater than N) by using N motion vector residuals.

When at least two prediction blocks are generated when performing motion compensation of the current block, a final prediction block of the current block may be generated through a weighted sum of each prediction block. When calculating the weighted sum, at least one of a weighting factor and an offset may be applied to each prediction block. At least one weighted sum factor that is used for calculating a weighted sum such as weighting factor, and offset, or a number of weighted sum factors as much as at least one number of reference picture lists, reference pictures, motion vector candidate indexes, motion vector residuals, and motion vectors may be entropy encoded/decoded. Herein, the weighted sum factor may include at least one of a weighting factor, and an offset.

The weighted sum factor may be derived from index information specifying any one of groups predefined in the encoding apparatus and the decoding apparatus. Herein, index information for specifying at least one of a weighting factor and an offset may be entropy encoded/decoded. The group predefined in the encoder and the decoder may be respectively defined for the weighting factor and the offset. The predefined group may include a single or more weighting factor candidates, or a single or more offset candidates. In addition, a table for defining a mapping relationship between the weighting factor and the offset may be used. Herein, a weighting factor value and an offset value of the prediction block may be obtained from the table by using a single piece of index information. Index information of the offset which is matched to index information of the weighting factor being entropy encoded/decoded may be entropy encoded/decoded.

Information related to the weighted sum factor may be entropy encoded/decoded in a block unit, or may be entropy encoded/decoded at a higher level. In one embodiment, the weighting factor or the offset may be entropy encoded/decoded in a block unit such as CTU, CU, PU, etc., or may be entropy encoded/decoded at a higher level such as video parameter set, sequence parameter set, picture parameter set, adaptation parameter set, slice header, etc.

The weighted sum factor may be entropy encoded/decoded based on a difference value between the weighted sum factor and a weighted sum factor prediction value. In one embodiment, the weighting factor prediction value and a weighting factor difference value may be entropy encoded/decoded, or an offset prediction value and an offset difference value may be entropy encoded/decoded. Herein, the weighting factor difference value may represent a difference value between the weighting factor and the weighting factor prediction value, and the offset difference value may represent a difference value between the offset and the offset prediction value.

Herein, the weighted sum factor difference value may be entropy encoded/decoded in a block unit, the weighted sum factor prediction value may be entropy encoded/decoded at a higher level. When the weighted sum factor prediction value of the weighting factor prediction value or the offset prediction value is entropy encoded/decoded in a picture or slice unit, blocks included in the picture or in the slice may use a common weighted sum factor prediction value.

The weighted sum factor prediction value may be derived by using a specific region within a picture, a slice, or a tile, or by using a specific region within a CTU, or a CU. In one embodiment, a weighting factor value or an offset value of a specific region are within a picture, a slice, a tile, a CTU, and a CU may be used as a weighting factor prediction value or an offset prediction value. Herein, entropy encoding/decoding of the weighted sum factor prediction value may be omitted, and the weighted sum factor difference value may be entropy encoded/decoded.

Alternatively, the weighted sum factor prediction value may be derived from an encoded/decoded neighboring block adjacent to the current block. In one embodiment, a weighting factor value or an offset value of an encoded/decoded neighboring block adjacent to the current block may be set as a weighting factor prediction value or an offset prediction value of the current block. Herein, the neighboring block of the current block may include at least one of a block used for deriving a spatial motion vector candidate, and a block used for deriving a temporal motion vector candidate.

When the weighting factor prediction value and the weighting factor difference value are used, the decoding apparatus may calculate a weighting factor value of a prediction block by summing the weighting factor prediction value and the weighting factor difference value. In addition, when offset prediction value and the offset difference value are used, the decoding apparatus may calculate an offset value of the prediction block by summing the offset prediction value and the offset difference value.

The weighted sum factor or a difference value of the weighted sum factor may be entropy encoded/decoded based on at least one encoding parameter.

A weighted sum factor, a prediction value of the weighted sum factor, or a difference value of the a weighted sum factor may be derived as a weighted sum factor, a prediction value of the weighted sum factor, or a difference value of the weighted sum factor of the current block based on at least one of encoding parameters.

Rather than entropy encoding/decoding information about the weighted sum factor of the current block, a weighted sum factor of an encoded/decoded block adjacent to the current block may be used as the weighted sum factor of the current block. In one embodiment, the weighting factor or the offset of the current block may be set to a value identical to the weighting factor or the offset of the encoded/decoded neighboring block adjacent to the current block.

The current block may perform motion compensation by using at least one weighted sum factor, or may perform motion compensation by using at least one derived weighted sum factor.

At least one piece of information about the above motion compensation may be entropy encoded/decoded in any one unit of a CTU, a sub-CTU of the CTU. Herein, the sub-CTU of the CTU may include at least one unit of a CU, and a PU. The sub-CTU of the CT may be a square shape or a non-square shape. Information about motion compensation which will be described later may refer to at least one piece of information about motion compensation for convenience.

When information about motion compensation is entropy encoded/decoded in a CTU, all or a part of blocks present in the CTU may perform motion compensation by using the corresponding information about the motion compensation.

When information about motion compensation is entropy encoded/decoded in a CTU or in a sub-unit of the CTU, information about motion compensation may be entropy encoded/decoded based on a predetermined block size or a predetermined block depth.

Herein, information about the predetermined block size or the predetermined block depth may be additionally entropy encoded/decoded. Alternatively, information about the predetermined block size or the predetermined block depth may be determined to a value preset in the encoder and the decoder, or may be determined based on at least one encoding parameter or based on at least one other syntax element value.

Information about motion compensation may be entropy encoded/decoded in a block having a block size equal to or greater than a predetermined block size. Information about motion compensation may not be entropy encoded/decoded in a block having a block size smaller than the predetermined block size. Herein, sub-blocks within a block having a block size equal to or greater than the predetermined block size may perform motion compensation based on information about motion compensation which is entropy encoded/decoded in the block having the block size equal to or greater than the predetermined block size. In other words, the sub-blocks within the block having the block size equal to or greater than the predetermined block size may share information about motion compensation including a motion vector candidate, a motion vector candidate list, a merge candidate, a merge candidate list, etc.

Information about motion compensation may be entropy encoded/decoded in a block having a block depth equal to or shallower than a predetermined block depth, and information about motion compensation may not be entropy encoded/decoded in a block having a block depth deeper than the predetermined block depth. Herein, sub-blocks within the block having the block depth equal to or shallower than the predetermined block depth may perform motion compensation based on information about motion compensation which is entropy encoded/decoded in the block depth equal to or shallower than the predetermined block depth. In other words, the sub-blocks within the block having the block depth equal to or shallower than the predetermined block depth may share information about motion compensation including a motion vector candidate, a motion vector candidate list, a merge candidate, a merge candidate list, etc.

In one embodiment, when a block size of a CTU is 64×64, and information about motion compensation is entropy encoded/decoded in a 32×32 sub-unit of the CTU, motion compensation may be performed in a block that is included in a 32×32 block and having a block size smaller than a 32×32 block unit based on information about motion compensation which is entropy encoded/decoded in the 32×32 block unit.

In another embodiment, when a block size of the CTU is 128×128, and information about motion compensation in entropy encoded/decoded in a 16×16 sub-unit of the CTU, motion compensation may be performed in a block that is included in a 16×16 block and having a block size smaller than a 16×16 block unit based on information about motion compensation which is entropy encoded/decoded in the 16×16 block unit.

In another embodiment, when a block depth of the CTU is 0, and information about motion compensation is entropy encoded/decoded in a sub-unit of the CTU with a block depth being 1, motion compensation may be performed in a block that is included in the block with the block depth being 1 and having a block depth deeper than the block with the block depth being 1 based on information about motion compensation which is entropy encoded/decoded in the block with the block depth being 1.

For example, when a block depth of a CTU is 0, and at least one piece of information about motion compensation is entropy encoded/decoded in a sub-unit of the CTU with a block depth being 2, motion compensation may be performed in a block that is included in the block with the block depth being 2 and having a block depth equal to or deeper than the block with the block depth being 2 based on information about motion compensation which is entropy encoded/decoded in the block with the block depth being 2.

Herein, a value of the block depth may be a positive integer including 0. When the value of the block depth becomes larger, the block depth becomes deeper. Alternately, when the value of the block depth becomes smaller, the block depth becomes shallower. Accordingly, when the value of the block depth becomes larger, the block size becomes smaller. Alternatively, when the value of the block depth becomes smaller, the block size becomes larger. In addition, a lower level of the predetermined block depth may refer to a depth that is deeper than the predetermined block depth, or a lower level of the predetermined block depth may refer to a depth that is deeper within the block corresponding to the predetermined block depth.

Information about motion compensation may be entropy encoded/decoded in a block unit, or may be entropy encoded/decoded at a higher level. In one embodiment, information about motion compensation may be entropy encoded/decoded in a block unit such as CTU, CU, PU, etc., or may be entropy encoded/decoded at a higher level such as video parameter set, sequence parameter set, picture parameter set, adaptation parameter set, slice header, etc.

Information about motion compensation may be entropy encoded/decoded based on a difference value between the information about motion compensation and an information prediction value of motion compensation. For example, in case of an inter prediction indicator that is one piece of information about motion compensation, an inter prediction indicator prediction value and an inter prediction indicator difference value may be entropy encoded/decoded.

Herein, the inter prediction indicator difference value may be entropy encoded/decoded in a block unit, the inter prediction indicator prediction value may be entropy encoded/decoded at a higher level. When the information prediction value of motion compensation including the inter prediction indicator prediction value is entropy encoded/decoded in a picture or slice unit, blocks included in the picture or the slice may use a common information prediction value about motion compensation.

An information prediction value of motion compensation may be derived by using a specific region within a picture, a slice, or a tile, or by using a specific region within a CTU, or a CU. In one embodiment, an inter prediction indicator of a specific region within a picture, a slice, a tile, a CTU, or a CU may be used as an inter prediction indicator prediction value. Herein, entropy encoding/decoding of an information prediction value of motion compensation may be omitted, and an information difference value about motion compensation may be entropy encoded/decoded.

Alternatively, the information prediction value about motion compensation may be derived from an encoded/decoded neighboring block adjacent to the current block. In one embodiment, an inter prediction indicator prediction value of the encoded/decoded neighboring block adjacent to the current block may be set to an inter prediction indicator of the current block. Herein, the neighboring block of the current block may include at least one of a block used for deriving a spatial motion vector candidate, and a block used for deriving a temporal motion vector candidate.

When an inter prediction indicator prediction value and an inter prediction indicator difference value are used, the decoding apparatus may calculate an inter prediction indicator value of the prediction block by summing the inter prediction indicator prediction value and the inter prediction indicator difference value.

A difference value of information about motion compensation may be entropy encoded/decoded based on at least one encoding parameter.

Information about motion compensation, a prediction value of information about motion compensation, or a difference value of information about motion compensation may be derived as information about motion compensation, a prediction value of information about motion compensation, or a difference value of information about motion compensation of the current block based on at least one encoding parameter.

Rather than entropy encoding/decoding information about motion compensation of the current block, information about motion compensation of an encoded/decoded block adjacent to the current block may be used as information about motion compensation of the current block. In one embodiment, an inter prediction indicator of the current block may be set to a value that is identical to an inter prediction indicator of encoded/decoded neighboring block adjacent to the current block.

Information about motion compensation may include at least one of a motion vector, information whether or not a skip mode is used (skip_flag), information about whether or not a merge mode is used (merge_flag), merge index information (merge_index), information about a motion vector resolution, information about overlapped block motion compensation, information about local illumination compensation, information about affine motion compensation, information about decoder-side motion vector derivation, information about bi-directional optical flow.

Information about a motion vector resolution may be information representing whether or not a specific resolution is used for at least one of a motion vector and a motion vector difference value. Herein, the resolution may refer to a precision. In addition, the specific resolution may be set to at least one of an integer-pixel (integer-pel) unit, a ½-pixel (½-pel) unit, a ¼-pixel (¼-pel) unit, a ⅛-pixel (⅛-pel) unit, a 1/16-pixel (1/16-pel) unit, a 1/32-pixel (1/32-pel) unit, and a 1/64-pixel (1/64-pel) unit.

Information about overlapped block motion compensation may refer to information representing whether or not a weighted sum of the prediction block of the current block is calculated by additionally using a motion vector of a neighboring block spatially adjacent to the current block when performing motion compensation of the current block.

Information about local illumination compensation may be information representing whether or not at least one of a weighting factor value and an offset value is applied when generating the prediction block of the current block. Herein, the weighting factor value and the offset value may be a value calculated based on a reference block.

Information about affine motion compensation may be information representing whether or not an affine motion model is used when performing motion compensation of the current block. Herein, the affine motion model may be a model that divides a single block into a plurality of sub-blocks by using a plurality of parameters, and calculates motion vectors of divided sub-blocks by using representative motion vectors.

Information about decoder-side motion vector derivation may be information representing whether or not a motion vector required for motion compensation is derived and used by the decoder. Information about a motion vector may not be entropy encoded/decoded based on the information about decoder-side motion vector derivation. When the information about decoder-side motion vector derivation represents that the decoder derives and uses the motion vector, information about a merge mode may be entropy encoded/decoded. In other words, the information about decoder-side motion vector derivation may represent whether or not the decoder uses a merge mode.

Information about bi-directional optical flow may refer to information representing whether or not motion compensation is performed by correcting a motion vector to a pixel unit or in a sub-block unit. A motion vector of a pixel unit or in a sub-block unit may not be entropy encoded/decoded based on the information about bi-directional optical flow. Herein, the correction of the motion vector may refer to changing a motion vector of a block unit to a motion vector value of a pixel unit or a sub-block unit.

The current block may perform motion compensation by using at least one piece of information about motion compensation, and entropy encode/decode at least one piece of information about motion compensation.

A region to which information about motion compensation is applied may be defined as granularity information. As described above, when information about motion compensation is entropy encoded/decoded in a predetermined block size or a predetermined block depth, the predetermined block size or the predetermined block depth may be expressed as granularity information. Meanwhile, granularity information may be included in information about motion compensation.

Granularity information may be additionally entropy encoded/decoded. Herein, granularity information may be entropy encoded/decoded in at least one unit of a CTU, a sub-unit of the CTU, a CU, and a PU.

Granularity information may be determined based on at least one of information about motion compensation, an encoding parameter, and other syntax element value. In addition, granularity information may be entropy encoded/decoded based on at least one of information about motion compensation, an encoding parameter, and other syntax element value.

FIG. 25 is a view showing an example of a syntax about granularity information.

Referring to FIG. 25, ref_idx_granularity may be a syntax element representing granularity information in which a reference picture index is applied in a CTU.

Granularity information may specify a predetermined region which shares information about motion compensation, or specify a predetermined region in which independently/parallel performing motion compensation of a plurality of blocks is allowed. Granularity information may be expressed as at least one of a size, a depth, a position (for example, at least one coordinate among four corner samples), a shape, and a number of division times of a corresponding region.

Granularity information may be expressed by specifying a block size or a predetermined block depth. In one embodiment, when granularity information is specified as a predetermined block size, granularity information may have an N×M block size such as 256×256, 128×128, 64×64, 32×32, 16×16, 8×8, etc. Herein, N or M may refer to a positive integer equal to or greater than 0, N and M may have an identical value (square shape), or may have different values (non-square shape).

Meanwhile, when granularity information is specified as a predetermined block depth, granularity information may have a positive integer such as 0, 1, 2, 3, . . . N, etc. Herein, N may refer to a positive integer.

Granularity information may be entropy encoded/decoded in a block unit, or may be entropy encoded/decoded at a higher level. In one embodiment, granularity information may be entropy encoded/decoded in a block unit such as CTU, sub-unit of the CTU, CU, PU, etc., or may be entropy encoded/decoded at a higher level such as video parameter set, sequence parameter set, picture parameter set, adaptation parameter set, slice header, etc.

Granularity information may be entropy encoded/decoded based on a granularity information difference value representing a difference value between granularity information and a granularity information prediction value. In one embodiment, the granularity information prediction value and the granularity information difference value may be entropy encoded/decoded.

Herein, the granularity information difference value may be entropy encoded/decoded in a block unit of any one of a CTU, a sub-unit of the CTU, a CU, and a PU. The granularity information prediction value may be entropy encoded/decoded in a higher level. When the granularity information prediction value is entropy encoded/decoded in a picture or slice unit, blocks included in the picture or slice may use a common granularity information prediction value.

The granularity information prediction value may be derived by using a specific region of a picture, a slice, or a tile, or by using a specific region within a CTU or a CU. In one embodiment, a granularity information value of a specific region of a picture, a slice, a tile, a CTU, or a CU may be used as the granularity information prediction value. Herein, entropy encoding/decoding of the granularity information prediction value is omitted, and the granularity information difference value is entropy encoded/decoded.

Alternatively, the granularity information prediction value may be derived from an encoded/decoded neighboring block adjacent to the current block. In one embodiment, a granularity information value of the encoded/decoded neighboring block adjacent to the current block may be set as the granularity information prediction value of the current block. Herein, the neighboring block of the current block may include at least one of a block used for deriving a spatial motion vector candidate, and a block used for deriving a temporal motion vector candidate.

In addition, the granularity information prediction value may be derived by using a block size or a block depth which is preset in the encoding apparatus and the decoding apparatus. Herein, entropy encoding/decoding of the granularity information prediction value is omitted, and the granularity information difference value is entropy encoded/decoded.

When the granularity information prediction value and the granularity information difference value are used, the decoding apparatus may calculate the granularity information value of the current block by summing the granularity information prediction value and the granularity information difference value.

Rather than entropy encoding/decoding granularity information of the current block, granularity information of an encoded/decoded block adjacent to the current block may be used as the granularity information of the current block. In one embodiment, granularity information of the current block may be set to a value identical to granularity information of the encoded/decoded neighboring block adjacent to the current block.

Alternatively, granularity information may be derived by using a value preset in the encoding apparatus and the decoding apparatus. Herein, the preset value may be a preset block size or a preset block depth.

Granularity information may be entropy encoded/decoded to flag information for respective information about motion compensation. Herein, the granularity information may represent whether each piece of information about motion compensation has a preset value in a predetermined block size or a predetermined block depth. Herein, the preset value may be a value that is commonly set in the encoding apparatus and the decoding apparatus. In one embodiment, granularity information of a reference picture index may represent whether or not the reference picture index has a preset value in a predetermined block size or a predetermined block depth. When the granularity information of the reference picture index is a first value, blocks having a block size smaller than the predetermined block size or having a block depth deeper than the predetermined block depth may use the preset value as the reference picture index. When the granularity information of the reference picture index is a second value, blocks having a block size smaller than the predetermined block size or having a block depth deeper than the predetermined block depth may not use the preset value as the reference picture index.

In addition, when granularity information is entropy encoded/decoded at a higher level such as picture, slice, etc., flag information indicating whether or not granularity information to be entropy encoded/decoded is identical to granularity information applied to the current block may be entropy encoded/decoded. When the entropy encoded/decoded flag information is a first value, granularity information applied to the current block may be identically determined as granularity information of the higher level such as picture, slice, etc. Alternatively, when the entropy encoded/decoded flag information is a second value, granularity information applied to the current block may be additionally entropy encoded/decoded.

Alternatively, when granularity information is predicted from granularity information of neighboring blocks of the current block, flag information indicating whether or not granularity information of the neighboring block is identical to the granularity information applied to the current block may be entropy encoded/decoded. When the entropy encoded/decoded flag information is a first value, the granularity information applied to the current block may be identically determined as the granularity information of the neighboring block. Alternatively, when the entropy encoded/decoded flag information is a second value, the granularity information applied to the current block may be additionally entropy encoded/decoded.

Alternatively, when granularity information is derived by using a value preset in the encoding apparatus and the decoding apparatus, flag information indicating whether or not granularity information derived by using the preset value is identical to granularity information applied to the current block may be entropy encoded/decoded. When the entropy encoded/decoded flag information is a first value, the granularity information applied to the current block may be identically determined as the value preset in the encoding apparatus and the decoding apparatus. Alternatively, when the entropy encoded/decoded flag information is a second value, the granularity information applied to the current block may be additionally entropy encoded/decoded.

Granularity information may be derived by index information specifying one of groups preset in the encoding apparatus and the decoding apparatus. Herein, the index information specifying the granularity information may be entropy encoded/decoded.

Meanwhile, when any one of described flag information is a second value, and granularity information applied to the current block is additionally entropy encoded/decoded, the additionally entropy encoded/decoded granularity information may be index information specifying one of groups predefined in the encoding apparatus and the decoding apparatus as the granularity information. Herein, the predefined groups specified according to the index information may be a group of granularity information values or granularity information difference values.

Hereinbelow, an embodiment of sharing information about motion compensation by using granularity information will be described. Herein, the information about motion compensation may include at least one of a motion vector candidate, a motion vector candidate list, a merge candidate, a merge candidate list, an inter prediction indicator, a reference picture index, a motion vector candidate index, a motion vector residual, a prediction list utilization flag, a weighting factor value, an offset value, information about whether or not a skip mode is used, information about whether or not a merge mode is used, merge index information, information about a motion vector resolution, information about overlapped block motion compensation, information about local illumination compensation, information about affine motion compensation, information about decoder-side motion vector derivation, and information about bi-directional optical flow.

As described above, the granularity information may be information representing a predetermined block size or a predetermined block depth.

When the granularity information is information representing a predetermined block, blocks having a block size smaller than the granularity information may share information about motion compensation based on the granularity information. Herein, the blocks having the block size smaller than the granularity information may be a lower block present inside of a block having a block size indicated by the granularity information or may be a block having a block size identical to the block size indicated by the granularity information.

When the granularity information is information representing a predetermined block depth, blocks having a block depth deeper than the granularity information may share information about motion compensation based on the granularity information. Herein, the blocks having the block depth deeper than the granularity information may be a lower block present inside of a block having a block depth indicated by the granularity information, or may be a block having a block depth deeper than the block depth indicated by the granularity information or having a block depth indicated by the granularity information.

In one embodiment, when an inter prediction indicator is PRED_LX (X is an integer such as 0, 1, 2, 3, etc.), blocks having a block size smaller than the granularity information or blocks having a block depth deeper than the granularity information may share a reference picture index of a reference picture list LX based on the granularity information. Herein, the reference picture index may be a positive integer including 0.

When the inter prediction indicator is PRED_BI, PRED_TRI, or PRED_QUAD, blocks having a block size smaller than the granularity information or blocks having a block depth deeper than the granularity information may share at two, three, or four reference picture indexes for at least one of reference picture lists L0, L1 . . . LX based on the granularity information.

In one embodiment, blocks having a block size smaller than the granularity information or blocks having a block depth deeper than the granularity information may share at least one of PRED_L0, PRED_L1, PRED_L2, PRED_L3, PRED_BI, PRED_TRI, and PRED_QUAD as an inter prediction indicator based on the granularity information.

In one embodiment, blocks having a block size smaller than the granularity information or blocks having a block depth deeper than the granularity information may share at least one of 0, 1, 2, 3, 4 or more positive integer values as a reference picture index based on the granularity information.

In one embodiment, blocks having a block size smaller than the granularity information or block having a block depth deeper than the granularity information may share at least one of 0, 1, 2, 3, 4 or more positive integer values as a reference picture index of each reference picture list L0 or L1 based on the granularity information when an inter prediction indicator is PRED L0 or PRED_L1.

In one embodiment, blocks having a block size smaller than the granularity information or blocks having block depth deeper than the granularity information may share at least one of 0, 1, 2, 3, 4 or more positive integer values as a reference picture index of respective reference picture lists L0 and L1 based on the granularity information when an inter prediction indicator is PRED_BI.

In one embodiment, blocks having a block size smaller than the granularity information or blocks having a block depth deeper than the granularity information may share at least one of 0, 1, 2, 3, 4 or more positive integer values as a motion vector candidate index based on the granularity information.

In one embodiment, blocks having a block size smaller than the granularity information or blocks having a block depth deeper than the granularity information may use a preset fixed value as a motion vector residual value based on the granularity information. Herein, the preset fixed value may be a two-dimensional vector value with an integer form including (0, 0).

In one embodiment, blocks having a block size smaller than the granularity information or blocks having a block depth deeper than the granularity information may use a preset fixed value as a motion vector prediction value based on the granularity information. Herein, the preset fixed value may be a two-dimensional vector value with an integer form including (0, 0).

In one embodiment, blocks having a block size smaller than the granularity information or blocks having a block depth deeper than the granularity information may use a preset fixed value as a motion vector based on the granularity information. Herein, the preset fixed value may be a two-dimensional vector value with an integer form including (0, 0).

In one embodiment, blocks having a block size smaller than the granularity information or blocks having a block depth deeper than the granularity information may share at least one of a real number value and an integer value which includes 0 as a weighting factor value based on the granularity information.

In one embodiment, blocks having a block size smaller than the granularity information or blocks having a block depth deeper than the granularity information may share at least one of integer values including 0 as an offset value based on the granularity information.

Herein, sharing information about motion compensation may mean in that blocks may have identical information about motion compensation, or blocks may perform motion compensation by using identical information about motion compensation.

After entropy encoding/decoding granularity information, information about motion compensation corresponding to the granularity information may be entropy encoded/decoded. Herein, the information about motion compensation to be entropy encoded/decoded may be applied to or shared in a region indicated by the granularity information (a block having a block size smaller than the granularity information or a block having a block depth deeper than granularity information). In one embodiment, when granularity information indicating a 32×32 block size in a CTU having a 128×128 block size and a reference picture index corresponding to the granularity information are entropy encoded/decoded, the entropy encoded/decoded reference picture index may be commonly applied to blocks having a block size smaller than 32×32 block size within the corresponding CTU.

In addition, information about motion compensation in the region indicated by the granularity information may be determined to a fixed value preset in an encoder and a decoder. In one embodiment, when granularity information indicating a 32×32 block size in a CTU having a 128×128 block size is entropy encoded/decoded, a reference picture index determined to the preset fixed value may be commonly applied to blocks having a block size smaller than the 32×32 block size within the corresponding CTU.

Figure 26:
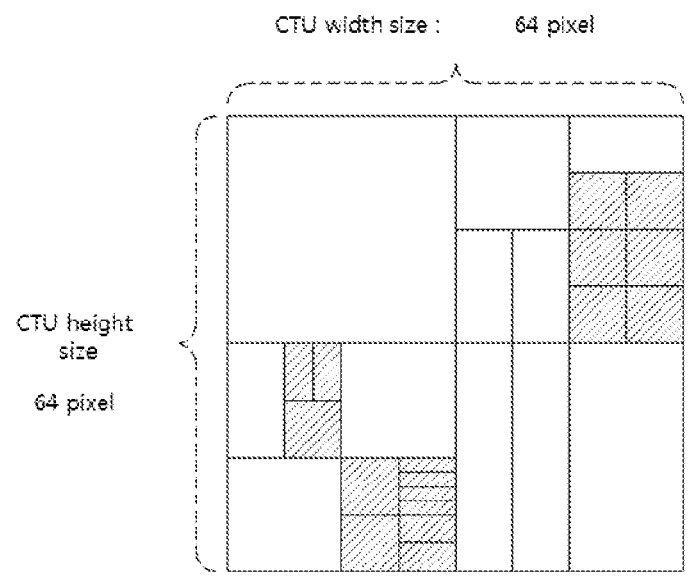
FIGS. 26 and 27 are views showing a region indicated by the granularity information.
Figure 27:
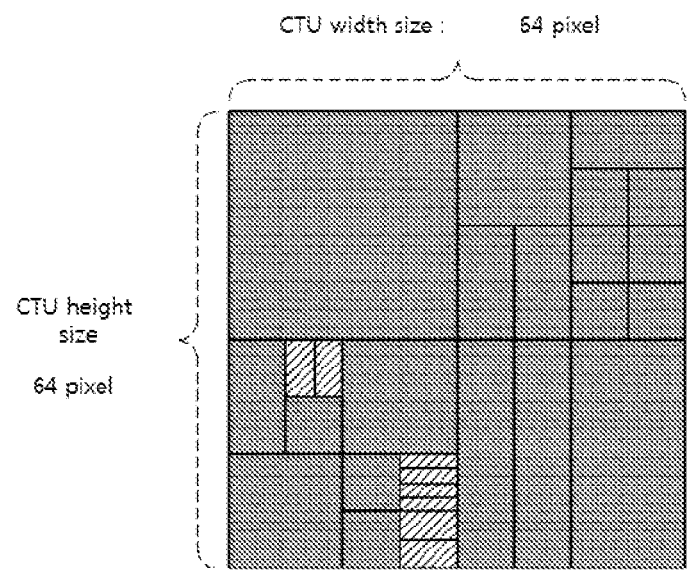

FIG. 26 and FIG. 27 are views showing a region indicated by the granularity information. It is assumed that a block size of a CTU in FIG. 26 and FIG. 27 is 64×64, granularity information to be entropy encoded/decoded represented in an 8×8 block size, and a fixed value preset in the encoder and the decoder is determined as a reference picture index in a region indicated by the granularity information.

Referring to FIG. 26, a region indicated by granularity information may refer to blocks having a block size equal to or smaller than the 8×8 block size represented by the granularity information. Herein, blocks with hatched region of FIG. 26 may correspond to the region indicated by the granularity information, a reference picture index determined as a preset fixed value may be applied to the corresponding blocks.

Referring to FIG. 27, a region indicated by granularity information may refer to blocks having a block size smaller than the 8×8 block size represented by the granularity information. Herein, blocks with hatched region of FIG. 27 may correspond to the region indicated by the granularity information, a reference picture index determined as a preset fixed value may be applied to the corresponding blocks. In addition, the reference picture index determined as the preset fixed value may not be applied to dark regions. In one embodiment, when flag information indicates a first value based on the flag information to be entropy encoded/decoded, a reference picture index preset to the fixed value may be applied to regions (hatched regions) indicated by the granularity information. When the flag information indicates a second value, the reference picture index preset to the fixed value may not be applied to regions (hatched regions) indicated by the granularity information Meanwhile, when comparing sizes between blocks, being smaller than the predetermined block may mean that the total number of samples present within a block is small. In one embodiment, a 32×16 block has 512 samples so the block is smaller in size than a block 32×32 having 1024 samples. A 4×16 block has 64 samples so the block is equal to in size with an 8×8 block.

In the above, the region indicated by the granularity information is described as a block having a block size smaller or having a block size equal to or smaller than the block size indicated by the granularity information.

However, it is not limited thereto, according to an embodiment, the region indicated by the granularity information may be a block having a block size greater or having a block size equal to or greater than the block size indicated by the granularity information. In other words, when the granularity information indicates an 8×8 block size, blocks with dark regions in FIG. 27 may correspond to the region indicated by the granularity information and may share information about motion compensation.

At least one piece of information about motion compensation or the granularity information may be entropy encoded/decoded to a bitstream by using an encoding parameter, or at least one piece of information about motion compensation may be derived by using at least one encoding parameter.

When entropy encoding/decoding information about motion compensation or granularity information, a truncated Rice binarization method, a K-th order Exp_Golomb binarization method, a constrained K-th order Exp_Golomb binarization method, a fixed-length binarization method, a unary binarization method, or a truncated unary binarization method may be used.

When entropy encoding/decoding information about motion compensation or granularity information, a context model may be determined by using at least one of information about motion compensation of a neighboring block adjacent to the current block, granularity information of a neighboring block, previously encoded/decoded information about motion compensation, previously encoded/decoded granularity information, depth information of the current block, and size information of the current block.

In addition, when entropy encoding/decoding information about motion compensation or granularity information, entropy encoding/decoding may be performed by using at least one of information about motion compensation of a neighboring block, granularity information of a neighboring block, previously encoded/decoded information about motion compensation, previously encoded/decoded granularity information, depth information of the current block, and size information of the current block as a prediction value of information of motion compensation or granularity information of the current block.

The above inter encoding/decoding process may be performed for each luma signal and chroma signal. For example, at least one of obtaining an inter prediction indicator, generating a motion vector candidate list, deriving a motion vector, and performing motion compensation of the above inter encoding/decoding process may be differently applied for a luma signal and a chroma signal.

The above inter encoding/decoding process may be identically applied for a luma signal and a chroma signal. For example, at least one of an inter prediction indicator, a motion vector candidate list, a motion vector candidate, a motion vector, and a reference picture of the above inter encoding/decoding process may be identically applied to a chroma signal and a luma signal.

The above methods may be performed by the same method in the encoder and the decoder. For example, at least one method of deriving a motion vector candidate list, deriving a motion vector candidate, deriving a motion vector, and motion compensation of the above inter encoding/decoding may be applied by the same method in the encoder and the decoder. In addition, an order of applying the above methods in the encoder may be different from an order of applying the above methods in the decoder.

The above embodiments of the present invention may be applied according to at least one size of an encoding block, a prediction block, a block, and a unit. Herein, the size may be defined as the minimum size or the maximum size or both to which the above embodiments are applied, or may be defined as a fixed size to which the above embodiments are applied. In addition, in the above embodiments, a first embodiment may be applied for a first size, and a second embodiment may be applied for a second size. In other words, the above embodiments may be applied in combination according to the size. In addition, the above embodiments of the present invention may be applied when the size is equal to or greater than the minimum size and equal to or smaller than the maximum size. In other words, the above embodiments may be applied when the block size is included in a predetermined range.

For example, the above embodiments may be applied when an encoding/decoding target block has an 8×8 size or larger. For example, the above embodiments may be applied when an encoding/decoding target block has a 16×16 size or larger. For example, the above embodiments may be applied when an encoding/decoding target block has a 32×32 size or larger. For example, the above embodiments may be applied when an encoding/decoding target block has a 64×64 size or larger. For example, the above embodiments may be applied when an encoding/decoding target block has a 128×128 size or larger. For example, the above embodiments may be applied when an encoding/decoding target block has a 4×4 size. For example, the above embodiments may be applied when an encoding/decoding target block has an 8×8 size or smaller. For example, the above embodiments may be applied when an encoding/decoding target block has a 16×16 size or smaller. For example, the above embodiments may be applied when an encoding/decoding target block has an 8×8 size or larger and has a 16×16 size or smaller For example, the above embodiments may be applied when an encoding/decoding target block has a 16×16 size or larger and has a 64×64 size or smaller.

The above embodiments of the present invention may be applied according to a temporal layer. In order to identify a temporal layer to which the above embodiments may be applied, an additional identifier may be signaled, and the above embodiments may be applied to a temporal layer specified by the corresponding identifier. Herein, the identifier may be defined as the minimum layer or the maximum layer or both to which the embodiments may be applied, or may be defined to indicate a specific layer to which the above embodiments may be applied.

For example, the above embodiments may be applied when a temporal layer of the current picture is the lowest layer. For example, the above embodiments may be applied when a temporal layer identifier of the current picture is 0. For example, the above embodiments may be applied when a temporal layer identifier of the current picture is equal to or greater than 1 For example, the above embodiments may be applied when a temporal layer of the current picture is the highest layer.

As the above embodiments of the present invention, a reference picture set used when generating a reference picture list and modifying a reference picture list may use at least one reference picture list of L0, L1, L2, and L3.

According to above embodiment of the present invention, at least one to maximum N motion vectors of an encoding/decoding target block may be used when calculating boundary strength in a deblocking filter. Herein, N is a positive integer equal to or greater than 1, and may be 2, 3, 4, etc.

The above embodiment of the present invention may be applied when a motion vector has at least one of a 16-pixel (16-pel) unit, an 8-pixel (8-pel) unit, a 4-pixel (4-pel) unit, an integer-pixel (integer-pel) unit, a ½-pixel (½-pel) unit, a ¼-pixel (¼-pel) unit, a ⅛-pixel (⅛-pel) unit, a 1/16-pixel (1/16-pel) unit, a 1/32-pixel (1/32-pel) unit, and a 1/64-pixel (1/64-pel) when predicting the motion vector. In addition, the motion vector may be selectively used by the above pixel unit when predicting the motion vector.

A slice type to which the above embodiment of the present invention may be applied may be defined, and the above embodiment of the present invention may be applied according to the corresponding slice type.

For example, when a slice type is T (Tri-predictive)-slice, a prediction block may be generated by using at least three motion vectors, and the weighted sums of at least three prediction blocks may be used as a final prediction block of an encoding/decoding target block by calculation thereof. For example, when a slice type is Q (Quad-predictive)-slice, a prediction block may be generated by using at least four motion vectors, whereby, the weighted sums of at least four prediction blocks may be used as a final prediction block of an encoding/decoding target block by calculation thereof.

The above embodiments of the present invention may be applied to inter prediction and motion compensation methods using motion vector prediction, and may be applied to inter prediction and motion compensation methods using a skip mode or a merge mode.

A block shape to which the above embodiments of the present invention may be applied may have a square shape or a non-square shape.

In the above, a video encoding method and a video decoding method using granularity information according to the present invention are described with reference to FIGS. 12 to 27. Hereinbelow, a video decoding method, a video encoding method, a video decoder, a video encoder, and a bit stream according to the present invention will be described in detail with reference to FIG. 28 and FIG. 29.

Figure 28:
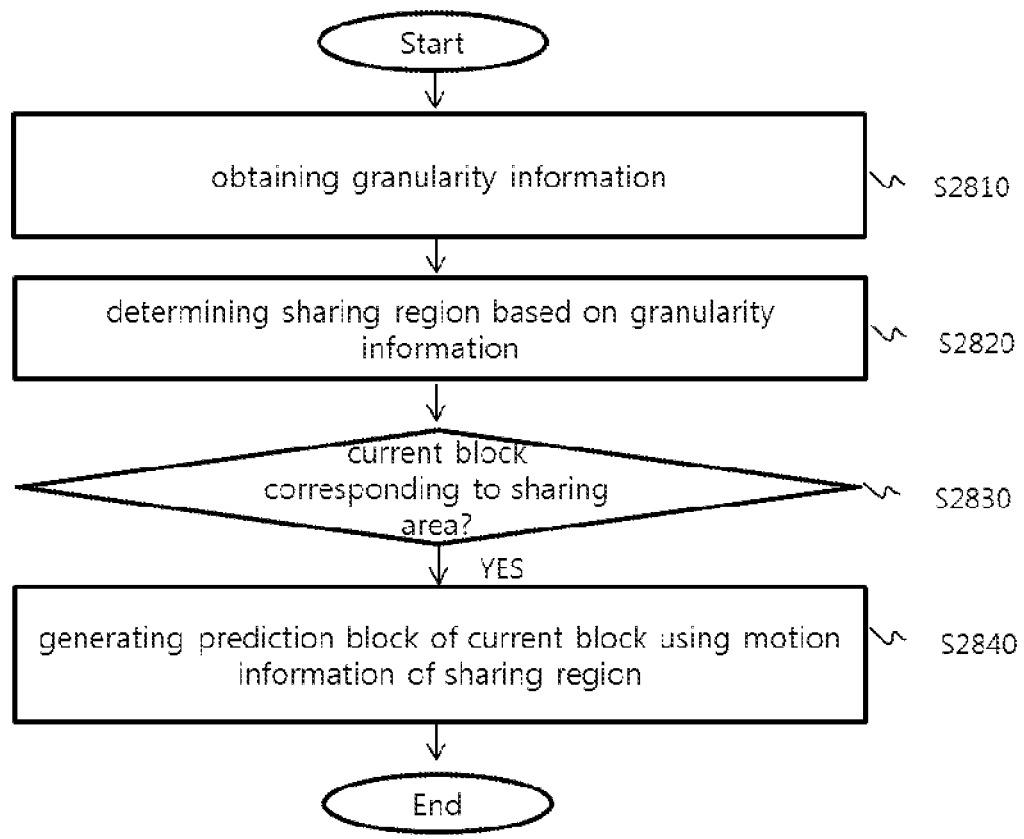
FIG. 28 is a view showing a video decoding method according to the present invention.

FIG. 28 is a view showing a video decoding method according to the present invention.

Referring to FIG. 28, first, in step S2810, granularity information may be obtained, and in step S2820, a sharing region may be determined based on the granularity information. Herein, the sharing region may refer to a region of blocks in which information of motion compensation is shared.

Then, in step S2830—YES, when a current block corresponds to the sharing region, in step S2840, a prediction block of the current block may be generated by using motion information of the sharing region.

Herein, the granularity information may be information representing a predetermined block size or a predetermined block depth.

Meanwhile, a region of at least one block having a block size smaller than the predetermined block size represented by the granularity information may be determined as the sharing region. Alternatively, a region of at least one block having a block depth deeper than the predetermined block depth represented by the granularity information may be determined as the sharing region.

Meanwhile, the motion information of the sharing region may be motion information commonly applied to at least one block corresponding to the sharing region.

In addition, the motion information of the sharing region may be determined based on a predefined value. Herein, the predefined value may be a value fixed in the encoder and the decoder.

In addition, the motion information of the sharing region may be derived and entropy decoded in any one level of a video parameter set, a sequence parameter set, a picture parameter set, an adaptation parameter set, a slice header, a coding tree unit (CTU), and a coding unit (CU).

The motion information of the sharing region may include a plurality of motion vector candidate lists and information about a weighted sum. Herein, the prediction block of the current block may be generated by applying the information of the weighted sum to a plurality of prediction blocks generated based on the plurality of motion vector candidate lists.

Figure 29:
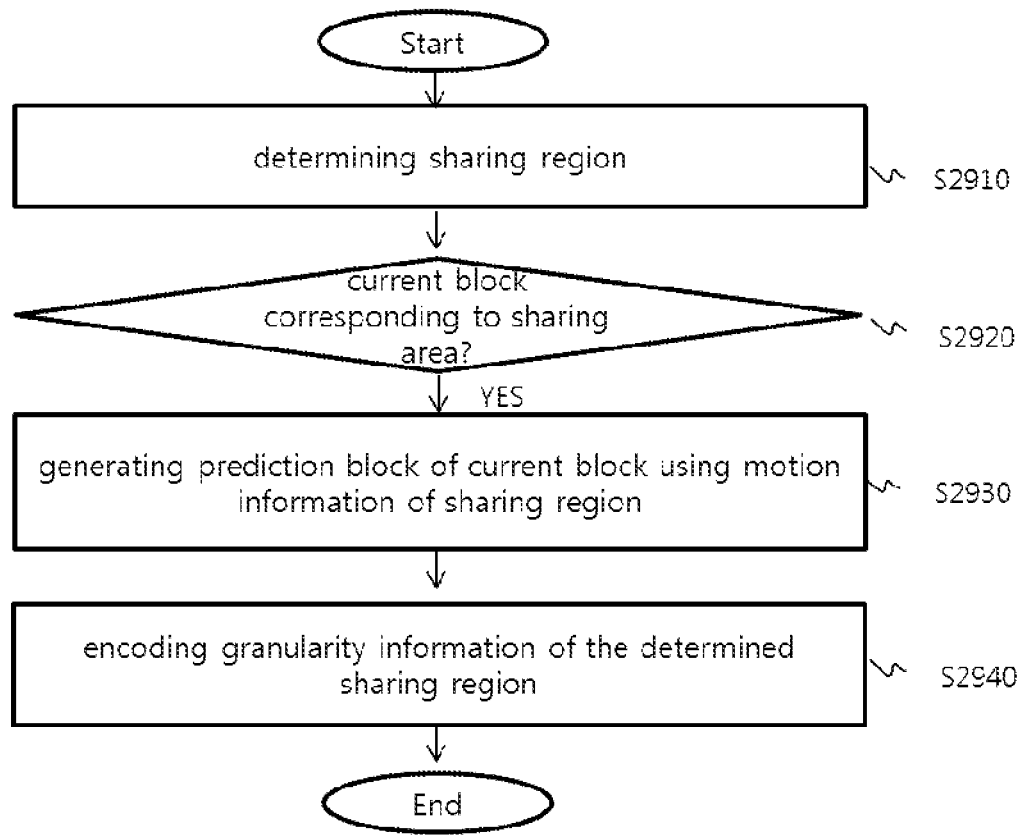
FIG. 29 is a view showing a video encoding method according to the present invention.

FIG. 29 is a view showing a video encoding method according to the present invention.

Referring to FIG. 29, first, in step S2910, a sharing region may be determined, and in step S2920—YES, when a current block corresponds to the sharing region, in step S2930, a prediction block of the current block may be generated by using motion information of the sharing region.

Then, in step S2940, granularity information of the determined sharing region may be encoded.

Herein, the granularity information may be information representing a predetermined block size or a predetermined block depth.

Meanwhile, the motion information of the sharing region may be motion information that is commonly applied to at least one block corresponding to the sharing region.

In addition, the motion information of the sharing region may be determined based on a predefined value. Herein, the predefined value may be a fixed value preset in the encoder and the decoder.

In addition, the motion information of the sharing region may be derived and entropy encoded in any one level of a video parameter set, a sequence parameter set, picture parameter set, an adaptation parameter set, a slice header, a coding tree unit (CTU), and a coding unit (CU).

Meanwhile, the motion information of the sharing region may include a plurality of motion vector candidate lists and information of a weighted sum. Herein, the prediction block of the current block may be generated by applying the information of the weighted sum to a plurality of prediction blocks generated based on the plurality of motion vector candidate lists.

A video decoder according to the present invention may include an entropy decoding unit obtaining granularity information, and an inter prediction unit determining a sharing region based on the granularity information, and generating a prediction block of a current block by using motion information of a sharing region when the current block corresponds to the sharing region.

A video encoder according to the present invention may include: an inter prediction unit determining a sharing region, and generating a prediction block of a current block by using motion information of the sharing region when the current block corresponds to the sharing region; and an entropy encoding unit entropy encoding granularity information of the determined sharing region.

A bitstream according to the present invention may be a bitstream generated by a video encoding method that determines a sharing region, generates a prediction block of a current block by using motion information of the shared region when the current block corresponds to the sharing region, and encodes granularity information of the determined sharing region.

In the above-described embodiments, the methods are described based on the flowcharts with a series of steps or units, but the present invention is not limited to the order of the steps. Rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims The computer-readable storage medium may include a program instruction, a data file, a data structure, and the like either alone or in combination thereof. The program instruction recorded in the computer-readable storage medium may be any program instruction particularly designed and structured for the present invention or known to those skilled in the field of computer software. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instruction include not only a mechanical language code formatted by a compiler but also a high level language code which may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in an apparatus for encoding/decoding an image.

The invention claimed is:

1. A video decoding method, comprising:
   determining a prediction mode of a current block, the prediction mode being determined as one of intra prediction and inter prediction;
   in response to the prediction mode of the current block being the inter prediction, determining which of a merge mode and a motion vector prediction mode is applied to the current block;
   in response to the motion vector prediction mode being applied to the current block, decoding from a bitstream, an inter prediction indicator for the current block, the inter prediction indicator indicating whether a uni-directional or bi-directional inter prediction is applied to the current block;
   in response to the bi-directional inter prediction being applied to the current block, obtaining an L0 motion vector and an L1 motion vector of the current block;
   wherein the L0 motion vector is derived by adding an L0 motion vector difference to an L0 motion vector candidate,
   wherein the L0 motion vector candidate is specified by an L0 motion vector candidate index specifying the L0 motion vector candidate from an L0 motion vector candidate list,
   wherein at least one of an L0 spatial motion vector candidate derived from a neighboring block adjacent to the current block or an L0 temporal motion vector candidate derived from a collocated block of the current block is included in the L0 motion vector candidate list,
   wherein the L1 motion vector is derived by adding an L1 motion vector difference to an L1 motion vector candidate,
   wherein the L1 motion vector candidate is specified by an L1 motion vector candidate index specifying the L1 motion vector candidate from an L1 motion vector candidate list, and
   wherein at least one of an L1 spatial motion vector candidate derived from a neighboring block adjacent to the current block or an L1 temporal motion vector candidate derived from a collocated block of the current block is included in the L1 motion vector candidate list,
   obtaining an L0 inter prediction block of the current block from an L0 reference picture based on the L0 motion vector;
   obtaining an L1 inter prediction block of the current block from an L1 reference picture based on the L1 motion vector; and
   generating a final inter prediction block of the current block based on a weighted sum of the L0 inter prediction block and the L1 inter prediction block,
   wherein the weighted sum is performed by applying a first weighting factor to the L0 inter prediction block and applying a second weighting factor to the L1 inter prediction block,
   wherein the first weighting factor and the second weighting factor are determined based on index information for the current block,
   wherein the index information is explicitly signaled via the bitstream only when the inter prediction indicator of the current block indicates that the bi-directional inter prediction is applied to the current block,
   wherein motion vector difference information is explicitly signaled only for the L0 motion vector difference but is not explicitly signaled for the L1 motion vector difference,
   wherein a plurality of pre-defined weighting factor set candidates comprise a candidate in which at least one of the first weighting factor and the second weighting factor is a negative value, and
   wherein a pair of the first weighting factor and the second weighting factor is determined as one, specified by the index information, of the pre-defined weighting factor set candidates.

2. The method of claim 1, wherein the weight information of the current block is binarized with a truncated rice binarization method.

3. A video encoding method, comprising:
   obtaining an intra predicted block of a current block by performing intra prediction for the current block;
   obtaining an inter predicted block of the current block by performing inter prediction for the current block; and
   determining a prediction mode of the current block by comparing a cost of the intra predicted block and a cost of the inter predicted block, the prediction mode being determined as one of the intra prediction and the inter prediction,
   wherein in response to the prediction mode of the current block being the inter prediction, the method further comprises:
   determining which of a merge mode and a motion vector prediction mode is applied to the current block; and
   in response to the motion vector prediction mode being applied to the current block, encoding, into a bitstream, an inter prediction indicator for the current block, the inter prediction indicator indicating whether a uni-directional or bi-directional inter prediction is applied to the current block,
   wherein in response to the bi-directional inter prediction being applied to the current block, the inter predicted block is obtained based on a weighted sum of an L0 inter prediction block and an L1 inter prediction block, the L0 inter prediction block being obtained from an L0 reference picture based on an L0 motion vector of the current block, the L1 inter prediction block being obtained from an L1 reference picture based on an L1 motion vector of the current block,
   wherein an L0 motion vector difference is derived by subtracting an L0 motion vector candidate from the L0 motion vector,
   wherein an L0 motion vector candidate index specifying the L0 motion vector candidate from an L0 motion vector candidate list is encoded,
   wherein at least one of an L0 spatial motion vector candidate derived from a neighboring block adjacent to the current block or an L0 temporal motion vector candidate derived from a collocated block of the current block is included in the L0 motion vector candidate list,
   wherein an L1 motion vector difference is derived by subtracting an L1 motion vector candidate from the L1 motion vector,
   wherein an L1 motion vector candidate index specifying the L1 motion vector candidate from an L1 motion vector candidate list is encoded,
   wherein at least one of an L1 spatial motion vector candidate derived from a neighboring block adjacent to the current block or an L1 temporal motion vector candidate derived from a collocated block of the current block is included in the L1 motion vector candidate list, wherein the weighted sum is performed by applying a first weighting factor to the L0 inter prediction block and applying a second weighting factor to the L1 inter prediction block, wherein index information, which is used to determine the first weighting factor and the second weighting factor at a decoder side, are encoded into the bitstream, wherein the index information is encoded into the bitstream only when the inter prediction indicator of the current block is encoded with a value indicating that the bi-directional inter prediction is applied to the current block, wherein motion vector difference information is explicitly encoded only for the L0 motion vector difference but is not explicitly encoded for the L1 motion vector difference, wherein the index information specifies a weighting factor set candidate which corresponds to a pair of the first weighting factor and the second weighting factor, and wherein a plurality of pre-defined weighting factor set candidates comprise a candidate in which at least one of the first weighting factor and the second weighting factor is a negative value.

4. The method of claim 3, wherein the weight information of the current block is entropy coded using a truncated Rice binarization method.

5. A non-transitory recording medium storing a bit stream generated by a video encoding method, wherein the method includes:

obtaining an intra predicted block of a current block by performing intra prediction for the current block;

obtaining an inter predicted block of the current block by performing inter prediction for the current block; and determining a prediction mode of the current block by comparing a cost of the intra predicted block and a cost of the inter predicted block, the prediction mode being determined as one of the intra prediction and the inter prediction, wherein in response to the prediction mode of the current block being the inter prediction, the method further comprises:

determining which of a merge mode and a motion vector prediction mode is applied to the current block; and in response to the motion vector prediction mode being applied to the current block, encoding, into a bitstream, an inter prediction indicator for the current block, the inter prediction indicator indicating whether a uni-directional or bi-directional inter prediction is applied to the current block, wherein in response to the bi-directional inter prediction being applied to the current block, the inter predicted block is obtained based on a weighted sum of an L0 inter prediction block and an L1 inter prediction block, the inter L0 prediction block being obtained from an L0 reference picture based on an L0 motion vector of the current block, the L1 inter prediction block being obtained from an L1 reference picture based on an L1 motion vector of the current block, wherein an L0 motion vector difference is derived by subtracting an L0 motion vector candidate from the L0 motion vector, wherein an L0 motion vector candidate index specifying the L0 motion vector candidate from an L0 motion vector candidate list is encoded, wherein at least one of an L0 spatial motion vector candidate derived from a neighboring block adjacent to the current block or an L0 temporal motion vector candidate derived from a collocated block of the current block is included in the L0 motion vector candidate list, wherein an L1 motion vector difference is derived by subtracting an L1 motion vector candidate from the L1 motion vector, wherein an L1 motion vector candidate index specifying the L1 motion vector candidate from an L1 motion vector candidate list is encoded, wherein at least one of an L1 spatial motion vector candidate derived from a neighboring block adjacent to the current block or an L1 temporal motion vector candidate derived from a collocated block of the current block is included in the L1 motion vector candidate list, wherein the weighted sum is performed by applying a first weighting factor to the L0 inter prediction block and applying a second weighting factor to the L1 inter prediction block, wherein index information, which is used to determine the first weighting factor and the second weighting factor at a decoder side, are encoded into the bitstream, wherein the index information is encoded into the bitstream only when the inter prediction indicator of the current block is encoded with a value indicating that the bi-directional inter prediction is applied to the current block, wherein at least one of the first weighting factor and the second weighting factor is derived to be a negative value, wherein motion vector difference information is explicitly encoded only for the L0 motion vector difference but is not explicitly encoded for the L1 motion vector difference, wherein the index information specifies a weighting factor set candidate which corresponds to a pair of the first weighting factor and the second weighting factor, and wherein a plurality of pre-defined weighting factor set candidates comprise a candidate in which at least one of the first weighting factor and the second weighting factor is a negative value.

* * * * *